United States Patent
Miyatake et al.

(10) Patent No.: US 7,355,770 B2
(45) Date of Patent: Apr. 8, 2008

(54) OPTICAL SCANNING UNIT AND IMAGE FORMING APPARATUS

(75) Inventors: Naoki Miyatake, Kanagawa (JP); Seizo Suzuki, Kanagawa (JP); Shigeaki Imai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 11/675,808

(22) Filed: Feb. 16, 2007

(65) Prior Publication Data

US 2007/0146849 A1    Jun. 28, 2007

Related U.S. Application Data

(62) Division of application No. 10/942,907, filed on Sep. 17, 2004.

(30) Foreign Application Priority Data

Sep. 19, 2003  (JP) ............................. 2003-329125
Nov. 6, 2003   (JP) ............................. 2003-377253
Jan. 20, 2004  (JP) ............................. 2004-012369
Aug. 6, 2004   (JP) ............................. 2004-230677

(51) Int. Cl.
*G02B 26/08* (2006.01)

(52) U.S. Cl. .................................................. 359/204

(58) Field of Classification Search ............... 359/204, 359/206, 207
See application file for complete search history.

(56) References Cited

U.S. PATENT DOCUMENTS

| 5,359,407 | A   | 10/1994 | Suzuki et al. |
| 6,731,419 | B2  | 5/2004  | Koreeda |
| 6,914,705 | B2* | 7/2005  | Nakai ......................... 359/204 |
| 2003/0112486 | A1 | 6/2003 | Kudo |

FOREIGN PATENT DOCUMENTS

| JP | 09-054263   | 2/1997 |
| JP | 09-058053   | 3/1997 |
| JP | 09-127443   | 5/1997 |
| JP | 10-073778   | 3/1998 |
| JP | 11-014932   | 1/1999 |
| JP | 11-038348   | 2/1999 |
| JP | 11-157128   | 6/1999 |
| JP | 2001-004948 | 1/2001 |
| JP | 2001-010107 | 1/2001 |
| JP | 2001-033720 | 2/2001 |
| JP | 2001-305826 | 11/2001 |
| JP | 2003-005114 | 1/2003 |

* cited by examiner

*Primary Examiner*—Euncha P. Cherry
(74) *Attorney, Agent, or Firm*—Oblon, Spivak, McClelland, Maier & Neustadt, P.C.

(57) ABSTRACT

An optical scanning unit includes a light source that emits a light beam, a light deflector that deflects the light beam from the light source, and a scanning optical system that focuses the light beam deflected by the light deflector on a scanning surface. The light beam from the light source is at an angle in a secondary scanning direction with respect to a normal to a reflecting surface of the light deflector. At least one surface of the scanning optical system does not have a curvature in the secondary scanning direction, being tilted and decentered in the secondary scanning direction.

21 Claims, 32 Drawing Sheets

BEAM SPOT DIAMETER BEFORE CORRECTION OF WAVE FRONT ABERRATION BY SPECIAL TILTED AND DECENTERED SURFACE

BEAM SPOT DIAMETER BEFORE CORRECTION OF WAVE FRONT ABERRATION BY SPECIAL TILTED AND DECENTERED SURFACE $\beta_S 1 > \beta_S 2$ BEAM SPOT DIAMETER AFTER CORRECTION OF WAVE FRONT ABERRATION BY SPECIAL TILTED AND DECENTERED SURFACE BEAM SPOT DIAMETER AFTER CORRECTION OF WAVE FRONT ABERRATION BY SPECIAL TILTED AND DECENTERED SURFACE BEAM SPOT DIAMETER BEFORE CORRECTION OF WAVE FRONT ABERRATION BY SPECIAL TILTED AND DECENTERED SURFACE BEAM SPOT DIAMETER BEFORE CORRECTION OF WAVE FRONT ABERRATION BY SPECIAL TILTED AND DECENTERED SURFACE FIG. 14A
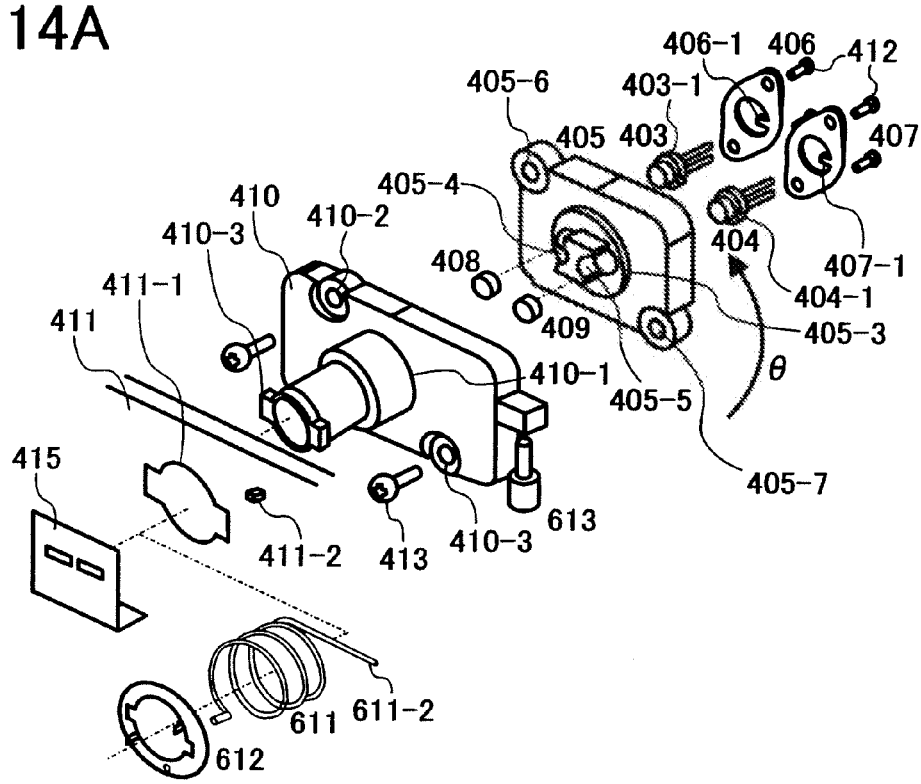
FIG. 14B
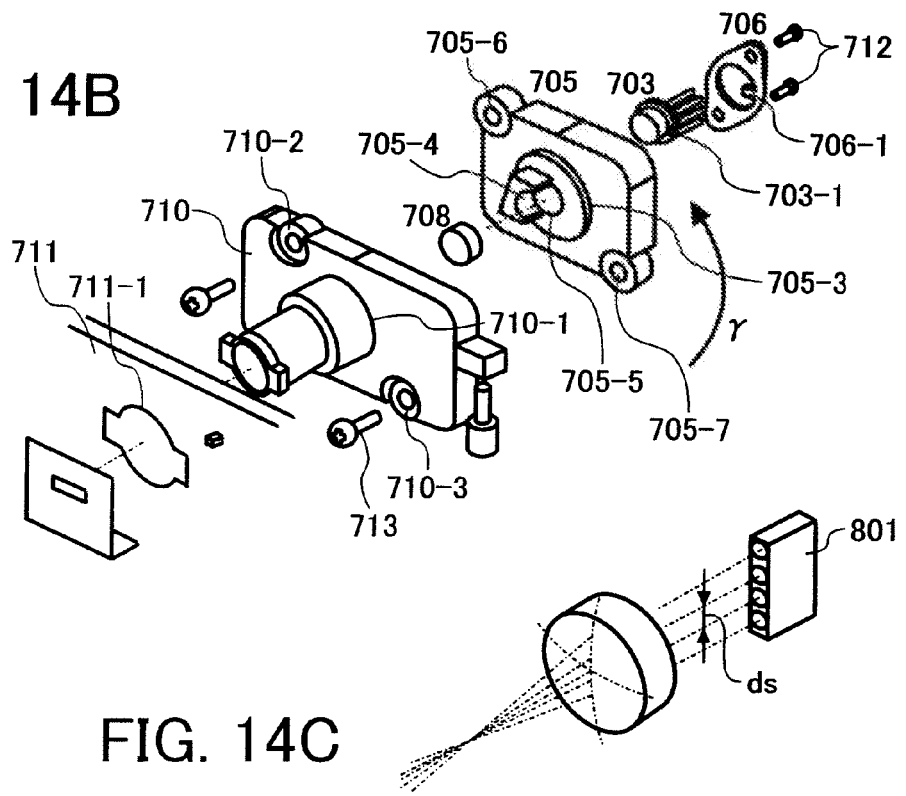
FIG. 14C BEAM SPOT DIAMETER AFTER CORRECTION OF WAVE FRONT ABERRATION BY SPECIAL TILTED AND DECENTERED SURFACE BEAM SPOT DIAMETER AFTER CORRECTION OF WAVE FRONT ABERRATION BY SPECIAL TILTED AND DECENTERED SURFACE BEAM SPOT DIAMETER AFTER CORRECTION OF WAVE FRONT ABERRATION BY SPECIAL TILTED AND DECENTERED SURFACE BEAM SPOT DIAMETER AFTER CORRECTION OF WAVE FRONT ABERRATION BY SPECIAL TILTED AND DECENTERED SURFACE EXAMPLE FOR COMPARISON ( a )

EXAMPLE FOR COMPARISON ( b )

MAIN SCANNING BEAM SPOT ( FOR GRAPH )

SECONDARY SCANNING BEAM SPOT ( FOR GRAPH )

OPTICAL SCANNING UNIT AND IMAGE FORMING APPARATUS

CROSS-REFERENCE TO RELATED APPLICATIONS

The present document is a divisional application of U.S. patent application Ser. No. 10/942,907 filed on Sep. 17, 2004. It incorporates by reference, the entire contents of Japanese priority documents, 2003-329125 filed in Japan on Sep. 19, 2003, 2003-377253 filed in Japan on Nov. 6, 2003, 2004-12369 filed in Japan on Jan. 20, 2004, and 2004-230677 filed in Japan on Aug. 6, 2004.

BACKGROUND OF THE INVENTION

1) Field of the Invention

The present invention relates to a technology for optical scanning in an image forming apparatus.

2) Description of the Related Art

An optical scanning unit is widely known due to its association with a laser printer etc. In general, the optical scanning unit is constructed to function in the following manner. A light beam from a light source is caused to be deflected by a light deflector. The deflected light is focuses towards a scanning surface by a scanning-imaging optical system that includes components such as an fθ lens and a light spot is formed on the scanning surface. The light spot is scanned optically on the scanning surface. This optical scanning is called as main scanning. The scanning surface is a photosensitive surface of a photoconductive photosensitive medium of a photosensitive drum and a photosensitive belt etc.

An image forming apparatus that includes four photosensitive drums arranged in a direction of transporting of a recording paper to form an image for each color component is known as an example of a full-color image forming apparatus. In such an image forming, the image forming apparatus includes a plurality of light sources, which are provided corresponding to each of the photosensitive drums. Light beams demodulated according to an image signal for each color component are emitted from the plurality of light sources. The light beams emitted are subjected to deflection scanning by one light deflector. Latent images are formed by exposing simultaneously, on each of the photosensitive drums by the scanning imaging optical system corresponding to each photosensitive drum. The latent images are visualized in a developing unit by using developers of different colors such as yellow, magenta, cyan, and black. The visualized images are transferred on the same recording paper by superimposing one after another and fixed, thereby obtaining a color image.

Thus, an image forming apparatus in which a two-color image, a multi-color image, or a color image is obtained by using two or more than two combinations of optical scanning units and photosensitive drums is known as a tandem image forming apparatus.

An apparatus in which a plurality of photosensitive media shares a single light deflector is known as such a tandem image forming apparatus. The following are various types of apparatuses known in which the single light deflector is used jointly.

(1) Plurality of optical scanning units corresponding to a plurality of photosensitive drums—A method of scanning by using the same number of optical scanning units as the photosensitive drums, and synchronizing the light deflectors for all the optical scanning units has been disclosed in, for example, Japanese Patent Application Laid-open Publication No. 2001-305826.

(2) Scanning in opposite directions in which light beams are incident from both sides of the light deflector and deflection-scanning is performed by dividing into two directions—A method in which a plurality of light beams, which are substantially parallel and separated apart in a secondary scanning direction, is incident on the light deflector and the scanning is performed by a plurality of scanning optical elements arranged in the secondary scanning direction corresponding to the plurality of light beams has been disclosed in, for example, Japanese Patent Application Laid-open Publication No. H9-54263, Japanese Patent Application Laid-open Publication No. H11-157128, and Japanese Patent Application Laid-open Publication No. H9-127443.

(3) One side scanning in which light beams are incident from one side of the light deflector and the deflection scanning is performed in one direction—A method in which a plurality of light beams heading towards different scanning surfaces pass through a first optical element L1, a second optical element L2, and a third optical element L3 is provided for each optical beam that heads towards each of the scanning surfaces has been disclosed in, for example, Japanese Patent Application Laid-open Publication No. 2001-4948, Japanese Patent Application Laid-open Publication No. 2001-10107, and Japanese Patent Application Laid-open Publication No. 2001-33720.

Thus, if the light deflector is used jointly for the plurality of light beams reaching the plurality of scanning surfaces, the number of light deflectors can be reduced. This enables to make an optical scanning unit and an image forming apparatus in which the optical scanning unit is used, compact in size and to reduce the cost.

Recently, in an optical scanning unit of a color image forming apparatus, a technology that uses an oblique incidence optical system as a single light deflector to reduce cost has been known (see, for example, Japanese Patent Application Laid-open Publication No. 2003-5114). In the oblique incidence optical system, light beams are allowed to be incident on a deflecting and reflecting surface of the light deflector at an angle in the secondary scanning direction. In the oblique incidence optical system, after the plurality of light beams is deflected and reflected at the respective deflecting and reflecting surfaces, the beams are separated by a reflecting mirror to individual beams and guided to scanning surfaces, which are surfaces of photosensitive drums corresponding to each of the light beams. At this time, the angle of incidence of each beam in the secondary scanning direction, or in particular, an angle of oblique incidence on the light deflector is set to an angle that enables to separate each light beam at the mirror. By using this oblique incidence optical system, it is possible to secure a distance between adjacent light beams in the secondary scanning direction which can be separated by the mirror without increasing a size of the light deflector, i.e. without using a multi-stage and thick polygon mirror.

Further, according to the oblique incidence optical system, if a case of using the polygon mirror (a rotating polygon mirror) as a light deflector is taken into consideration, in a method of incidence that is used normally, it is difficult to cause the light beams from the light source to be incident towards an axis of rotation of the polygon mirror. Although, it is not impossible to cause the light beams from the light source to be incident towards the axis of rotation of the polygon mirror, when the light beams are caused to be incident towards the axis of rotation, if an attempt is made to secure a required angle of deflection, each of the individual deflecting and reflecting surfaces become extremely big. Due to this, in the method of incidence that is used normally, the size of the polygon mirror cannot be reduced. Moreover, this gives rise to considerable amount of the so called sag, and the sag that is developed is asymmetrical to an image height: 0. Further, as the size of the polygon mirror becomes bigger, a large amount of energy is required for high-speed rotation and when the polygon mirror is rotated at a high speed, there is a loud wind noise and the size of a sound-proofing unit has to be made bigger.

Whereas, in the oblique incidence optical system, the light beams from the light source can be caused to be incident towards the axis of rotation of the polygon mirror, the size of the polygon mirror can be reduced and the wind noise when the polygon mirror is rotated is low. Therefore, the oblique incidence optical system is suitable to be used for high speed. Since the size of the polygon mirror can be reduced, the amount of sag that is developed is small, and the sag that is developed can be made to be symmetrical with the image size: 0. Therefore, it is easy to make a correction.

However, on the other hand, in the method of oblique incidence, bending of scanning lines is a big problem. An amount of bending of scanning lines that is developed varies depending on the angle of incidence of each light beam in the secondary scanning direction. A latent image that is drawn by each light beam on each photosensitive drum is developed by a toner of the corresponding color and then superimposed and visualized. When the latent image is visualized, the amount of bending of scanning lines appears as a color shift and deteriorates an image quality. Moreover, by the oblique incidence, the light beam is twisted and incident on a scanning lens, thereby increasing wave front aberration and causing remarkable deterioration of an optical performance particularly in a peripheral image height. This, results is thickening of a beam spot diameter, which hinders forming of an image of high quality. Further, in the oblique incidence, since the light beams from the light source are caused to be incident towards the axis of rotation of the polygon mirror, if the light source is disposed in a position overlapping an optical axis of the scanning lens in the main scanning direction, the angle of oblique incidence becomes wider to avoid interference with the scanning lens.

As a method of correcting the substantial bending of scanning lines, which is peculiar to the oblique incidence, a method that includes in the scanning imaging optical system, a lens that has a lens surface in which a proper inclination of the lens surface in a secondary scanning cross section is changed in the main scanning direction to correct the bending of the scanning lines (see, for example, Japanese Patent Application Laid-open Publication No. H11-14932) or a method that includes in the scanning imaging optical system, a correcting and reflecting surface that has a reflecting surface in which the proper inclination of the reflecting surface in the secondary scanning cross section is changed in the main scanning direction to correct the bending of the scanning lines have been proposed (see, for example, Japanese Patent Application Laid-open Publication No. H11-38348).

A problem in the oblique incidence at present is that, there is a tendency of substantial deterioration of the wave front aberration near the peripheral image height, in other words near both edges of the scanning lines due to skew rays. If there is such a wave front aberration, the spot diameter of an optical spot in the peripheral image height becomes bigger. If this problem cannot be solved, an optical scanning of high density which has been much sought after recently cannot be realized. In optical scanning units disclosed in Japanese Patent Application Laid-open Publication No. H11-14932 and Japanese Patent Application Laid-open Publication No. H11-38348, although the substantial bending of the scanning lines which is peculiar to the oblique incident has been corrected quite satisfactorily, the correction of the wave front aberration cannot be said to be sufficient.

The deterioration of the wave front aberration and the bending of the scanning lines can be said to be the problems in the oblique incidence. An optical scanning unit that can correct these two satisfactorily, including a plurality of rotating asymmetrical lenses in the scanning imaging optical system where a shape of a main line that connects vertices of a sub line of lens surfaces of the rotating asymmetrical lenses is bent in the secondary scanning direction, has been proposed (see, for example, Japanese Patent Application Laid-open Publication No. H10-73778).

However, a lens that has a lens surface, which is bent in the secondary scanning direction the shape of the main line that connects the vertices of the sub line that is used in the invention disclosed in the Japanese Patent Application Laid-open Publication No. H10-73778 is required to have greater lens width in the secondary scanning direction since the main line is bent. Particularly, in a lens surface having a bigger curvature, an amount of bending of the main line for correcting the bend in the scanning lines, the lens width is to be increased substantially. Moreover, since the lens has a curvature in the secondary scanning direction, when the lens rotates around an optical axis, there is more deterioration of the wave front aberration. If the main line is caused to be bent in a case of a toric surface that has a bend of the secondary scanning direction different from the main scanning direction, a shape in the main scanning direction changes according to height of the secondary scanning direction, and if a position of incidence of the light beam in the secondary scanning direction is shifted due to a change in temperature and an error in assembling of optical elements, there is a substantial change in magnification error. As a result, in the color image forming apparatus, a beam spot position between each of the colors is shifted, thereby resulting in a color shift.

Next, reduction in the color shift to obtain a high quality image is taken into consideration. To solve the problems described so far and to improve scanning characteristics, a use of a special surface that is typified by an aspheric surface, has been generalized. Optical elements made of resin that enables to form such a surface easily and which are low cost have been used a lot. Particularly, in the tandem image forming apparatus, since the number of the optical elements used is more, the cost is reduced substantially by using the optical elements made of resin.

However, if the optical elements made of resin are used in the optical scanning unit, since the resins have a coefficient of thermal expansion greater than that of glass, there is a substantial amount of change in a shape due to a change in temperature, resulting in a change in optical characteristics of the optical elements made of resin. Since the optical scanning unit includes a light deflector such as a polygon mirror that generates a substantial amount of heat, when the temperature in an optical box rises due to the light deflector, because of an air flow caused by the rotation of the polygon mirror, and a difference in the shape inside the optical box, the heat is not transmitted uniformly and the temperature in the optical box is not uniform everywhere. Moreover, regarding the scanning lens, due to a difference in transmission of heat, a difference in shape of the lens, and a difference in installation area in the optical box, the temperature change is not uniform and there is a difference in temperature where the scanning lens is disposed.

In the tandem image forming apparatus, light beams heading towards each of the photosensitive drums pass through different scanning lenses, and due to the temperature distribution in the optical box that holds the scanning lenses, there is a different temperature distribution between each of the scanning lenses, due to which the change in the shape and a change in the refractive index of the scanning lens is non-uniform. Therefore, an amount of change in the length of the scanning lines and a change in a constant velocity is different for each of the photosensitive drums. When latent images formed on the photosensitive drums by such an optical scanning are visualized by a developing unit that uses developers of different colors such as yellow, magenta, cyan, and black, then the visualized images are transferred by superimposing the images one after another on the same recording paper and fixed to obtain a color image, there is an occurrence of the so called color shift. Particularly when a scanning lens made of resin is used as a scanning lens that is nearest to the light deflector such as a polygon mirror, which generates substantial amount of heat in the optical box, there is a substantial change in the optical characteristics.

Moreover, when images are printed out continuously, particularly when the number of images printed out is more, due to the heat generated by the light deflector, the temperature in the unit (temperature in the optical box) goes on increasing. Therefore, the temperature distribution of each lens changes, resulting in the color shift in the images output and an amount of the color shift goes on changing. As a result, there is a change in a hue due to the color shift in the first image and the last image printed out.

As a method to cope with the change in the scanning length, a method in which a light receiving unit is disposed on a writing-start side and a writing-end side in the main scanning direction, and an image frequency of each light beam is adjusted based on a difference in time of receiving of light by each of the light receiving units is disclosed in Japanese Patent Application Laid-open Publication No. H9-58053. If an attempt is made to use this method in the tandem image forming apparatus that uses a light deflector jointly for the plurality of scanning surfaces, a space is required for disposing the light receiving units on the writing-end edge side and it is even more difficult to secure effective writing width. Moreover, in the method in which the light receiving unit is disposed on the writing-start side and the writing-end side, and the image frequency of each light beam is adjusted based on the difference in time of receiving of light by each of the light receiving units, the length of the scanning lines in each photosensitive drum can be corrected, but the change in the constant velocity caused due to the temperature distribution of each scanning lens cannot be corrected. Therefore, even if a dot position in a writing-start position and a writing-end position in the main scanning direction is corrected in each of the photosensitive drums, the dot in between the main scanning direction does not coincide and there is an occurrence of color shift.

In the tandem optical scanning unit, to solve this problem, in many cases where the scanning lens that is nearest to the light deflector like a polygon mirror, which generates heat, is made of glass, and the cost goes up substantially as compared to that when the scanning lens made of resin is used.

The following are the characteristics and issues of the tandem image forming apparatuses according to items 1 to 3.

(1) A method of using a plurality of optical scanning units corresponding to the plurality of photosensitive drums—Being a different optical scanning unit, due to a difference in a shape of the optical elements and due to environments of different temperature and moisture, there is a relative shift in a beam position in each scanning surface and it is susceptible to occurrence of color shift.

(2) A method of scanning in opposite directions in which the light beams are incident from both sides of the light deflector and the deflection scanning is performed by dividing into two directions—The size of the optical scanning unit can be reduced easily as compared to that in item (1) and a high cost polygon scanner can be used jointly for four colors, thereby proving it to be favorable for cost reduction. On the other hand, in the system for the scanning in opposite directions with the polygon at the center, due to the difference in the shape of the optical elements and due to the environments of different temperature and moisture, there is a relative shift in a beam position in each scanning surface and it is susceptible to the occurrence of color shift.

(3) A method of one side scanning in which light beams are incident from one side of the light deflector and the deflection scanning is performed in one direction—Since each light beam corresponding to each color (Yellow (Y), Magenta (M), Cyan (C), and Black (K)) passes jointly through a scanning lens (a first lens) in common that has power mainly in the main scanning direction, the difference in the shape of optical elements is not much and the environments of the temperature and moisture are almost the same. Therefore, the change in the relative position of the beam spot (in other words, color shift) in the main scanning direction of each color is difficult to occur. On the other hand, the following issues are there.

(1) In a case of the optical element through which the light beams corresponding to each color (Y, M, C, and K) pass jointly, since the lens height in a direction corresponding to the secondary scanning increases, it is difficult to compensate for a difference in profile irregularity of each light beam, thereby reducing the size of a diameter of the beam spot. Moreover, it is necessary to reduce an increased cost resulted due to an increase in formation time caused by thickening.

(2) Since the light beam corresponding to each color (Y, M, C, and K) is incident on the same deflecting mirror surface, there is an increase in the thickness of the polygon mirror resulting in an increase in the size of the light deflector and the apparatus. This also results in a wind loss, thereby causing noise, increased power consumption, and deterioration of durability.

(3) To separate each light beam corresponding to each color (Y, M, C, and K), the structure is such that each light beam is allowed to be incident obliquely on the light deflector mirror surface. Therefore, due to skew of the light beam caused by the deflection at the polygon mirror, the wave front aberration is susceptible to deterioration and there is a decrease in the size of the beam spot diameter. Moreover, due to the bending of the scanning lines on an image carrier (photosensitive drum), an adjustment to correct the bending of scanning lines is indispensable.

SUMMARY OF THE INVENTION

It is an object of the present invention to solve at least the above problems in the conventional technology.

An optical scanning unit according to one aspect of the present invention includes a light source that emits a light beam; a light deflector that deflects the light beam from the light source; and a scanning optical system that focuses the light beam deflected by the light deflector on a scanning surface. The light beam from the light source is at an angle in a secondary scanning direction with respect to a normal to a reflecting surface of the light deflector. At least one surface of the scanning optical system does not have a curvature in the secondary scanning direction, being tilted and decentered in the secondary scanning direction.

An optical scanning unit according to another aspect of the present invention includes a plurality of light sources that emits a plurality of light beams; a light deflector that is common to the light beams, and deflects each of the light beams from the light sources; and a scanning optical system that focuses each of the light beams deflected by the light deflector on a corresponding scanning surface. The light beams from the light sources include a light beam that makes an angle in a secondary scanning direction with respect to a normal to a reflecting surface of the light deflector and a light beam that is horizontal in the secondary scanning direction with respect to the normal to the reflecting surface of the light deflector.

An optical scanning unit according to still another aspect of the present invention includes a pair of optical scanning devices. Each of the optical scanning devices includes a plurality of light sources that emits a plurality of light beams; a light deflector that is common to the light beams, and deflects each of the light beams from the light sources; and a scanning optical system that focuses each of the light beams deflected by the light deflector on a corresponding scanning surface. The light beams from the light sources include a first light beam that makes an angle in a secondary scanning direction with respect to a normal to a reflecting surface of the light deflector and a second light beam that is a horizontal beam in the secondary scanning direction with respect to the normal to the reflecting surface of the light deflector. A scanning lens or a part of a scanning lens corresponding to the light beam that makes an angle with respect to the normal to the reflecting surface of the light deflector includes a surface that does not have a curvature in the secondary scanning direction and at least one surface that is tilted and decentered in the secondary scanning direction. A shape of a surface that includes the special decentered-surface with a tilt in the secondary scanning direction is horizontal with respect to the normal to the reflecting surface of the light deflector, and is symmetric with respect to a surface that includes a center of the light beams that are reflected by the reflecting surface of the deflector in the secondary scanning direction to scan in the same direction.

An image forming apparatus according to still another aspect of the present invention includes an optical scanning unit that performs an optical writing on an image carrier to form a latent image on the image carrier. The optical scanning unit includes a light source that emits a light beam; a light deflector that deflects a light beam from a light source; and a scanning optical system that focuses the light beam deflected by the light deflector on a scanning surface. The light beam from the light source is at an angle in a secondary scanning direction with respect to a normal to a reflecting surface of the light deflector. At least one surface of the scanning optical system does not have a curvature in the secondary scanning direction, being tilted and decentered in the secondary scanning direction.

An image forming apparatus according to still another aspect of the present invention includes an optical scanning unit that performs an optical writing on an image carrier to form a latent image on the image carrier. The optical scanning unit includes a plurality of light sources that emits a plurality of light beams; a light deflector that is common to the light beams, and deflects each of the light beams from the light sources; and a scanning optical system that focuses each of the light beams deflected by the light deflector on a corresponding scanning surface. The light beams from the light sources include a light beam that makes an angle in a secondary scanning direction with respect to a normal to a reflecting surface of the light deflector and a light beam that is horizontal in the secondary scanning direction with respect to the normal to the reflecting surface of the light deflector.

An image forming apparatus according to still another aspect of the present invention includes an optical scanning unit that performs an optical writing on an image carrier to form a latent image on the image carrier. The optical scanning unit includes a multibeam light source that emits a plurality of light beams; a light deflector that deflects the light beams from the multibeam light source; and a scanning optical system that focuses the light beams deflected by the light deflector on a scanning surface. The light beams from the multibeam light source are at an angle in a secondary scanning direction with respect to a normal to a reflecting surface of the light deflector. At least one surface of the scanning optical system does not have a curvature in the secondary scanning direction, being tilted and decentered in the secondary scanning direction.

An image forming apparatus comprising an optical scanning unit that performs an optical writing on an image carrier to form a latent image on the image carrier. The optical scanning unit includes a multibeam light source that emits a plurality of light beams; a light deflector that is common to the light beams, and deflects each of the light beams from the multibeam light source; and a scanning optical system that focuses each of the light beams deflected by the light deflector on a corresponding scanning surface. The light beams from the light sources include a light beam that makes an angle in a secondary scanning direction with respect to a normal to a reflecting surface of the light deflector and a light beam that is horizontal in the secondary scanning direction with respect to the normal to the reflecting surface of the light deflector.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 14A is a perspective view of an example of a light source included in a multi-beam light source;

FIG. 14B is a perspective view of an example of a light source included in the multi-beam light source;

FIG. 14C is a perspective view of an example of a light source included in the multi-beam light source;

DETAILED DESCRIPTION

Exemplary embodiments of an optical scanning unit and an image forming apparatus according to the present invention are explained in detail with reference to the accompanying drawings. Although the invention has been described with respect to specific embodiments, the present invention is not to be limited but to be construed as embodying all modifications and alternative constructions that may occur to one skilled in the art which fairly fall within the basic teachings herein set forth.

The following is a description of an optical scanning unit and an image forming apparatus according to a first embodiment with reference to FIGS. 1 to 21.

Figure 1A:
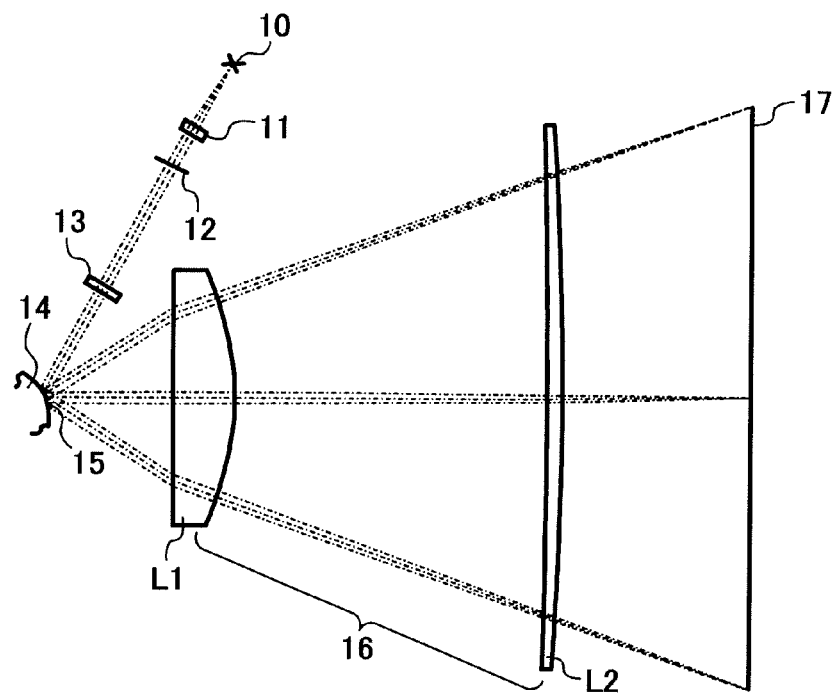
FIG. 1A, which is a top view as viewed from a direction corresponding to a main scanning direction, is an illustration of an optical scanning unit according to a first embodiment of the present invention.
Figure 1B:
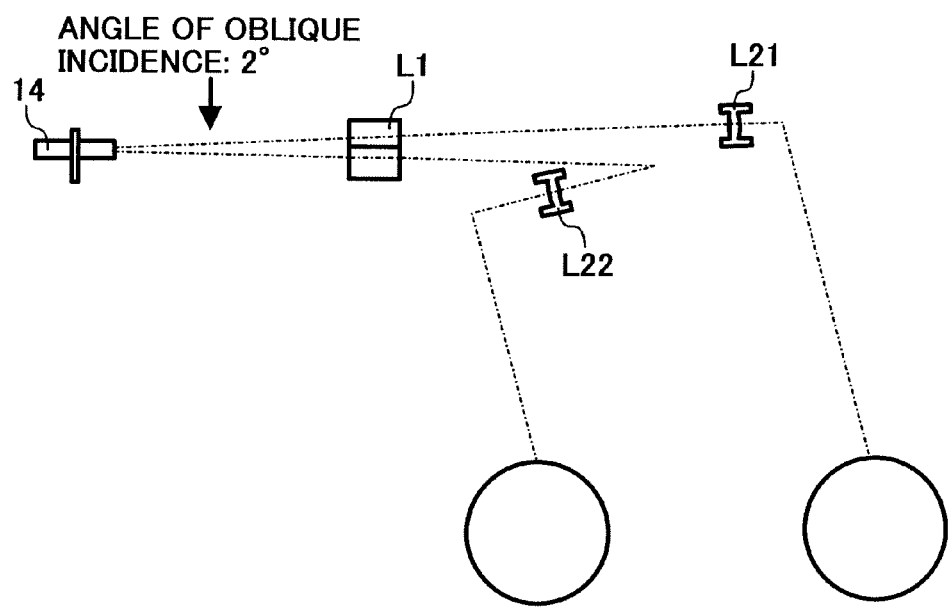
FIG. 1B, which is a front view as viewed from a direction corresponding to a secondary scanning direction, is an illustration of the optical scanning unit according to the first embodiment of the present invention.

FIGS. 1A and 1B are diagrams for illustrating an example of the optical scanning unit. FIG. 1A is a top view as viewed from a direction corresponding to a main scanning direction and FIG. 2A is a front view as viewed from a direction corresponding to a secondary scanning direction. In FIG. 1A, a semiconductor laser 10 is a light source, which emits a divergent light beam. The light beam emitted from the semiconductor laser 10 is converted to a light beam form that is suitable for an optical system here onward, by a coupling lens 11. The light beam form that is converted by the coupling lens 11 may be a parallel light beam or a light beam of a weak divergence or a light beam of a weak convergence. The light beam from the coupling lens 11 upon passing through a diaphragm 12 is focused in the secondary scanning direction by a cylindrical lens 13 and then incident on a deflecting and reflecting surface of a light deflector. According to the first embodiment, a polygon mirror (rotating polygon mirror) 14 that is driven at a high speed and at a constant rotational speed is used as the light deflector and the light beam is caused to be incident on a deflecting and reflecting surface of the polygon mirror 14. In this case, the cylindrical lens 13 is let to be a first optical system, and a scanning optical system 16 that is described later is let to be a second optical system. The polygon mirror 14 is included in the light deflector. The light beam from the semiconductor laser 10 is incident at an angle with respect to a plane A that includes a normal of a deflecting and reflecting surface of the polygon mirror 14. In other words, the light beam from the semiconductor laser 10 is incident obliquely in the secondary scanning direction with respect to a deflecting and reflecting surface 15. Therefore, light beam that is reflected from the deflecting and reflecting surface 15 as well, is inclined with respect to the plane A. In an example shown in FIG. 1B, a plurality of light beams are emitted from the light source and each light beam is deflected at the common deflecting and reflecting surface 15. For allowing the light beam to be inclined at an angle with respect to the normal of the deflecting and reflecting surface of the polygon mirror (to cause to be incident obliquely in the secondary scanning direction), each of the light source, a coupling optical system, and the first optical system may be inclined as desired or the light beam heading toward the deflecting and reflecting surface 15 may be caused to be inclined at an angle in the secondary scanning direction by tilting a reflecting mirror. Moreover, the optical beam heading for the deflecting and reflecting surface 15 may be caused to be inclined at an angle by shifting an optical axis of the first optical system in the secondary scanning direction.

Each of the light beams that is reflected from the deflecting and reflecting surface 15 is deflected at a constant angular speed with the constant rotation of the polygon mirror, then passes through lenses L1 and L2, and reach a respective scanning surface 17 which is different for each beam. The lenses L1 and L2 are included in a scanning imaging optical system 16 and the deflected beam is focused towards the scanning surface 17. This results in a formation of an optical spot on the respective scanning surface 17 and scans the scanning surface 17. FIG. 1B illustrates a positional relationship from the deflecting and reflecting surface 15 of the polygon mirror 14 to the lenses L1 and L2 and to the scanning surface 17.

If a method in which the optical beam with respect to the deflecting and reflecting surface is incident at right angles is let to be a method of normal incidence, corresponding to the method of normal incidence, in a conventional method in which the light beam is caused to be incident obliquely in the secondary scanning direction, there is a substantial bending of scanning lines. An amount of bending of the scanning lines differs according to an angle of oblique incidence of each beam in the secondary scanning direction. Latent images that are drawn on surfaces of photosensitive drums which are the scanning surfaces 17 are visualized by developing by toner of each color and then superimposed one after another. The amount of bending of the scanning lines appears as a color shift when these images are superimposed. Moreover, by allowing the light beam to be incident obliquely, the light beam is twisted and incident on the scanning imaging optical system 16 and there is an increase in wave front aberration and a remarkable deterioration of optical performance in a peripheral image height. This results in thickening of the beam spot diameter and hinders forming of an image of a high quality.

According to the present invention, the wave front aberration and the bending of the scanning lines is corrected by using a tilted decentered surface on at least one surface of the scanning optical system. The correction of the bending of the scanning lines and the wave front aberration can be made by causing tilting and decentering of a surface of the scanning lens in the secondary scanning direction. By balancing a scanning position in the secondary scanning direction between image heights and the wave front aberration that is deteriorated, the wave front aberration and the scanning position in each image height is corrected, thereby correcting satisfactorily the thickening of the beam spot diameter that is caused due to the bending of the scanning lines on the scanning surface and the deterioration of the wave front aberration.

However, since an amount of deterioration of the wave front aberration due to an amount of twisting (amount of skew) of the light beam that is incident on the surface of the lens, an amount of change of an object point between the image heights in the secondary scanning direction due to the oblique incidence on the polygon mirror, and a distance from the deflecting and reflecting surface to the surface of the lens in the scanning optical system varies between the image heights, it is not possible to correct completely the wave front aberration and the bending of the scanning lines. In view of this, the present invention enables to correct the wave front aberration and the bending of the scanning lines more satisfactorily by using the special tilted and decentered surface on at least one surface of the scanning optical system.

The special tilted and decentered surface is a special surface that includes a surface, which does not have a curvature in the secondary scanning direction and it's angle of decentering (amount of tilting) in a breadth wise direction (secondary scanning direction) differs according to a lens height in a longitudinal direction (main scanning direction). The amount of tilting of the special tilted and decentered surface (angle of decentering) is an angle of inclination in the widthwise direction with respect to a plane that is at right angles to an optical axis (central axis) of the lens. In other words, when the amount of tilting is zero, the special tilted and decentered surface is a plane that is at right angles to the optical axis. The special tilted and decentered surface is formed to correct the bending of the scanning lines and the wave front aberration in the scanning surface.

A shape of the lens surface is determined according to the following equation for shape. However, the present invention is not restricted to the following shape equation and the same surface shape can be specified by using another equation for shape. The equation for shape of the special tilted and decentered surface that is used in a numerical example that is described later is as shown below. Here, including the optical axis, a paraxial radius of curvature in a main scanning direction cross section which is a plane cross section parallel to the main scanning direction is denoted by RY, a distance from the optical axis in the main scanning direction is Y, higher order coefficients are A, B, C, D, . . . , and a paraxial radius of curvature in a secondary scanning direction cross section which is at right angles to the main scanning direction cross-section, is denoted by RZ.

$$X(Y, Z) = \frac{Y^2 \cdot Cm}{1 + \sqrt{1 - (1+K) \cdot (Y \cdot Cm)^2}} + A \cdot Y^4 + B \cdot Y^6 + \quad (1)$$

$$C \cdot Y^8 + D \cdot Y^{10} + E \cdot Y^{12} + \frac{Cs(Y) \cdot Z^2}{1 + \sqrt{1 - (Cs(Y) \cdot Z)^2}} +$$

$$(F0 + F1 \cdot Y + F2 \cdot Y^2 + F3 \cdot Y^3 + F4 \cdot Y^4 + \ldots)Z$$

where, $Cm=1/RY$ and $Cs(Y)=1/Rz$.

$(F0+F1 \cdot Y+F2 \cdot Y^2+F3 \cdot Y^3+F4 \cdot Y^4+ \ldots )Z$ expresses the amount of tilting and when there is no tilting, F0, F1, F2, . . . are all zero. When F1, F2, . . . are not zero, the amount of tilting changes in the main scanning direction.

In the scanning lens that is used jointly for light beams from a plurality of light sources described later, a light beam that is at an angle with a normal of the deflecting and reflecting surface passes through a position that is at a distance from a center of the breadth wise direction of the lens (secondary scanning direction) towards the secondary scanning direction. At this time, regarding the shape of the surface, including the position at which the light beam heading for image height 0 passes through the special tilted and decentered surface, a ray that is horizontal with the normal of the deflecting and reflecting surface is let to be the optical axis used in the description of the Eq. (1).

Figure 2:
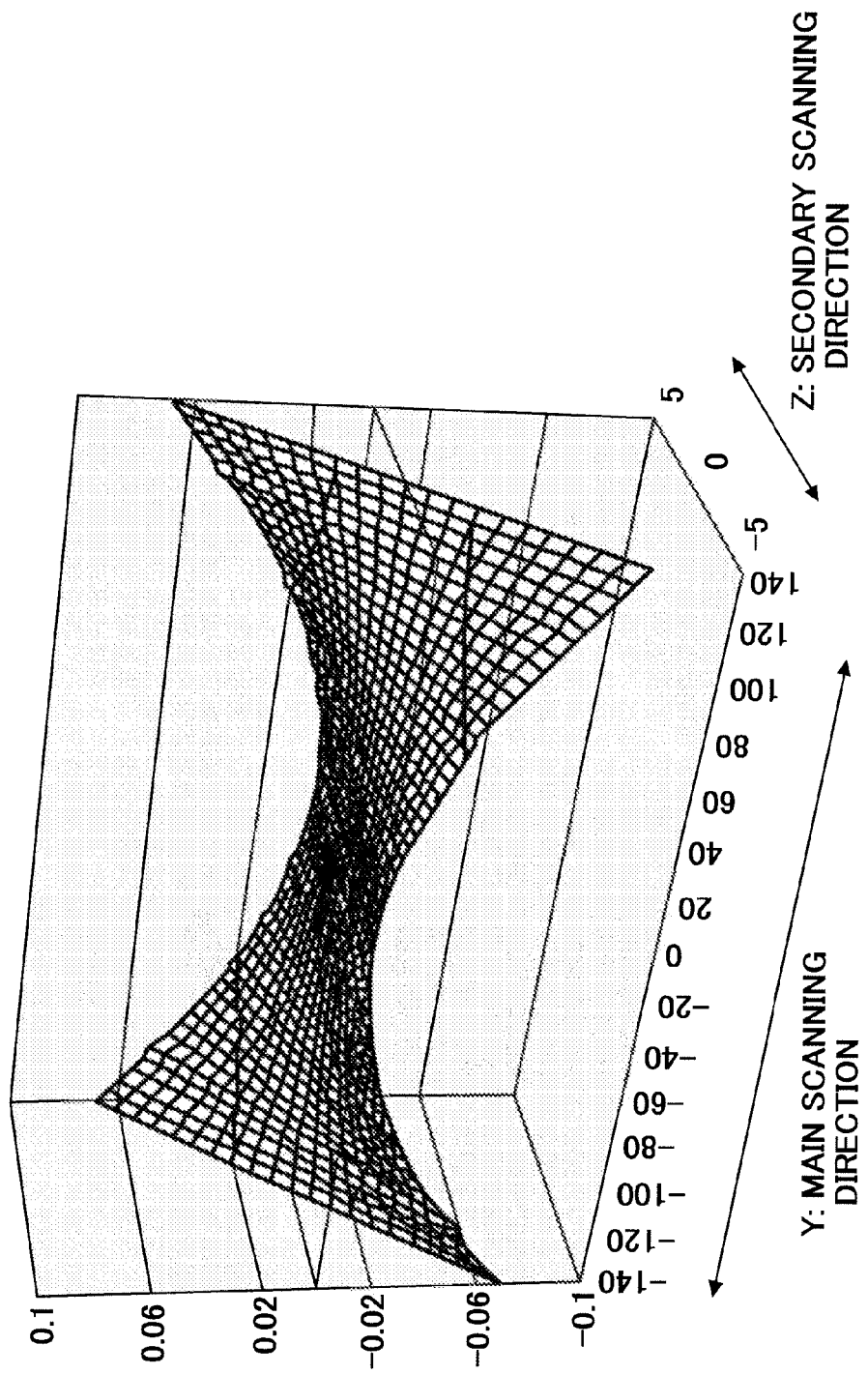
FIG. 2 is a graph of an example in which an amount of tilting of a secondary scanning cross-sectional shape in a special tilted surface used in the present invention changes in the main scanning direction.

FIG. 2 is a graph of an example in which an amount of tilting of the secondary scanning cross sectional shape in the special tilted surface expressed in the equation changes in the main scanning direction. In FIG. 2, direction Y is the main scanning direction, i.e. the longitudinal direction of the lens surface, direction Z is the secondary scanning direction, i.e. the breadth wise direction of the lens surface. Unit used is mm. Moreover, to make the shape of the special tilted surface easily understandable, the shape in the main scanning direction is flat and the amount of tilting is more than the actual amount. According to the position of the main scanning direction, the inclination of the surface in the secondary scanning direction changes and the shape becomes a twisted shape as a whole. There is not tilting and decentering on the optical axis in the secondary scanning direction.

By using such a surface for a scanning lens near the polygon mirror and a scanning lens near the scanning surface, the deterioration of a beam spot diameter caused due to the deterioration of the wave front aberration, the thickening of the beam spot diameter in the peripheral image height, and the bending of the scanning lines can be corrected satisfactorily. The special decentered surface of the lens on a side of the polygon mirror with a larger diameter of the light beam corrects mainly the wave front aberration and the special decentered surface of the scanning lens on a side of the scanning surface corrects mainly the bending of the scanning lines, thereby enabling the correction of both the optical performances.

Thus, by using the special tilted and decentered surface for the scanning lens near the polygon mirror and the scanning lens near the scanning surface and by separating the functions of correcting the wave front aberration and correcting the bending of the scanning lines, further reduction in the diameter of the beam spot and a satisfactory correction of the color shift by reducing the bending of the scanning lines is possible.

Moreover, by making the shape of the surface of the tilted decentered surface and the shape of the special tilted and decentered surface in the secondary scanning direction, a flat surface without curvature, as compared to a case with curvature, when the same lens rotates around the optical axis center, the deterioration of the wave front aberration can be suppressed.

Particularly, in a case of a toric surface that has a curvature in the secondary scanning direction different than that in the main scanning direction, if the main line is caused to be curved, the shape in the main scanning direction changes largely for each height in the secondary scanning direction and when a position of incidence of the light beam is shifted in the secondary scanning direction due to a temperature change and an error in an assembly of optical elements, there is a big change in a magnification error. As a result, in a color machine, the beam spot position between each color is shifted, thereby causing the color shift. However, according to the first embodiment of the present invention, by making the surface shape of the special tilted and decentered surface in the secondary scanning direction to be the flat shape without curvature, an error in the shape in the main scanning direction can be reduced for each height in the secondary scanning direction and the change in the magnification error when the position of incidence of the light beam is shifted in the secondary scanning direction can be reduced, thereby enabling to suppress the occurrence of the color shift.

As shown in FIG. 1A, by causing the light beam that is incident on the deflecting and reflecting surface 15 of the polygon mirror 14 to be incident at an angle in the main scanning direction to avoid interfering with the scanning lens L1, an angle of incidence in the secondary scanning direction can be set to be small. If an angle of oblique incidence in the secondary scanning direction is large, there is an increased deterioration of the optical performance and it becomes difficult to make the correction satisfactorily. Therefore, it is desirable that the light beam that is incident on the deflecting and reflecting surface 15 of the polygon mirror 14 is caused to be incident at an angle in the main scanning direction.

In the example shown in FIGS. 1A and 1B, the lenses included in the scanning optical system are arranged in such a manner that the plurality of light beams heading for different scanning surfaces passes through the scanning lens L1 that is nearest to the polygon mirror 14 which is a light deflector. Therefore, it is possible to suppress the deterioration of an image caused due to hue and color shift between different scanning surfaces. The scanning lens L1 nearest to the light deflector has a strong positive refractive power in the main scanning direction and corrects the constancy of speed. By causing the plurality of light beams heading for the different scanning surfaces to pass through the scanning lens L1, the shift in the beam spot position in the main scanning direction due to a difference in processing of the lens becomes almost the same in the different scanning surfaces, thereby enabling to suppress the occurrence of color shift.

Substantial amount of heat is generated in the polygon mirror 14 which is a light deflector due to a motor section that drives the polygon mirror 14 and a circuit substrate. The temperature change in an optical box can be reduced by taking the substrate out from the optical box. However, it is difficult to discharge out the heat generated in the motor section and a rise in the temperature in the optical box due to the generation of heat in the motor section cannot be avoided. Due to a propagation of heat developed in the motor section to the optical box, there is a temperature distribution in the lenses in the scanning optical system, particularly in the scanning lens L1 that is nearest to the polygon mirror 14. The temperature distribution is mainly because of a non-uniform temperature change in the scanning lens that is caused particularly due to an air flow in the optical box due to the polygon mirror and the shape of the scanning lens. As a result, in the tandem image forming apparatus for scanning in opposite directions in which each beam heading for each of the scanning surfaces pass through a different scanning optical element, at the time of continuous printing, the relative beam spot position in the main scanning direction on each of the scanning surfaces changes, thereby changing the hue. The occurrence of the temperature distribution can be improved by sealing the polygon mirror hermetically and causing the light beam to be incident and emerged through a plane-parallel glass. However, in the scanning in opposite directions, it is difficult to match temperatures and the temperature distribution of the scanning lenses on both sides sandwiching the polygon mirror, thereby causing the color shift and the change in the hue.

In view of this, in an optical scanning unit according to another example according to the present invention, the scanning lens that is nearest to the light deflector is arranged such that all the light beams heading for different scanning surfaces pass through the scanning lens. This is called as one side scanning. In the one side scanning, even if the scanning lens has the temperature distribution in the main scanning direction, since the shape in the main scanning direction between the light beams heading for different scanning surface is the same, a change in a refractive power (change in the shape of the surface) in the main scanning direction due to the temperature distribution becomes the same. Therefore, the shift in the beam spot position in the main scanning direction is almost the same in different scanning surfaces, thereby enabling to suppress the color shift and the change in the hue at the time of continuous printing.

Figure 3A:
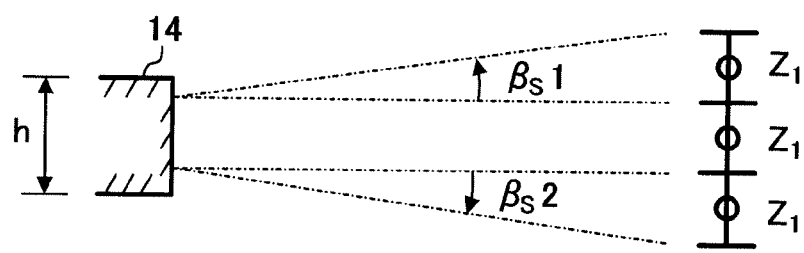
FIG. 3A is a schematic diagram of an example of an incidence form of a light beam on a light deflector shown from the direction corresponding to the secondary scanning direction.

As shown in FIG. 3A, an arrangement can be made such that the light beams from the plurality of light sources that are reflected from the deflecting and reflecting surface of the polygon mirror 14, are let to be a light beam incident parallel to (horizontal with) a surface that is horizontal with the normal of the deflecting and reflecting surface of the polygon mirror 14 (a surface that is perpendicular to the axis of rotation of the polygon mirror in the diagram), and a light beam that makes an angle i.e. light beams making an angle in the secondary scanning direction. Moreover, all the light beams are allowed to be incident on the scanning lens that is used jointly for all the light beams. Angles made by the light beam parallel to the plane horizontal with the normal of the deflecting and reflecting surface of the polygon mirror 14 with the light beam at an angle are denoted by βs1 and βs2 in FIG. 3A. By doing the arrangement in such a manner, as compared to a light deflector in a conventional optical scanning unit in which all the light beams are horizontal with (parallel to) the normal of the deflecting and reflecting surface of the polygon mirror 14, height h, i.e. height in the secondary scanning direction can be reduced substantially.

Figure 3B:
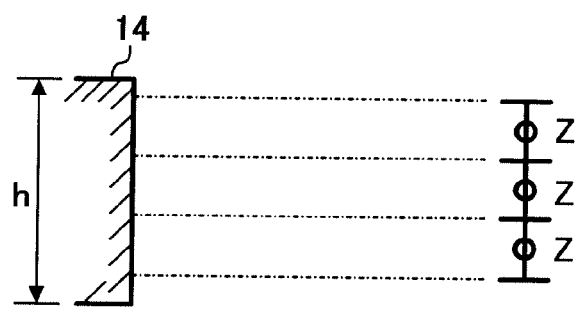
FIG. 3B is a schematic diagram of an example of the incidence of a light beam on the light deflector shown from the direction corresponding to the secondary scanning direction.
Figure 3C:
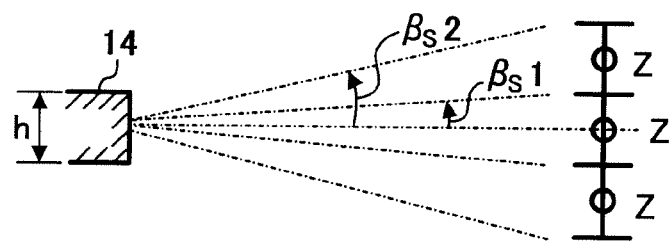
FIG. 3C is a schematic diagram of an example of the incidence of a light beam on the light deflector shown from the direction corresponding to the secondary scanning direction.

In the optical scanning unit according to the example, as shown in FIG. 1B, to guide the light beams from the plurality of light sources to different scanning surfaces corresponding to each light beam, after the light beams pass through the scanning lens that is used jointly for all the light beams, it is necessary to separate the light beams by bending in the secondary scanning direction. In such a case, as shown in FIG. 3B, in the conventional optical scanning unit in which all the light beams are horizontal with the normal of the deflecting and reflecting surface of the polygon mirror 14, although satisfactory optical performance is achieved on one hand, on the other hand it is necessary to maintain a distance that is required to separate the beams, i.e. from 3 mm to 5 mm in general, between the light beams that are guided to the different scanning surfaces. Therefore, there is an increase in height h of the light deflector (polygon mirror), an increase in an area of contact with air, thereby resulting in an increase in power consumption due to windage loss, an increase in noise, and an increase in cost. Particularly, among cost of components of the optical scanning unit, cost of the light deflector is high, thereby increasing the overall cost.

In view of this, in the example of the optical scanning unit according to the present invention, the light beams from the plurality of light sources that are reflected from the deflecting and reflecting surface 15 of the polygon mirror, are caused to be incident on the scanning lens that is used jointly for all the beams, as beams making an angle (in the secondary scanning direction) with the normal of the deflecting and reflecting surface 15 of the polygon mirror, thereby enabling to reduce substantially the height h of the polygon mirror 14 and solve the problems in the conventional optical scanning unit.

In an example shown in FIG. 3A, regarding beams which include the light beam that is horizontal with the normal of the deflecting and reflecting surface of the polygon mirror 14 and for the light beam that is making an angle (light beam that is incident obliquely), on a surface of incidence of the scanning lens that is used jointly for all the light beams, two light beams on a periphery (outer side) of the secondary scanning direction go on separating away and two light beams in a middle portion of the secondary scanning direction are parallel to each other as well as horizontal with the normal of the deflecting and reflecting surface of the polygon mirror 14. According to this example, as compared to a method in which all the light beams are caused to be incident obliquely as shown in an example shown in FIG. 3C, an angle of the light beam that is incident obliquely in the secondary scanning direction can be set to be small.

It is a known fact that in the conventional method of causing the light beam to be incident obliquely in the secondary scanning direction as against the normal incidence, by causing the light beams to be incident making an angle with the lens that is used jointly for all the beams, there is an increase in an amount of overall aberration and deterioration of the optical performance.

According to the present invention, as described in the first example, the deterioration of the optical performance is corrected by using the decentered surface or the special decentered surface. It is possible to suppress the deterioration of the optical performance by making the angle (an angle of oblique incidence in the secondary scanning direction) with respect to the deflecting and reflecting surface of the polygon mirror smaller, thereby realizing the satisfactory optical performance. This enables to achieve a stable beam spot diameter and is advantageous for an improvement in the image quality by reducing the beam spot diameter.

A polyhedron that forms the deflecting and reflecting surface of the polygon mirror may have a sufficient longitudinal length (thickness in the secondary scanning direction) to deflect a predetermined laser beam and it is desirable that the light beams separated by a predetermined distance in the secondary scanning direction are incident on different reflecting surfaces.

Figure 4:
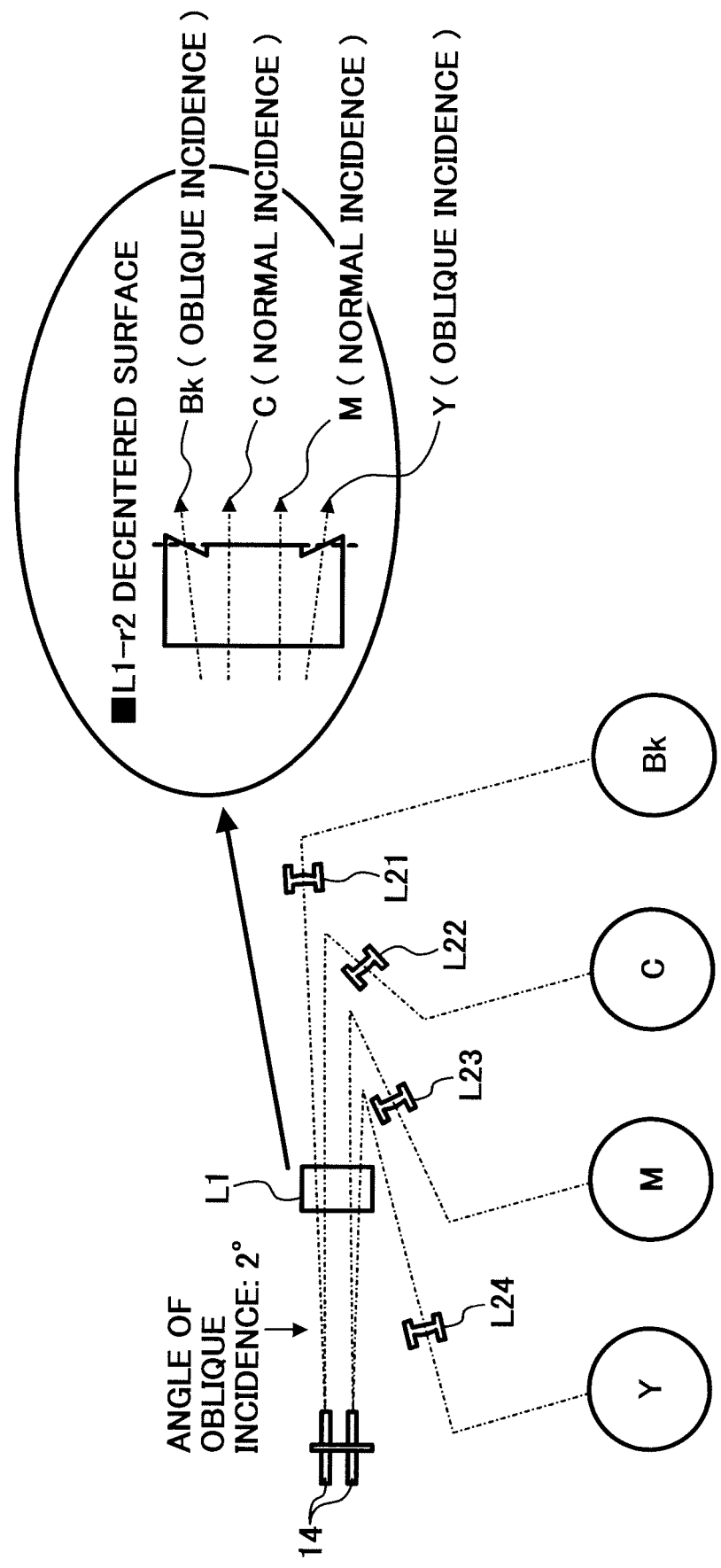
FIG. 4 is a schematic diagram of an example in which a special tilted and decentered surface is formed on a scanning lens that is used jointly for a plurality of light beams, showing from the direction corresponding to the secondary scanning direction.

As shown in FIG. 4, by dividing the polyhedron that forms the deflecting and reflecting surface in the secondary scanning direction and arranging in two stages (two-layers), the longitudinal length (thickness in the secondary scanning direction), an inertia of a rotating body can be reduced and a starting-time can be shortened.

Since the refractive power in the secondary scanning direction of the scanning lens nearest to the light deflector is zero or almost zero (close to zero), the scanning lens nearest to a side of the scanning surface has a strong positive refractive index. As a result, a secondary scanning magnification of the scanning imaging optical system turns into reduction, and the deterioration in performance due to an error in assembling of components and in shape of components can be suppressed. It is needless to state that the secondary scanning direction is conjugate with a base point of the light deflector and the scanning surface, and has a function of correcting optical face tangle error of the light deflector.

The satisfactory correction of an image plane curvature in both the main scanning direction and the secondary scanning direction is possible by letting a shape of a surface in the main scanning direction of the scanning lens nearest to the light deflector to be non-circular or by letting a shape of a surface in the main scanning direction of a scanning lens other than the scanning lens nearest to the light deflector to be non-circular, and by using a surface in which a radius of curvature in the secondary scanning cross-section is caused to change in the main scanning direction so that a central line of curvature that overlaps a center of curvature in the secondary scanning cross section in the main scanning direction becomes a curve in the main scanning cross section that has a shape different that the non-circular shape in the main scanning direction.

At least in the scanning lens that is nearest to the polygon mirror of the scanning optical system (scanning lens that is used jointly for the plurality of light beams), to achieve an effect similar to the one described above, the light beams, which make an angle with respect to the normal of the deflecting and reflecting surface of the polygon mirror, pass through a tilted decentered surface with respect to an optical axis of the same lens or a special tilted and decentered surface that has an angle of tilting and decentering different according to the image height. An effect same as described above is achieved for the tilted decentered surface and the special tilted and decentered surface.

In order that a plurality of light beams is incident on the scanning lens that is used jointly such that the light beams are isolated in the secondary scanning direction from the polygon mirror, it is desirable that the special tilted and decentered surface is on a side of a surface of emergence of the scanning lens L1 that is nearest to the polygon mirror 14 as shown in FIG. 4. This is because it is necessary from the point of view of processing of the lens surface that there is as much distance as possible between the light beams that are heading for different scanning surfaces and are adjacent in the secondary scanning direction. It is necessary to make the angle with the normal of the deflecting and reflecting surface of the polygon mirror small and separate the light beams that are adjacent in the secondary scanning direction in order to solve the problems regarding the optical performance as well as the processing of the lens surface.

To widen the distance between the plurality of light beams, which are adjacent to the secondary scanning direction and heading for the different scanning surfaces, it is necessary to either keep wide apart a reflection point of each light beam in the deflecting and reflecting surface of the polygon mirror or to make the angle with the normal of the deflecting and reflecting surface of the polygon mirror wider. However, in the former case, the size of the polygon mirror becomes large and there is a rise in the cost. Moreover, it is unsuitable for speeding up due to the windage loss. On the other hand, in the latter case, there is an increase in the amount of bending of the scanning lines and deterioration of the wave front aberration as it has been described and a satisfactory imaging performance cannot be achieved. Therefore, as it has been described, it is desirable to make the side of a surface of emergence of the scanning lens L1 nearest to the polygon mirror to be a decentered surface.

Moreover, according to the third example, when the scanning lens nearest to the light deflector is used jointly for the light beams, which are horizontal with the deflecting and reflecting surface and the light beams, which make an angle in the secondary scanning direction, one surface through which the light beams, which make an angle in the secondary scanning direction with respect to the deflecting and reflecting surface pass is let to be the special tilted and decentered surface. However, a secondary scanning form at a center of the special tilted and decentered surface in the secondary scanning direction (an optical axis in Eq. (1) is the same as that of the optical beam that is horizontal with the deflecting and reflecting surface (in other words, when an amount of tilting and decentering of the special tilted and decentered surface is let to be 0, the secondary scanning cross-sections of a position through which the light beams that are horizontal with the deflecting and reflecting surface and the light beams that make an angle, become parallel to each other). Therefore, due to the generation of heat from the light deflector etc., when there is a temperature distribution in the main scanning direction of the scanning lens, the change in the refractive power is almost the same. For this reason, an amount of the shift in the beam spot position in the main scanning direction on all the scanning surfaces becomes the same, and it is possible to suppress the change in the hue and the color shift during continuous printing. Precisely, optical path lengths in the lens for the light beam that passes obliquely through the lens used jointly and the light beam that passes horizontally are different. However the difference between the optical path lengths being very small, an effect on the beam spot position shift in the main scanning direction on the surface to be scanned is extremely small.

By integrating the scanning lens used jointly for the plurality of light beams, it is possible to realize at a low cost, a scanning optical system in which the angle of incidence of the light beam with respect to the normal of the deflecting and reflecting surface of the polygon mirror is made smaller. The same effect can be achieved by making it a decentered surface even by dividing the scanning lens in the secondary scanning direction and overlapping. However, increase in the number of scanning lenses results in a rise in the cost.

Moreover, it is desirable that a shape in the secondary scanning direction of a plane in which the tilted decentered surface or the special tilted and decentered surface is used, is horizontal with the normal of the reflecting surface of the polygon mirror and is mirror-symmetrical with a plane that includes a center of the secondary scanning direction of the plurality of light beams that is reflected and deflected by the polygon mirror. By causing to be incident symmetrically on a plane that is horizontal with the normal of the reflecting surface of the polygon mirror and that includes the center of the secondary scanning direction of the plurality of light beams that is reflected and deflected by the polygon mirror, the shape of the tilted decentered surface or the special tilted and decentered surface may be let to be mirror symmetrical, thereby improving an efficiency while designing. If there is a symmetrical shape in the main scanning direction, it is possible to use the same lens upon reversal.

In this case, the mirror-symmetry is with respect to the plane that is horizontal with the normal of the reflecting surface of the polygon mirror and includes the center of the secondary scanning direction of the plurality of light beams that is reflected and deflected from the polygon mirror, with all reflecting mirrors from polygon mirror at which the light beams are deflected and reflected, onward are omitted.

Figure 9A:
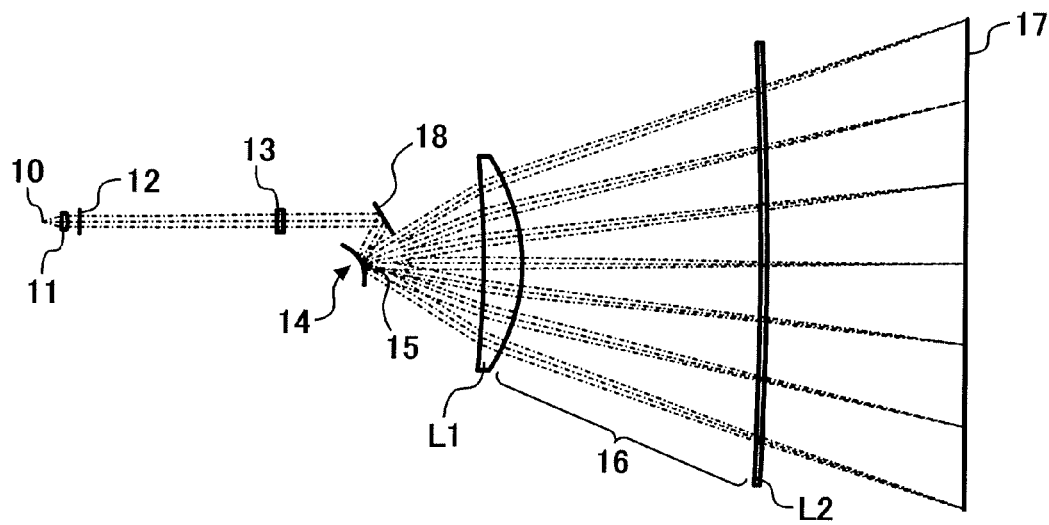
FIG. 9A is a diagram of another embodiment of the optical scanning unit and is a top view as viewed from the direction corresponding to the main scanning direction.
Figure 9B:
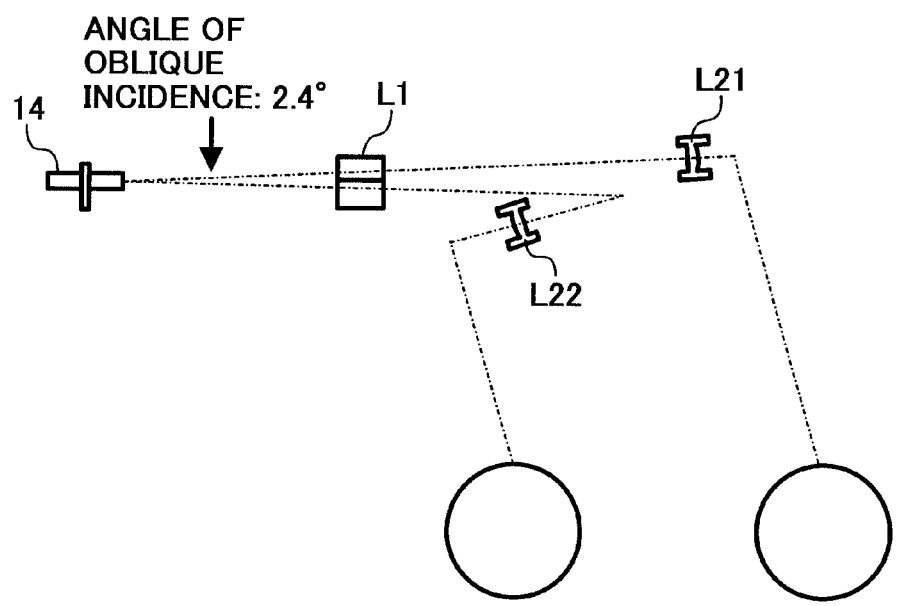
FIG. 9B is a diagram of still another embodiment of the optical scanning unit and is a front view of a side farther behind a light deflector as viewed from the direction corresponding to the secondary scanning direction.
Figure 10:
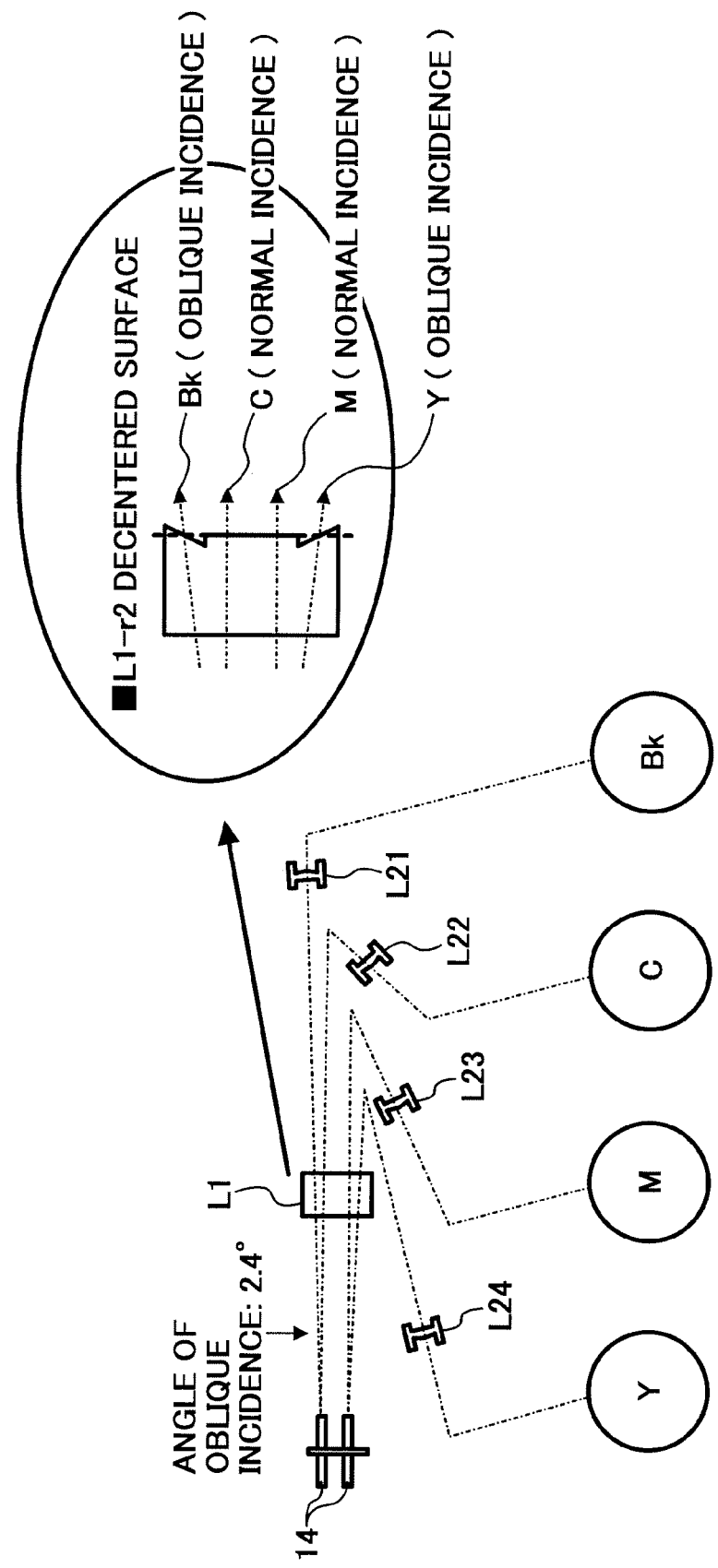
FIG. 10 is a front view of the embodiment of a four-beam configuration as viewed from the direction corresponding to the secondary scanning direction.

FIGS. 9A, 9B, and 10 illustrate other examples of the optical scanning unit according to the present invention. These examples correspond to the examples shown in FIGS. 1 to 4. The optical scanning unit is constructed such that a light beam from the light source is emitted in a direction parallel to an optical axis of the scanning optical system. A mirror 18 that is disposed behind the cylindrical lens 13 causes the light beam from the light source to be incident at an angle in the secondary scanning direction with respect to the normal of the deflecting and reflecting surface of the polygon mirror 14 which is the light deflector. This is a point where the optical scanning unit according to the examples shown in FIGS. 9A, 9B, and 10 differs from that according to the examples shown in FIGS. 1 to 4. An angle of oblique incidence on the first scanning lens L1 according to a fifth example is 2.4° corresponding to the angle of oblique incidence on the first scanning lens L1 according to the previous examples which is 2.0°. This is another point that differs. The rest of the structure is the same as that according to the previous examples where the wave front aberration and the bending of scanning lines are corrected satisfactorily by using the special tilted and decentered surface for a plane of the scanning optical system.

A definition of the 'special tilted and decentered surface' is as mentioned previously and the shape of the lens surface can be expressed by the equation of shape expressed by the Eq. (1) mentioned previously. An example of 'a change in an amount of tilting of a secondary scanning cross-section shape in the main scanning direction' at the special tilted surface expressed by the equation is as shown in FIG. 2.

By letting the special tilted and decentered surface in the secondary scanning direction to have a flat shape without a curvature, the color shift can be reduced.

To correct satisfactorily the image curvature in the secondary scanning direction, it is desirable that at least one surface in which the curvature in the secondary scanning direction changes according to the image height is included in the scanning optical system.

The special tilted surface doesn't have a curvature and does not focus in the secondary scanning direction. In view of this, by using the surface in which the curvature in the secondary scanning direction changes according to the image height (hereinafter, "special toroidal surface), even when a plurality of special tilted and decentered surfaces are used for correcting the wave front aberration and the bending of the scanning lines, the number of lenses is not to be increased and an image curvature in each image height can be corrected efficiently.

Corresponding to the conventional method of normal incidence, in the method of oblique incidence in the secondary scanning direction according to the present invention, as the light beam is incident on the scanning lens upon twisting there is an increase in the wave front aberration. Particularly, the optical performance in the peripheral image height deteriorates remarkably and the beam spot diameter becomes thick thereby hindering an improvement in the image quality. Unless a shape of the surface of incidence of the scanning lens in the main scanning direction is a circular shape with a reflection point of the light beam on the deflecting and reflecting surface as a center, a difference from the deflecting and reflecting surface of the light deflector up to the surface of incidence of the scanning lens differs according to the image height. Normally, it is difficult to maintain the optical performance by using the scanning lens having such a shape. In other words, the normal light beam is subjected to deflection scanning by the light deflector and not incident vertically on the lens surface in the main scanning cross-section for each image height but is incident making a certain angle.

The light beam that is subjected to deflection scanning by the light deflector has a certain width in the main scanning direction. For light beams on both edges in the main scanning direction of the light beam, the distance from the deflecting and reflecting surface of the light deflector to the surface of incidence of the scanning lens is different and are incident obliquely making an angle in the secondary scanning direction. Therefore, the light beams are incident in a twisted form on the scanning lens. As a result, there is a remarkable deterioration of the wave front aberration and the beam spot diameter is thickened. As shown in FIG. 9A, an angle of incidence in the main scanning direction goes on becoming acute with approaching towards the peripheral image height and there is an increase in the twist of the light beam. Therefore, as shown in FIGS. 12A, 12B, 12C, and 12D, with approaching towards the periphery, the beam spot diameter goes on becoming thicker due to the deterioration of the wave front aberration.

In view of this, according to the present invention, it is desirable that the shape of the special tilted surface is such that an amount of decentering increases with going away from the optical axis in the main scanning direction. Since a light beam near the optical axis, i.e. a light beam near the central image height is incident almost vertically on the lens surface, the deterioration of the wave front aberration due to an angle made by the light beam in the secondary scanning direction is less. This is apparent even for the beam spot diameter before correcting the wave front aberration shown in FIGS. 12A, 12B, 12C, and 12D. Therefore, the amount of decentering is caused to increase with going away from the optical axis in the main scanning direction and the wave front aberration caused due to the twisting of the light beam is corrected, thereby achieving the satisfactory optical performance and the beam spot diameter.

The wave front aberration is deteriorated to a great extent due to the twisting of the light beam when the light beam is incident on a scanning lens that has a strong refractive power particularly in the secondary scanning direction.

Figure 18:
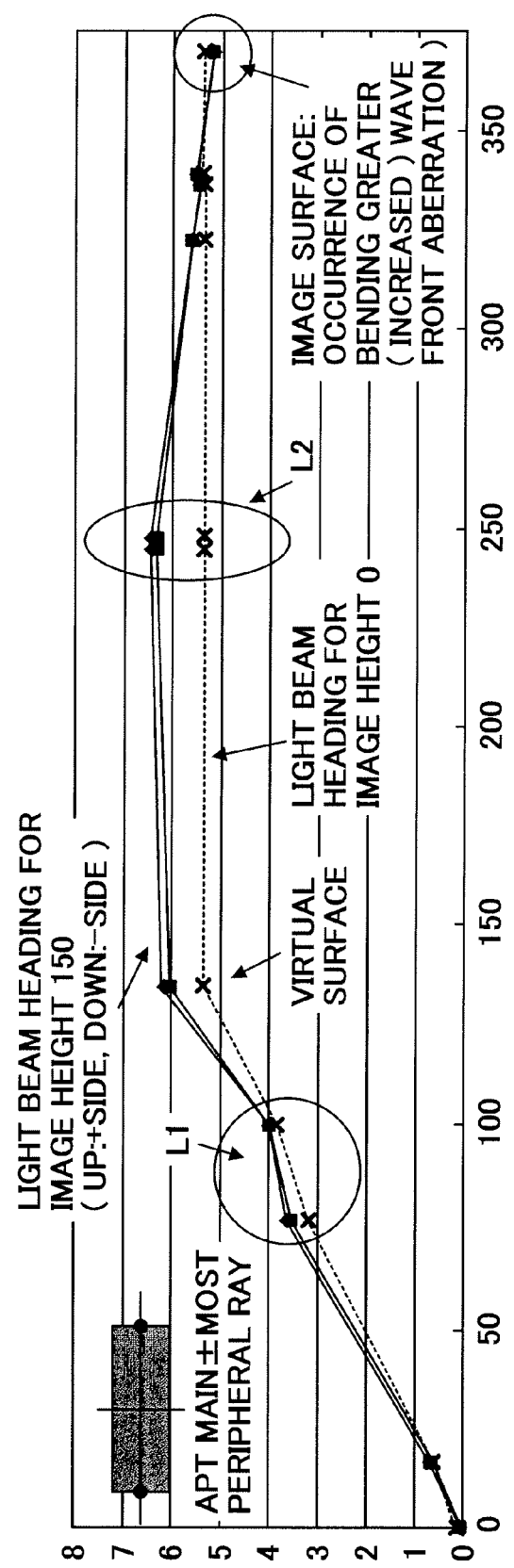
FIG. 18 is an optical path diagram of light rays in a secondary scanning cross-section when the light rays are caused to be incident obliquely in a conventional scanning optical system that does not use the special tilted and decentered surface.

FIG. 18 is an optical path diagram of light rays in the secondary scanning cross-section when the light rays are caused to be incident obliquely in the conventional scanning optical system that does not use the special tilted and decentered surface. The light rays shown in the diagram are two light rays at the two edges of the main scanning direction passing through a secondary scanning direction center of an aperture that is disposed behind the coupling lens. The lens L2 has a strong refractive power in the secondary scanning direction and the lens L1 has almost no refractive power in the secondary scanning direction.

A virtual surface in the diagram is a surface that does not exist in reality. In the diagram, the virtual surface is a virtual mirror surface for disposing L2 and L1 horizontally.

As it is evident from FIG. 18, each light beam that is reflected from the polygon mirror as the light deflector is caused to be incident of the scanning lens with different height in the secondary scanning direction. In the central image height, since the light beam is incident on the scanning lens almost vertically, each beam is incident on the scanning lens without causing the height in the secondary direction to be different. Therefore, there is no deterioration of the wave front and a satisfactory beam spot diameter can be maintained. On the other hand, in the peripheral image height (in this case, a light beam reaching a position +150 mm above the scanning surface), due to a difference in an optical path from the polygon mirror to the scanning lens, height of incident differs in the secondary scanning direction. Therefore, each light beam is not focused at one point on the scanning surface. In other words, the wave front aberration is deteriorated and so is the beam spot diameter.

A light beam heading for an image height 0 on the scanning surface and a light beam heading for an image height +150 mm do not coincide in the secondary scanning direction. This implies bending of the scanning lines. Due to a difference in optical path lengths up to L2 that has the strong refractive power in the secondary scanning direction, the light beam heading for the peripheral image height with respect to the light beam heading for the central image height is incident at a height in the secondary scanning direction from an optical axis of the lens L2 that has a strong refractive power, thereby causing bending of the scanning lines. Due to sag of the polygon mirror, the reflection point is shifted in the secondary scanning direction.

To correct the wave front aberration, it is necessary to correct height of incidence on the scanning lens that has a strong refractive power in the secondary scanning direction and to focus at one point on the scanning surface. Therefore, it is desirable to provide the special tilted surface for correcting the wave front aberration to scanning lenses from a scanning lens that has the strongest refractive power in the secondary scanning direction, i.e. a scanning lens that has the maximum refractive power in the secondary scanning direction from among the scanning lenses in the scanning optical system to a scanning lens on the light deflector side.

Figure 19:
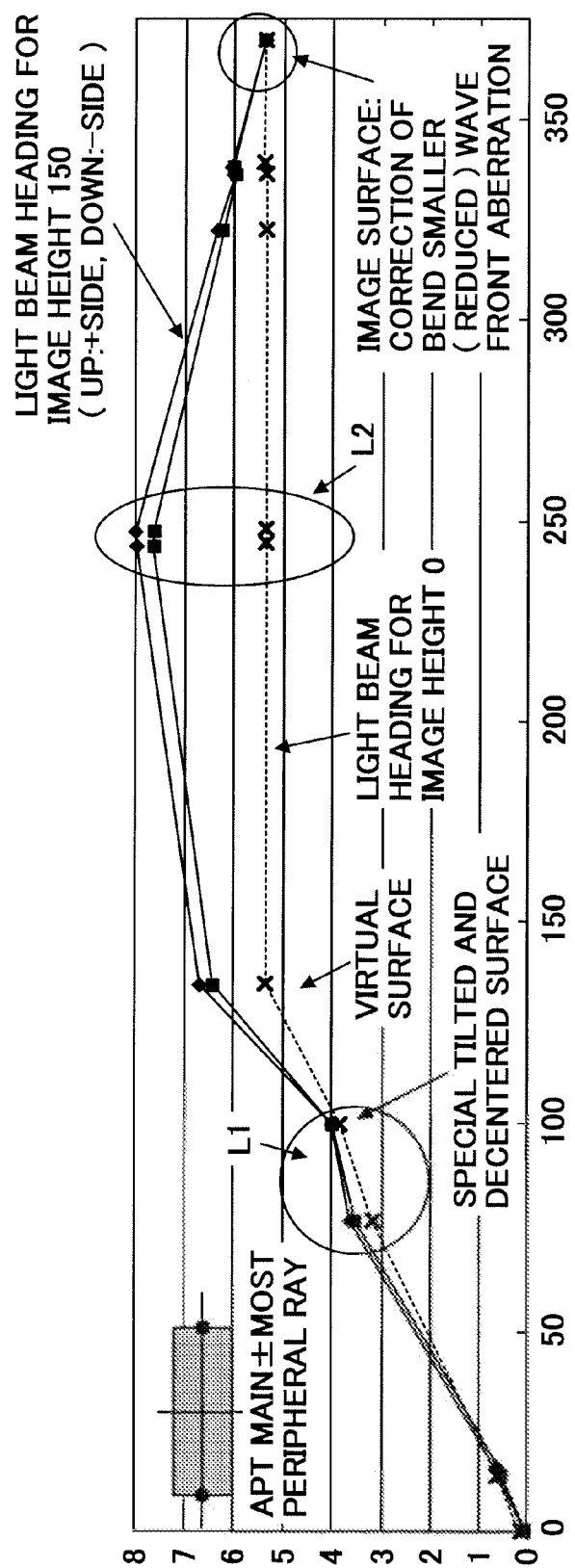
FIG. 19 is an optical path diagram after correcting wave front aberration and bending of scanning lines by a scanning optical system in the optical scanning unit according to the present invention in which the special tilted and decentered surface is used.
Figure 20A:
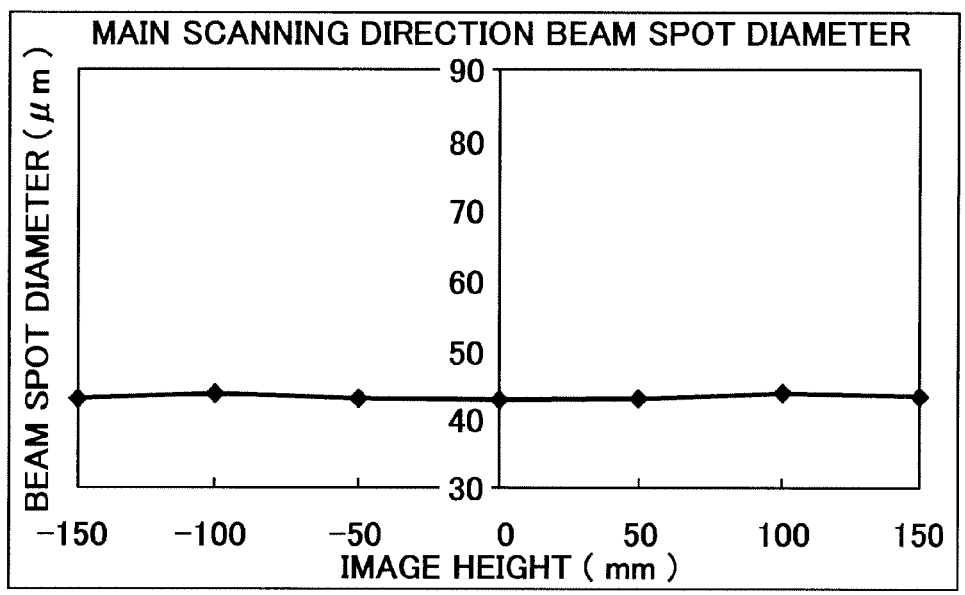
FIG. 20A is a graph of the main scanning direction beam spot diameter on the scanning surface after using the tilted decentered surface and the special tilted and decentered surface on the scanning lens according to a third numerical example.
Figure 20B:
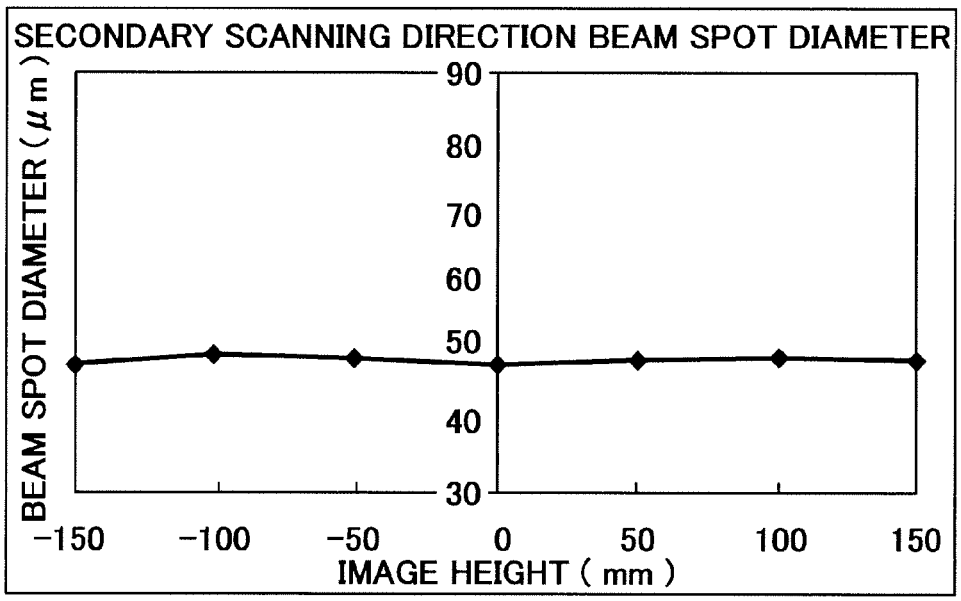
FIG. 20B is a graph of the secondary scanning direction beam spot diameter on the scanning surface after using the tilted decentered surface and the special tilted and decentered surface on the scanning lens according to the third numerical example.
Figure 20C:
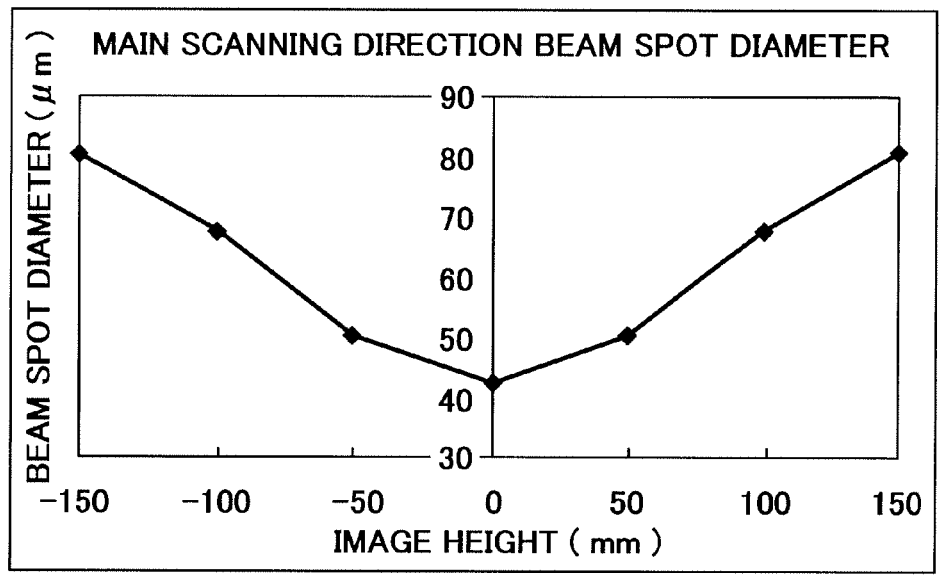
FIG. 20C is a graph of the main scanning direction beam spot diameter on the scanning surface before using the tilted decentered surface and the special tilted and decentered surface on the scanning lens according to the third numerical example.
Figure 20D:
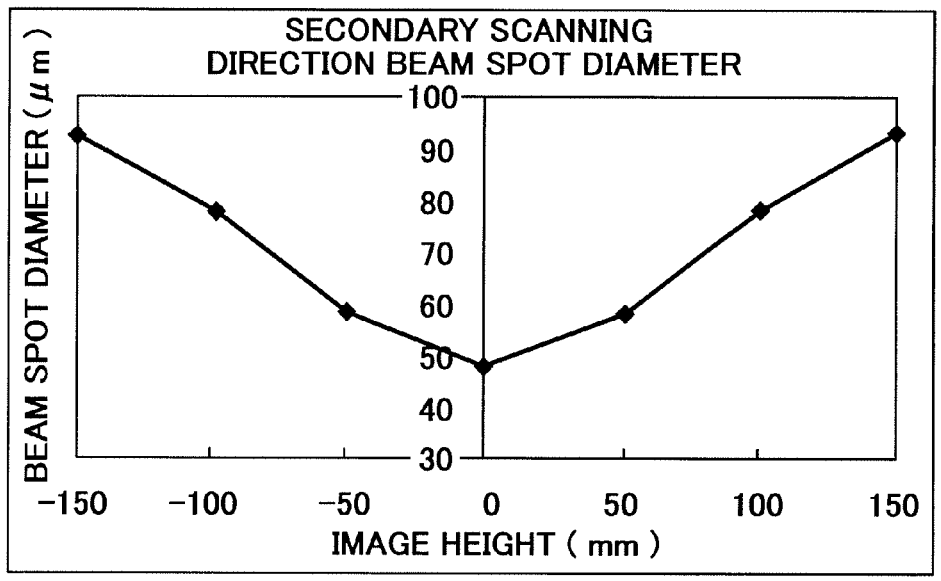
FIG. 20D is a graph of the secondary scanning direction beam spot diameter on the scanning surface before using the tilted decentered surface and the special tilted and decentered surface on the scanning lens according to the third numerical example.

FIG. 19 is an optical path diagram after correcting the wave front aberration and bending of the scanning lines by the special tilted and decentered surface. The wave front aberration is corrected by using the special tilted and decentered surface for a second surface of the lens L1. The height of incidence on the lens L2 is increased and regarding light beams on both edges of the main scanning direction in the light beam, the height of incidence on the lens L2 that has a strong refractive power in the secondary scanning direction towards the periphery is increased.

In normal practice, in order to assure desired optical performance, it is difficult to form surfaces of the scanning lens such that they are concentric in the main scanning direction with a deflection and reflection point of the polygon mirror as a center. Therefore, as the light beam that is deflected and reflected from the polygon mirror as the light deflector approaches the periphery, the light beam incident on the scanning lens at a height in a direction of making an angle in the secondary scanning direction with respect to the normal of the deflecting and reflecting surface of the light deflector. In other words, as shown in the optical path diagram in FIG. 18, when the light beam is jumped at the deflecting and reflecting surface, on the surface of incidence of the scanning lens, the light beam passes through an upper portion of the scanning lens, as much the light beam goes towards the peripheral image height (a plus side on the height in the secondary scanning direction at an image height +150 mm when a position through which a light beam of image height 0 passes through the lens L2 is let to be an optical axis).

While correcting the wave front aberration by the special tilted and decentered surface, by increasing the height of incidence on the lens L2, even for the light beams on both edges in the main scanning direction, it is possible to correct the wave front aberration by increasing the height of incidence in the secondary scanning direction on the lens L2 that has a strong refractive power in the secondary scanning direction as much the light beam goes towards the periphery. In other words, the special tilted surface is formed on a scanning lens that is on the side of the light deflector from the scanning lens that has the maximum refractive power in the secondary scanning direction such that an angle with the normal of the deflecting and reflecting surface of the optical detector that is facing towards the periphery with respect to the light beam that is making an angle in the secondary scanning direction with the normal of the deflecting and reflecting surface of the light deflector is made bigger, and a position of incidence in the secondary scanning direction on the scanning lens that has the maximum refractive power in the secondary scanning direction, is adjusted, thereby enabling to correct the deterioration of the wave front aberration.

Corresponding to the conventional method of normal incidence, in the method of oblique incidence in the secondary scanning direction according to the present invention, there is a bending of the scanning lines. Amount of bending of the scanning lines varies according to the angle of oblique incidence. If the angle of oblique incidence becomes wider, there is an increase in the amount of bending of the scanning lines. When latent image drawn on a photosensitive drum by each light beam is visualized by toner of each color, there is a color shift and a remarkable deterioration of the image quality. In the optical path diagram (FIG. 18) before correcting by the special tilted and decentered surface described in the sixth embodiment, it can be seen that a position of the secondary scanning on the scanning surface for the peripheral image height and the central image height is different. When a light beam is allowed to be incident on the deflecting and reflecting surface at an angle in the secondary scanning direction by using a polygon scanner as a light deflector, due to effect of sag, a reflecting position of a light beam heading for each image height on a changed reflecting surface of the light deflector changes in the secondary scanning direction (also shifted in the main scanning direction and a direction of advance of the light beam). Therefore, height of incidence in the secondary scanning direction on the scanning lens, particularly the scanning lens that has a strong refractive power in the secondary scanning direction changes and an imaging position on the scanning surface also changes in the secondary scanning direction according to the image height, thereby causing the bending of scanning lines.

The change in the height of incidence on the scanning lens, particularly the scanning lens that has a strong refractive power in the secondary scanning direction increases with advancing towards the peripheral image height where an optical path length from the light deflector to the surface of incidence of the scanning lens and the amount of shift in the secondary scanning direction on the scanning surface also increases with advancing from the central image height to the peripheral image height.

According to the present invention, by using the special tilted and decentered surface, in the main scanning direction, in other words, correction of the bending of the scanning lines and of a position of an image point in each image height in the secondary scanning direction is possible. When the angle of incidence is to be made smaller to reduce the bending of the scanning lines and the wave front aberration, as has been described, the light beam that is incident on the deflecting and reflecting surface of the polygon mirror as a light deflector is caused to be incident at an angle in the main scanning direction such that the light beam does not interfere with the scanning lens. As a result, an optical sag that is developed due tot the polygon mirror is not symmetric with respect to the center, i.e. the optical axis of the scanning lens. In other words, the bending of scanning lines is symmetric.

Therefore, the bending of the scanning lines can be corrected satisfactorily by using the special tilted and decentered surface in which an amount of decentering changes asymmetrically in the main scanning direction with the optical axis as a center. Particularly, it is desirable that the special tilted and decentered surface that corrects mainly the bending of the scanning lines is used for the scanning lens nearest to the scanning surface. In the scanning lens nearest to the scanning surface, the light beam heading for each image height is well separated and there is less overlapping of adjacent light beams. Therefore, the amount of decentering of the special tilted and decentered surface can be set minutely and the bending of the scanning lines can be corrected satisfactorily.

It is desirable that the special tilted and decentered surface is used for the scanning lens that is nearest to the scanning surface. As described in the sixth example, the scanning position of the light beam subjected to the correction of the wave front aberration can be corrected at the last lens. A change in an amount of tilting of the special tilted and decentered surface in a direction of the image height being comparatively smooth and an effect on the wave front aberration being small, the light beam after the correction is not caused to be skewed much and the wave front is not disturbed.

Thus, the wave front aberration is corrected at the special tilted and decentered surface of the scanning lens nearest to the light deflector (scanning lens on a side of the light deflector from the scanning lens that has the maximum refractive power in the secondary scanning direction at least), the bending of the scanning lines is corrected at the special tilted and decentered surface of the scanning lens closet to the scanning surface, thereby separating the two functions of correcting. The separating of functions enables to reduce the size of the beam spot diameter and the bending of the scanning lines.

The functions are not required to be separated absolutely and it is needless to mention that a part of the wave front aberration correction and a part of the correction of the bending of the scanning lines may be performed by the respective special tilted and decentered surface.

Thus, according to the present invention, the correction of the wave front aberration and the bending of the scanning lines caused due to oblique incidence can be achieved by using at least two scanning lenses.

As it has been apparent from the description that has been made, the deterioration of the wave front aberration that is caused when the light beam is allowed to be incident at an angle in the secondary scanning direction with the deflecting and reflecting surface, is almost negligible near the optical axis. Even if there is any deterioration of the wave front aberration, it is very small. Therefore, in the special tilted and decentered surface that is used according to the present embodiment, an amount of decentering on the optical axis can be let to be zero (i.e. there is no decentering). Conventionally, while correcting the wave front aberration and the bending of the scanning lines by allowing the lens or the surface of the lens tilted and decentered, in a portion near the central image height, that performance has been caused to be deteriorated thereby balancing with the peripheral image height. However, according to the present invention, the optical performance can be corrected satisfactorily without a need to cause the lens or the surface of the lens to be decentered.

According to examples in diagrams from FIG. 1 to 9, in the lenses included in the scanning optical system, the scanning lens L1, which is nearest to the polygon mirror 14 is arranged such that the plurality of light beams heading for different scanning surface pass through it. In other words, the scanning lens L1 is used jointly by the plurality of beams. Therefore, it is possible to suppress the deterioration of an image due to the color shift and hue between different scanning surfaces. The scanning lens L1 that is nearest to the light deflector has a strong positive refractive power in the main scanning direction and corrects the constancy of speed. By causing the plurality of light beams heading for the different scanning surfaces to pass through the scanning lens L1, the shift in the beam spot position in the main scanning direction due to the difference in processing of the lens becomes almost the same in the different scanning surfaces, thereby enabling to suppress the occurrence of the color shift.

Figure 16:
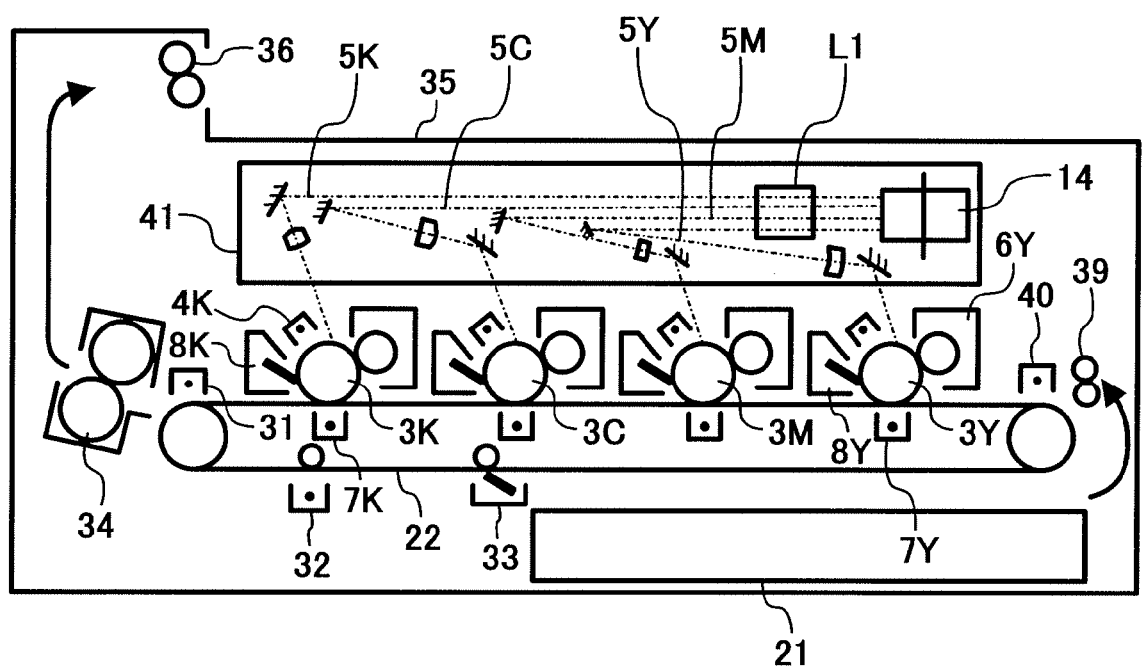
FIG. 16 is a schematic front view of an embodiment of an image forming apparatus that uses the optical scanning unit according to the present invention.

The following is a description of a second embodiment of the image forming apparatus in which the optical scanning unit according to the present invention is used, with reference to FIG. 16. The second embodiment is an example in which the optical scanning unit according to the present invention is used in a tandem full-color laser printer. In FIG. 16, a carrier belt 22 that carries a transfer paper (not shown in the diagram) that is fed from a paper feeding cassette that is disposed in a horizontal direction, is disposed in a lower side of an apparatus. Photosensitive drums 3Y, 3M, 3C, and 3K for yellow (Y), magenta (M), cyan (C), and black (K) colors respectively are disposed at a same distance in order from an upstream side of direction of transporting of the transfer paper, above the carrier belt 22. The photosensitive drums 3Y, 3M, 3C, and 3K have the same diameter and various processing units that perform various processes in an electrophotography are disposed around the photosensitive drums 3Y, 3M, 3C, and 3K. For example, processing units such as a charger 4Y, a scanning optical system 5Y, a developing unit 6Y, a transfer charger 7Y, and a cleaning unit 8Y are disposed around the photosensitive drum 3Y. Similarly, various processing units are disposed around the photosensitive drums 3M, 3C, and 3K. According to the second embodiment, surface of each of the photosensitive drums 3Y, 3M, 3C, and 3K is let to be a scanning surface or a surface subjected to irradiation that is set for each color. Scanning optical systems 5Y, 5M, 5C, and 5K are provided for the photosensitive drums 3Y, 3M, 3C, and 3K respectively, one for each photosensitive drum. The scanning lens L1 is used jointly for M and Y as well as for K and C. Around the carrier belt 22, a registering roller 39 and a belt charger 40 are provided at positions on an upstream side farther than the photosensitive drum 3Y. Units such as a belt separation charger 31, a decharger 32, and a cleaning unit 33 are disposed at a downstream side in a direction of rotation of the carrier belt 22 farther than the photosensitive drum 3K. A fixing unit 34 is disposed at a downstream side in a direction of transporting of the transfer paper farther than the belt separation charger 31. The fixing unit 34 is connected by discharge rollers 36 towards a paper discharging tray 35.

With such a schematic structure, when in a full-color mode, based on an image signal for each of Y, M, C, and K colors corresponding to the photosensitive drums 3Y, 3M, 3C, and 3K, an electrostatic latent image corresponding to a signal of each color is formed by optical scanning by light beams from the scanning optical systems 5Y, 5M, 5C, and 5K on the surface of each photosensitive drum. The electrostatic latent images are developed by the corresponding developing units with colored toners and become toner images. The toner images are absorbed electrostatically on the carrier belt 22 and are transferred to a transfer paper one by one, to be superimposed on one another. Thus, a full-color image is formed on the transfer paper. The full-color image upon fixing by the fixing unit is discharged by the discharge rollers 36 to the paper discharging tray 35.

By letting the scanning optical systems 5Y, 5M, 5C, and 5K in the image forming apparatus, to be optical scanning units according to the first embodiment, the bending of the scanning lines and the deterioration of the wave front aberration can be corrected effectively, thereby realizing an image forming apparatus that secures reproducibility of a high quality image without color shift.

Figure 17A:
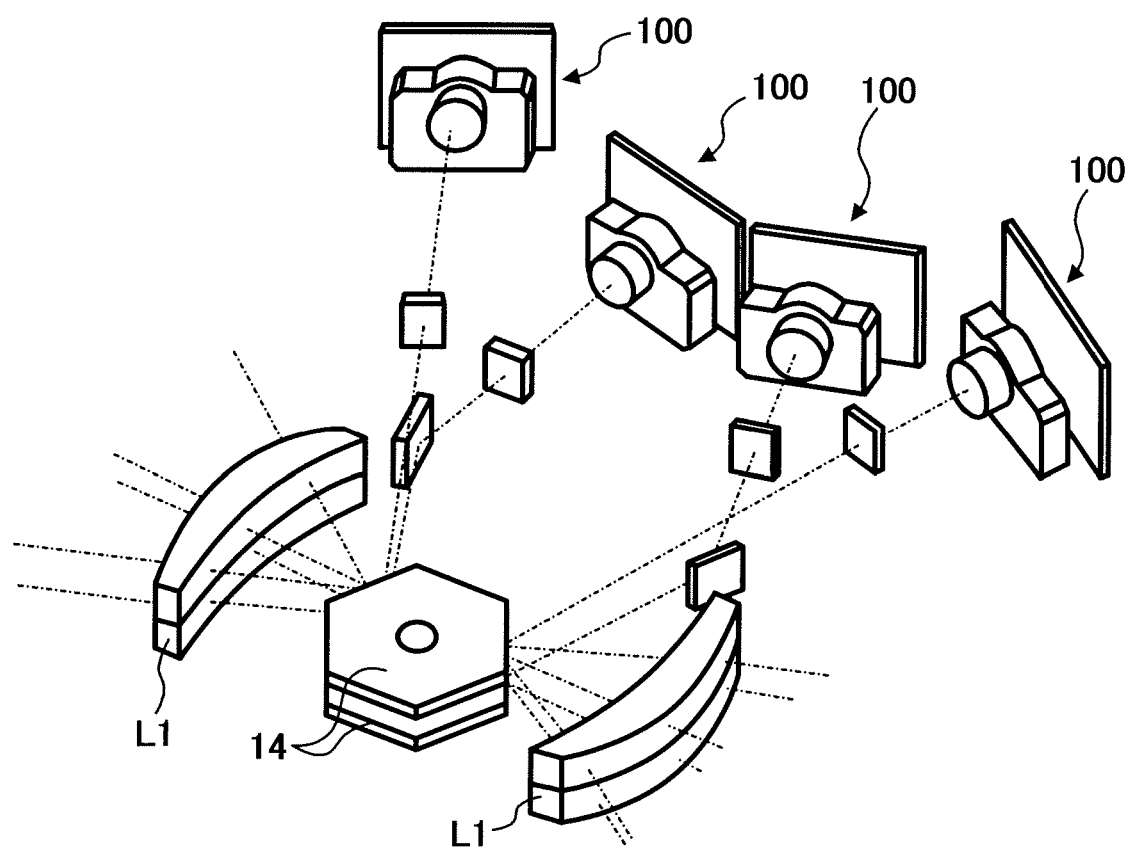
FIG. 17A is a perspective view of an example (first example) of a scanning in opposite directions to which the present invention can be applied.
Figure 17B:
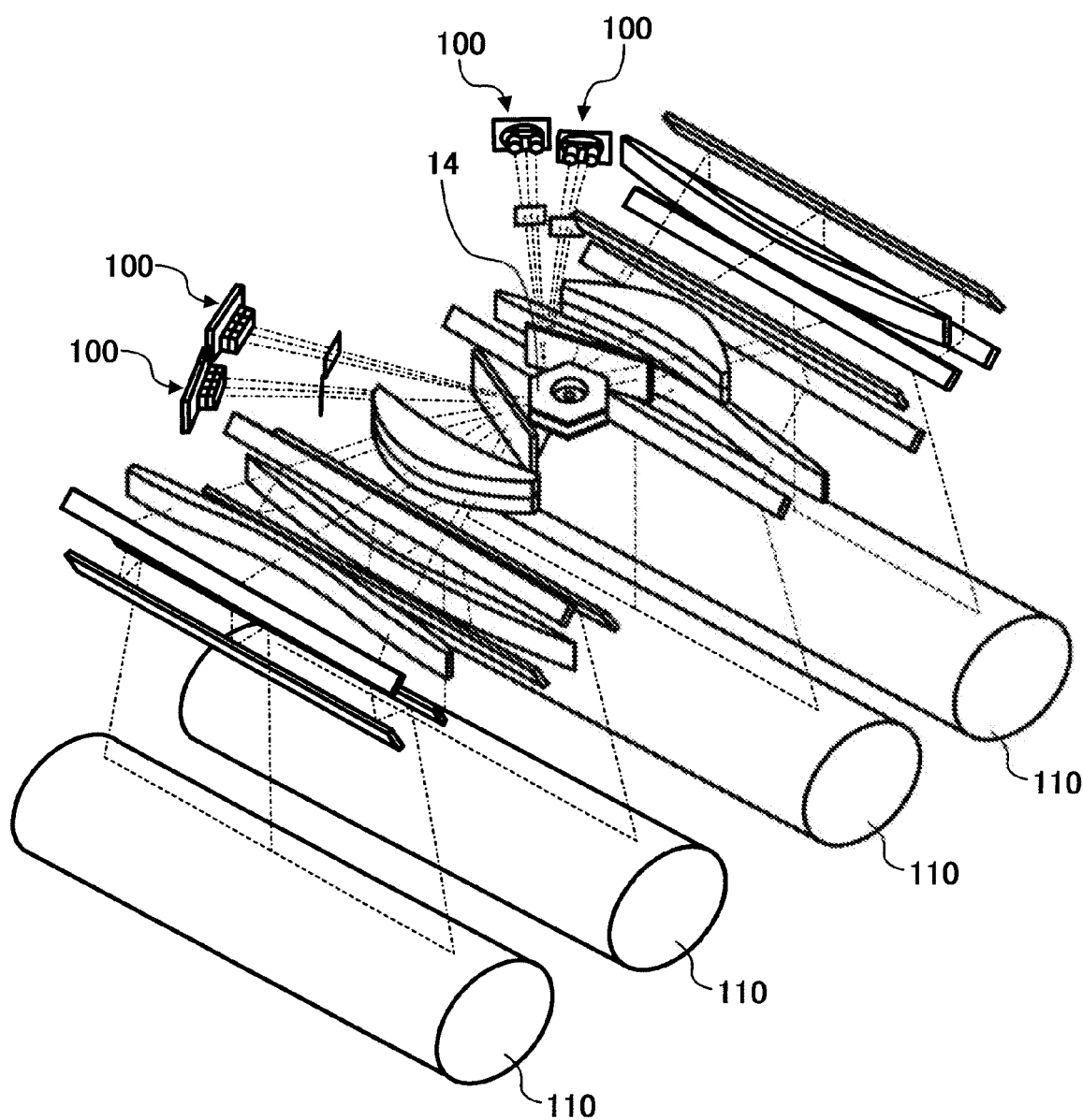
FIG. 17B is a perspective view of an example (second example) of the scanning in opposite directions to which the present invention can be applied.

The examples of the optical scanning unit with the one side scanning have been described so far. According to an optical scanning unit with the scanning in opposite directions shown in FIGS. 17A and 17B, on the deflecting and reflecting surface of the polygon mirror 14, the plurality of light beams need not be separated by a predetermined distance in the secondary scanning direction. In other words, by causing light beams heading for two surfaces each on both sides (photosensitive drums) subjected to scanning to be incident at an angle in the secondary scanning direction with the normal of the deflecting and reflecting surface of the polygon mirror 14, thickness of a polyhedron that is included in the deflecting and reflecting surface of the polygon mirror can be reduced in the secondary scanning direction and by one stage, thereby enabling to decrease an inertial of a rotating body and to shorten a start-up time. In FIGS. 17A and 17B, reference numeral 100 denotes a light source that includes a light source such as a semiconductor laser, L1 denotes a first lens system that is included in an imaging optical system, and a reference numeral 110 denotes the photosensitive drum. There can be a reduction in cost as compared to a cost of the polygon mirror that is two staged in the conventional scanning in opposite directions. In this case, the angle made by the light beam in the secondary scanning direction with the normal of the deflecting and reflecting surface of the polygon mirror can be set to be the smallest for an optical system that uses the oblique incidence, as shown in FIG. 8B.

Figure 8A:
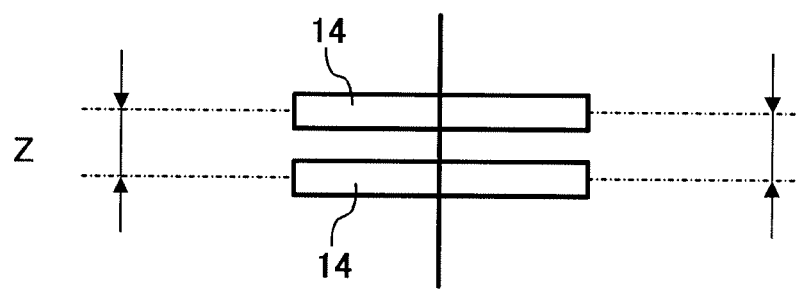
FIG. 8A is a diagram of an example of an angle of a light beam in the secondary scanning direction with respect to a normal of a deflecting and reflecting surface of the polygon mirror and is a front view of a conventional example as viewed from the direction corresponding to the secondary scanning direction.
Figure 8B:
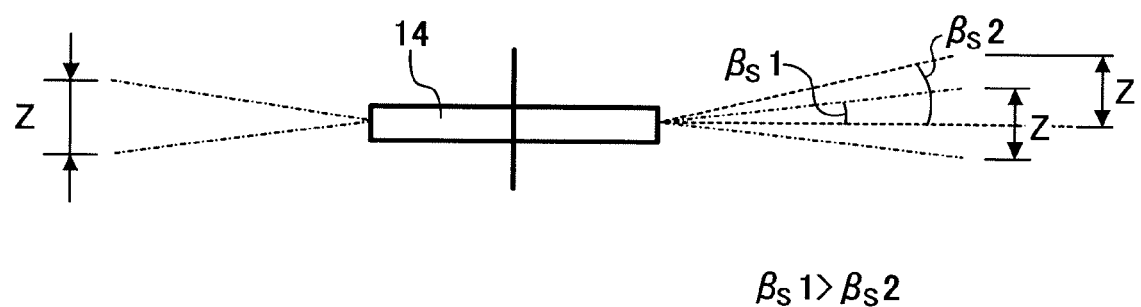
FIG. 8B is a diagram of an example of the angle of the light beam in the secondary scanning direction with respect to the normal of the deflecting and reflecting surface of the polygon mirror and is a front view of an example of the present invention, as viewed from the direction corresponding to the secondary scanning direction.

FIG. 8A is a layout of a conventional method in which the light beam is not allowed to be incident obliquely. In this case, the polygon mirror 14 that is two staged to have distance Z necessary for separation is used. FIG. 8B is an example with a polygon mirror 14 that is one staged by using the oblique incidence. In this example, if a ray layout in the one side scanning is a wave ray, an angle of incidence is $\beta s2$, and then in an equation for the one side scanning, as shown in FIG. 8B, an angle of incidence $\beta s2$ shown by a continuous line can be set to be small.

As a result, the satisfactory optical performance can be achieved at a low cost by using the tilted decentered surface and the special tilted and decentered surface according to the present invention. A method of using the tilted decentered surface and the special tilted and decentered surface (location of use) and effect are as described so far.

In the optical scanning unit according to the present invention, a light source that includes a semiconductor laser array, which has a plurality of light-emitting points or a light source that has a single or a plurality of light-emitting points is used as a multi-beam light source. The optical scanning unit may be structured such that the plurality of light beams scans the surface of the photosensitive drum simultaneously. This enables to structure an optical scanning unit and an image forming apparatus with a high speed and high density. The optical scanning unit and the image forming apparatus structured in such a manner can achieve effects similar to those described so far. FIGS. 14A and 14B are examples of a light source included in the multi-beam light source.

In FIG. 14A, semiconductor lasers 403 and 404 are fitted separately in fitting holes 405-1 and 405-2 on a rear side of a base member 405, which are not shown in the diagram. The fitting holes 405-1 and 405-2 are inclined at a predetermined angle in the main scanning direction. In the example, the fitting holes 405-1 and 405-2 are inclined at a small angle of about 1.5° and the semiconductor lasers 403 and 404, which are fitted in these fitting holes, are also inclined at an angle of about 1.5° in the main scanning direction. A notch is cut in cylindrical heat-sink portions 403-1 and 404-1 of the semiconductor lasers 403 and 404. Protrusions 406-1 and 407-1 are formed in circular holes at centers of retaining members 406 and 407. An array direction of a light-emitting source is matched by fitting the protrusions 406-1 and 407-1 in the notches of the cylindrical heat-sink portions 403-1 and 404-1. The retaining members 406 and 407 are fixed to the base member 405 by screws 412 from a rear side, thereby fixing the semiconductor lasers 403 and 404 to the base member 405. Collimating lenses 408 and 409 with their circumference along fixing-guide surfaces 405-4 and 405-5, which are semicircular in shape, adjust a direction of an optical axis and are stuck upon positioning such that diverged light beams that are irradiated from the light-emitting point become parallel beams.

In the eleventh example, to perform setting so that light rays from each of the semiconductor lasers cross in the main scanning plane, the fitting holes 405-1 and 405-2 as well as the semicircular shaped fixing guides 405-4 and 405-5 are tilted along a direction of light rays. An engaging part 405-3 that is circular in shape of the base member 405 is engaged with a holder 410. Screws 413 are passed through throughholes 410-2 and 410-3 and are screwed into screw holes 405-6 and 405-7, thereby fixing the base member 405 to the holder 410 and assembling the light source.

The holder 410 of the light source is held closely to a rear side of a fixing wall 411, thereby holding the light source. For holding the holder 410, a cylindrical part 410-1 is fitted into a reference hole 411-1 provided on the fixing wall 411 of an optical housing. A spring 611 is inserted from a front side of the fixing wall 411 and a stopper 612 is engaged with protrusions 410-3 on a cylindrical part. One end of the spring 611 is hooked on to a protrusion 411-2 of the fixing wall 411 and the other end of the spring 611 is hooked on to the light source, thereby generating torque in the light source with a center of the cylindrical part as an axis of rotation. An adjusting screw 613 is provided to hold the torque of the light source. The adjusting screw 613 enables to rotates the whole light source in a direction of $\theta$, which is around the optical axis and to adjust the a pitch. An aperture 415 is provided on a front side of the light source and slits corresponding to each semiconductor laser are provided in the aperture 415. The aperture 415 with the slits is fixed to the optical housing and regulates diameter of a light beam emitted.

FIG. 14B is a second embodiment of the light source. In FIG. 14B, light beams from a semiconductor laser 703, which includes four light-emitting sources are combined by using a beam combining unit. A reference numeral 706 denotes a retaining member 706, a reference numeral 705 denotes a base member, a reference numeral 708 denotes a collimating lens, and a reference numeral 710 denotes a holder. According to the second embodiment, there is one semiconductor laser 703 as a light source, corresponding to which there is one retaining member 706 and this is where the second embodiment differs from the first embodiment. Rest of the structure is basically the same.

FIG. 14C is a diagram of a structure that conforms to the example shown in FIG. 14B. FIG. 14C illustrates an example of combining light beams by using a beam combining unit. The light beams are emitted from a semiconductor laser array 801 that includes four light-emitting sources. The basic components being similar to those shown in FIGS. 14A and 14B, a description of these components is omitted.

As shown in FIG. 15, it is desirable that all beams emitted from the semiconductor laser are allowed to cross in the main scanning direction near a deflecting and reflecting surface of a polygon mirror 1403. A reference numeral D1 denotes a reflecting surface of the polygon mirror 1403 when a light beam emitted from a semiconductor laser 101 reaches an image height disposed at a surface 1407 subjected to scanning and a reference numeral D2 denotes a reflecting surface of the polygon mirror 1403 when a light beam emitted from a semiconductor laser 102 reaches the same image height disposed at the surface 1407. When each of these light beams is incident on the polygon mirror 1403, they are separated by a certain relative angle difference $\Delta\alpha$. Therefore, there is a time delay equivalent to the angle difference in the reflecting surface for reaching the same image height. In other words, there is a time delay corresponding to an angle difference of D1 and D2.

Figure 15A:
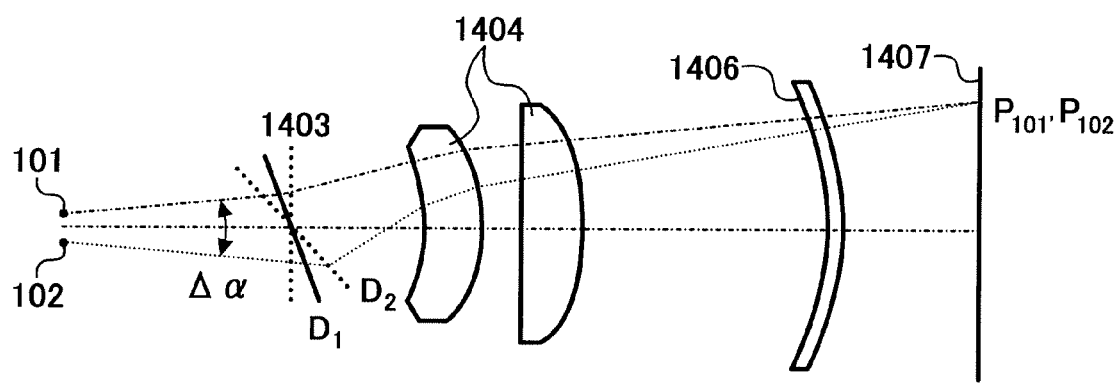
FIG. 15A is an optical path diagram of an example (first example) of a direction of an optical beam that is emitted from a semiconductor laser towards the light deflector and deflected and reflected by the light deflector, in the direction corresponding to the main scanning direction.
Figure 15B:
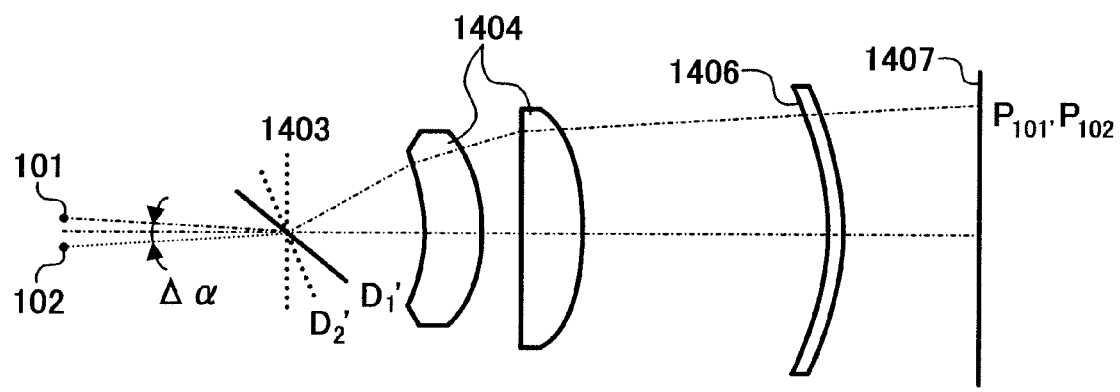
FIG. 15B is an optical path diagram of an example (second example) of the direction of an optical beam that is emitted from the semiconductor laser towards the light deflector and deflected and reflected by the light deflector, in the direction corresponding to the main scanning direction.

In a case of FIG. 15A, two light beams follow optical paths, which are quite different and are deflected and reflected at different positions on the deflecting and reflecting surface and in a case of FIG. 15B, two light beams cross each other at a same position on the deflecting and reflecting surface and follow exactly the same optical path after being deflected and reflected. When the light beams pass different positions of each optical elements they are subjected to different optical effects. Therefore, optical characteristics such as aberration of the two light beams that reach the same image height in the main scanning direction on the scanning surface become different. Particularly, a change between the image heights of scanning-line pitch is very big.

Therefore, as shown in FIG. 15B, by allowing the two light beams to cross near the reflecting surface of the polygon mirror 1403, when reach the same image height in the main scanning direction on the scanning surface, they follow almost the same optical path in the main scanning direction of the optical element, thereby enabling to reduce effectively the bending of scanning lines. A change in a writing position in the main scanning direction between each light beam due to difference in each component from the polygon mirror to components on an image surface side becomes almost the same for all light beams, thereby enabling to suppress a shift in the writing position in the main scanning direction between the beams. Moreover, by causing all the light beams that form an image on the same image height through almost the same position in the main scanning direction of the scanning optical system, an effect of the aberration of the lenses included in the scanning optical system can be suppressed and a position of image forming in the main scanning direction for each beam can be coincided more accurately. Even if a delay time is set jointly for all the light beams after synchronism detection, it is possible to suppress the position shift in the main scanning direction at an image height at a start of writing. By making an arrangement according to FIG. 15B, radius of an inscribed circle of the polygon mirror 1403 can be reduced to the minimum. A multi-beam light source that uses one semiconductor laser array is not in a category of the present invention.

Thus, multi-beam has been described with examples. In a case of deflecting light beams that are heading for different scanning surfaces at the same reflecting surface of the polygon mirror, an arrangement may be made such that light beams are allowed to cross in the main scanning direction near the deflecting and reflecting surface of the polygon mirror 1403. By such an arrangement, an effect similar to that described so far can be achieved.

Concrete numerical examples related to the optical scanning unit according to the present invention are given below.

A semiconductor laser that emits light of wavelength 655 nm is used as a light source. A divergent light beam that is emitted is converted to a substantially parallel light beam by a coupling lens (focal length: 15 mm). The substantially parallel light beam is formed as a long line-image in the main scanning direction at a position of the deflecting and reflecting surface of the polygon mirror due to an effect of a cylindrical lens (focal length 96 mm). The polygon mirror has six deflecting and reflecting surfaces and an inscribed circle of the polygon mirror has a radius of 18 mm. A light beam is incident obliquely on the polygon mirror at an angle of 2° in the secondary scanning direction and is incident at an angle of approximately 60° in the main scanning direction with respect to a light beam that is heading for an image height 0. An aperture that regulates the light beam emerged from the coupling lens is a rectangular aperture of 6.4 mm in the main scanning direction and 0.9 mm in the secondary scanning direction. Table 1 represents data of a scanning-imaging optical system in this optical scanning unit. A scanning lens L1 denoted by surface numbers 1 and 2 is disposed in parallel with the deflecting and reflecting surface (light beam is incident obliquely at an angle of 2°). A scanning lens L2 denoted by surface numbers 3 and 4 is disposed such that an optical axis of the lens and a light beam incident coincide (disposed with inclination of 2° so that the light beam is not incident obliquely on the lens).

Table 1 represents the data of the scanning-imaging optical system. In table 1, X denotes a distance in a direction of an optical axis (an optical axis of lens L1) when each surface is projected on to a surface that is perpendicular to an axis of rotation of the polygon mirror.

TABLE 1

Data of scanning-imaging optical system

| Surface number | RY (mm) | RZ (mm) | X (mm) | N | Note |
|---|---|---|---|---|---|
| Deflecting surface | ∞ | ∞ | 76.63 | — | Deflecting surface |
| 1* | −801.412 | ∞ | 22.99 | 1.5273 | Scanning-imaging lens |
| 2* | −119.317 | ∞ | 146.32 | — | |
| 3* | −1050.624 | ∞ | 3.06 | 1.5273 | Scanning-imaging lens |
| 4** | −2238.605 | −42.465 | 121.64 | — | — |
| 5 | — | — | — | — | Scanning surface |

A shape in the main scanning direction of each surface with * mark is non-circular and in the secondary scanning direction is flat.

A shape of a surface of the lens is given by the following Eq. (2). Surfaces 2 and 3 are special tilted and decentered surfaces.

$$X(Y,Z) = \frac{Y^2 \cdot Cm}{1 + \sqrt{1-(1+K)\cdot(Y\cdot Cm)^2}} + A\cdot Y^4 + B\cdot Y^6 + \quad (2)$$

$$C\cdot Y^8 + D\cdot Y^{10} + E\cdot Y^{12} + F\cdot Y^{14} + \frac{Cs(Y)\cdot Z^2}{1+\sqrt{1-(Cs(Y)\cdot Z)^2}} +$$

$$(F0 + F1\cdot Y + F2\cdot Y^2 + F3\cdot Y^3 + F4\cdot Y^4 + \dots)Z$$

where, $Cm=1/RY$ and $Cs(Y)=1/RZ$

A shape in the main scanning direction of each surface with ** mark is non-circular and a radius of curvature in the secondary scanning direction changes continuously according to a height of the lens. A shape of each surface is given by Eq. (2). However, Cs(Y) is calculated according to Eq. (3).

$$Cs(Y)=1/RZ+aY+bY^2+cY^3+dY^4+eY^5+fY^6+gY^7+hY^8+ iY^9+jY^{10}+kY^{11}+lY^{12} \quad (3)$$

An aspheric coefficient according to this example is expressed by table 2 given below.

TABLE 2

| | First surface | Second surface | Third surface | Fourth surface |
|---|---|---|---|---|
| RY | −801.412 | −119.317 | −1050.624 | −2238.605 |
| K | 1.908E−01 | 4.603E−01 | 4.248E+01 | −1.208E+3 |

TABLE 2-continued

| | First surface | Second surface | Third surface | Fourth surface |
|---|---|---|---|---|
| A | −1.466E−07 | −4.650E−08 | 2.166E−08 | 3.078E−09 |
| B | 3.771E−11 | 2.232E−11 | 1.748E−12 | −8.738E−13 |
| C | −4.958E−15 | −3.241E−15 | −1.635E−16 | 1.456E−16 |
| D | −5.051E−19 | 6.931E−20 | 1.343E−21 | −1.442E−20 |
| E | 1.489E−22 | 1.072E−22 | 1.599E−25 | 4.420E−25 |
| F | −1.331E−26 | −2.441E−26 | — | — |
| RZ | ∞ | ∞ | ∞ | −42.465 |
| a | — | — | — | −3.974E−07 |
| b | — | — | — | 2.929E−07 |
| c | — | — | — | 2.024E−12 |
| d | — | — | — | −9.237E−12 |
| e | — | — | — | 2.222E−14 |
| f | — | — | — | 8.744E−17 |
| g | — | — | — | −5.260E−18 |
| h | — | — | — | 6.024E−20 |
| i | — | — | — | 4.240E−22 |
| j | — | — | — | −7.659E−24 |
| k | — | — | — | −1.147E−26 |
| l | — | — | — | 2.654E−28 |
| F0 | — | — | — | — |
| F1 | — | −3.598E−06 | 6.133E−07 | — |
| F2 | — | 3.925E−06 | 1.419E−07 | — |
| F3 | — | — | — | — |
| F4 | — | 2.491E−10 | −4.358E−13 | — |
| F5 | — | — | — | — |
| F6 | — | 1.409E−14 | 7.712E−18 | — |

In the present optical system, a noise proof glass of thickness 1.9 mm (refractive index 1.5143) is inserted. The noise proof glass is disposed at a position inclined at 8° only, in the deflecting surface.

According to the second embodiment, by using the special tilted and decentered surface, the bending of the scanning lines is corrected from 174 μm to 1 μm.

Figure 5A:
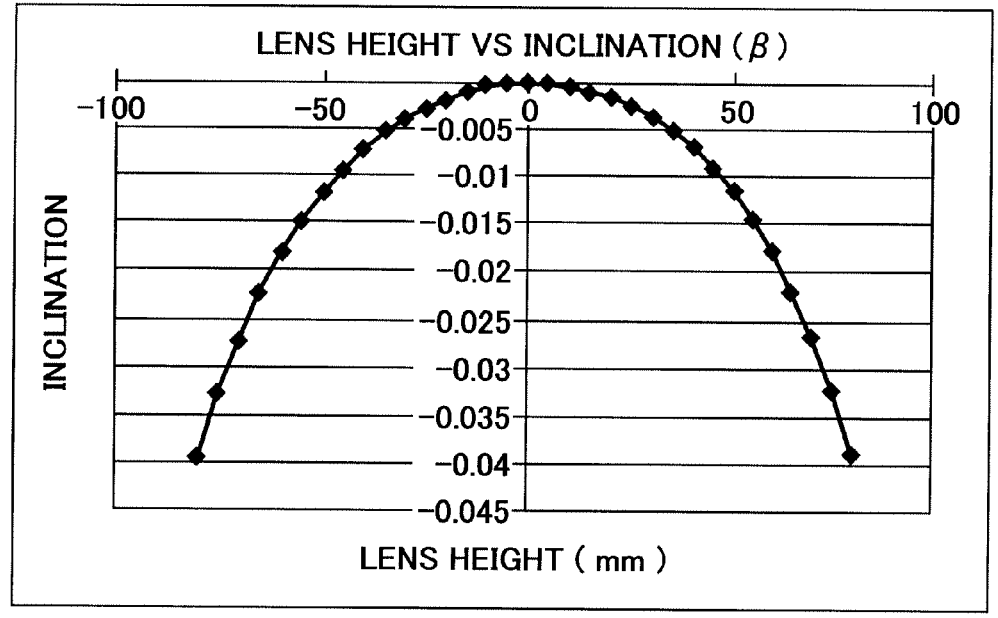
FIG. 5A is a diagram of an example of a change in the amount of tilting in the special tilted and decentered surface between image heights and is a diagram illustrating an inclination of a second surface of a scanning lens that is nearest to a polygon mirror.
Figure 5B:
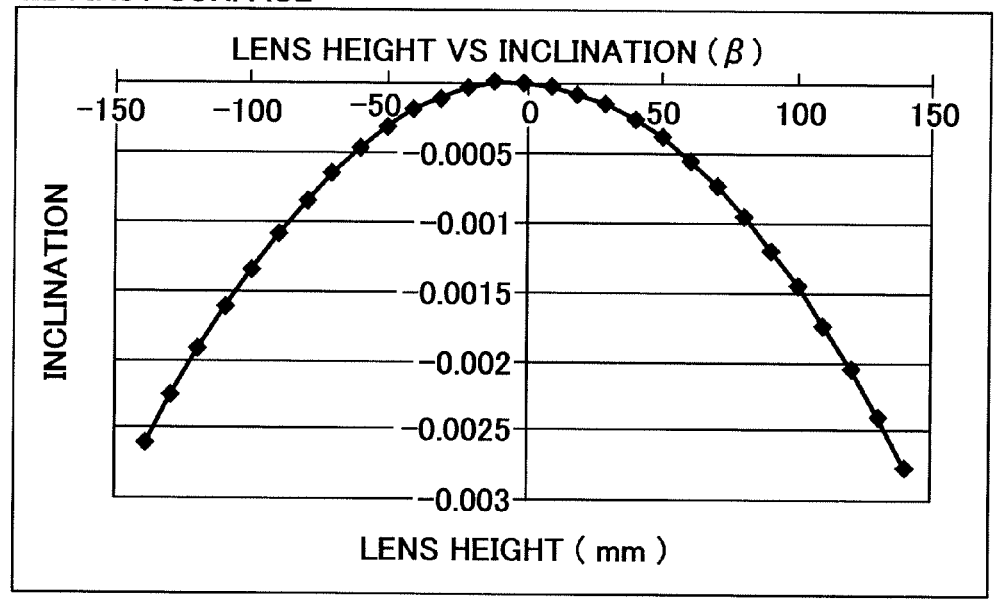
FIG. 5B is a diagram of an example of the change in the amount of tilting in the special tilted and decentered surface between the image heights and is a diagram illustrating an inclination of a first surface of a scanning lens on a side of a surface that is subjected to scanning.
Figure 6A:
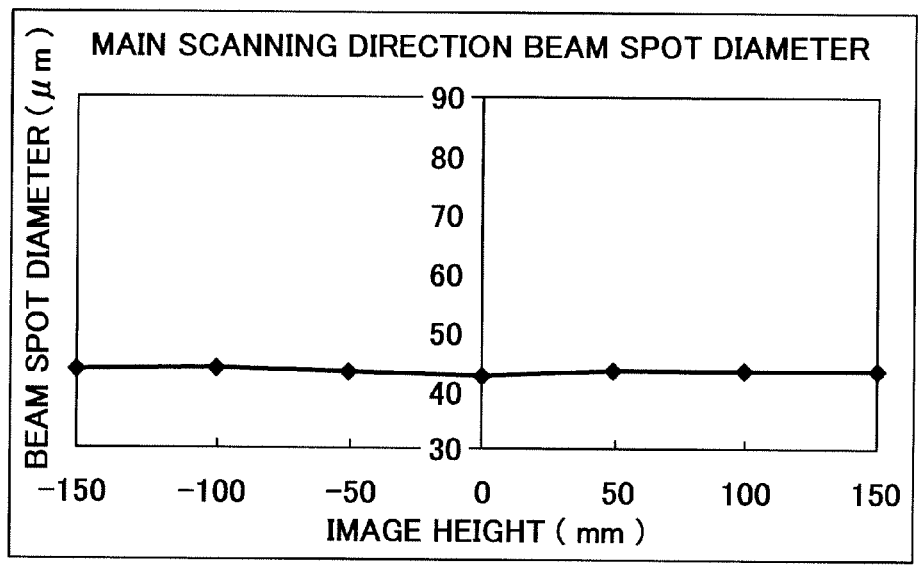
FIG. 6A is a graph illustrating a main scanning direction beam spot diameter on the scanning surface after using a tilted decentered surface and the special tilted and decentered surface on the scanning lens according to the first embodiment.
Figure 6B:
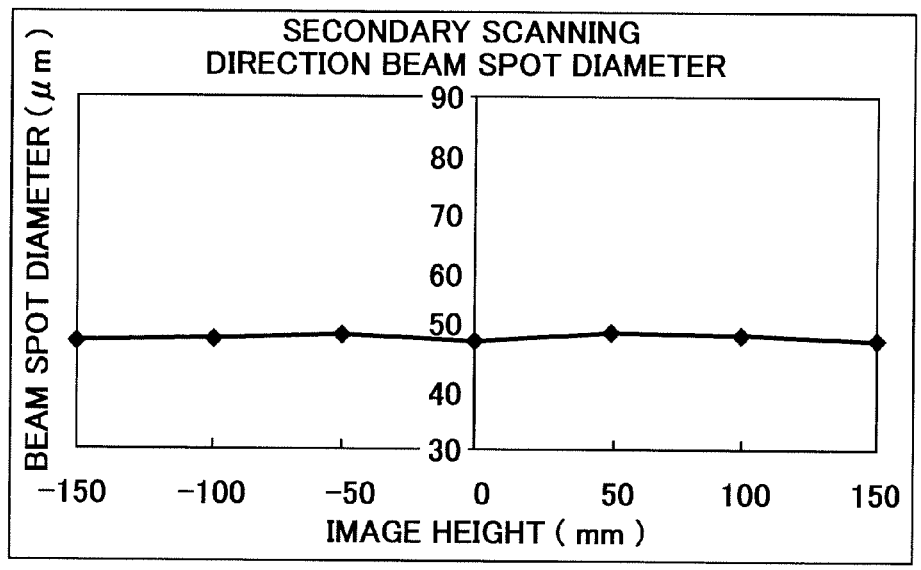
FIG. 6B is a graph illustrating a secondary scanning direction beam spot diameter on the scanning surface after using the tilted decentered surface and the special tilted and decentered surface on the scanning lens according to the first embodiment.
Figure 6C:
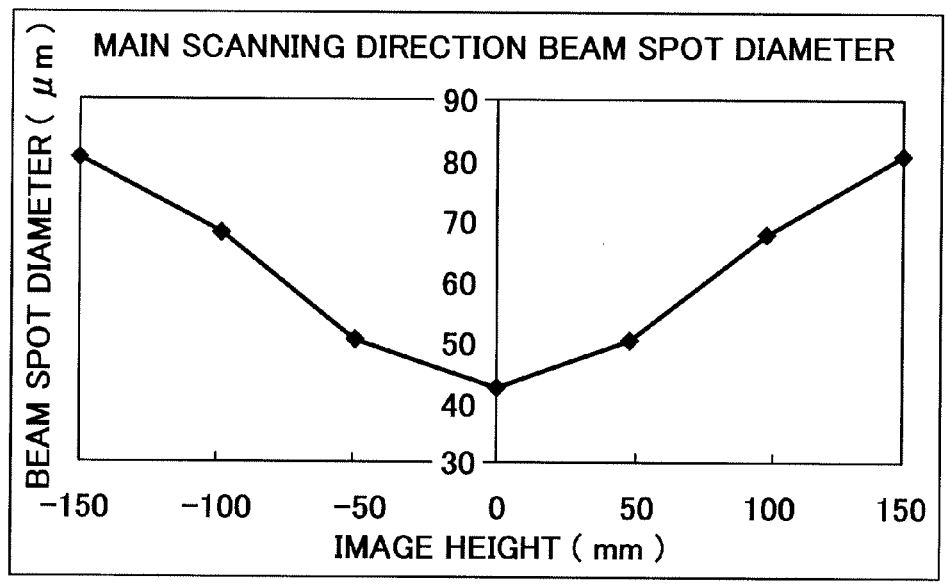
FIG. 6C is a graph illustrating the main scanning direction beam spot diameter on the scanning surface before using the tilted decentered surface and the special tilted and decentered surface on the scanning lens according to the first embodiment.
Figure 6D:
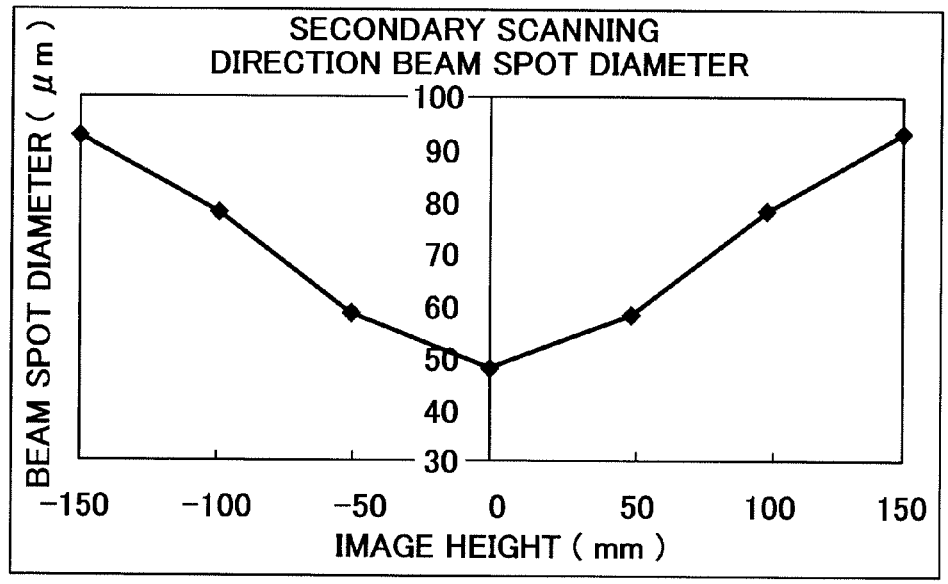
FIG. 6D is a graph illustrating the secondary scanning direction beam spot diameter on the scanning surface before using the tilted decentered surface and the special tilted and decentered surface on the scanning lens according to the first embodiment.

A change in an amount of tilting between the image heights of the special tilted and decentered surface according the first numerical example is shown in FIGS. 5A and 5B. FIG. 5A is a graph of inclination of a second surface of a scanning lens that is nearest to the polygon mirror and FIG. 5B is a graph of inclination of a first surface of the scanning lens on a side of a scanning surface. A sign of slope is reversed according to a direction of an angle of oblique incidence on the deflecting and reflecting surface.

FIGS. 6A, 6B, 6C, and 6D are graphs illustrating beam spot diameter on the scanning surface before and after using the tilted decentered surface and the special tilted and decentered surface. From FIGS. 6A, 6B, 6C, and 6D, it can be seen that the wave front aberration is corrected satisfactorily and the beam spot diameter is narrowed effectively.

Figure 7A:
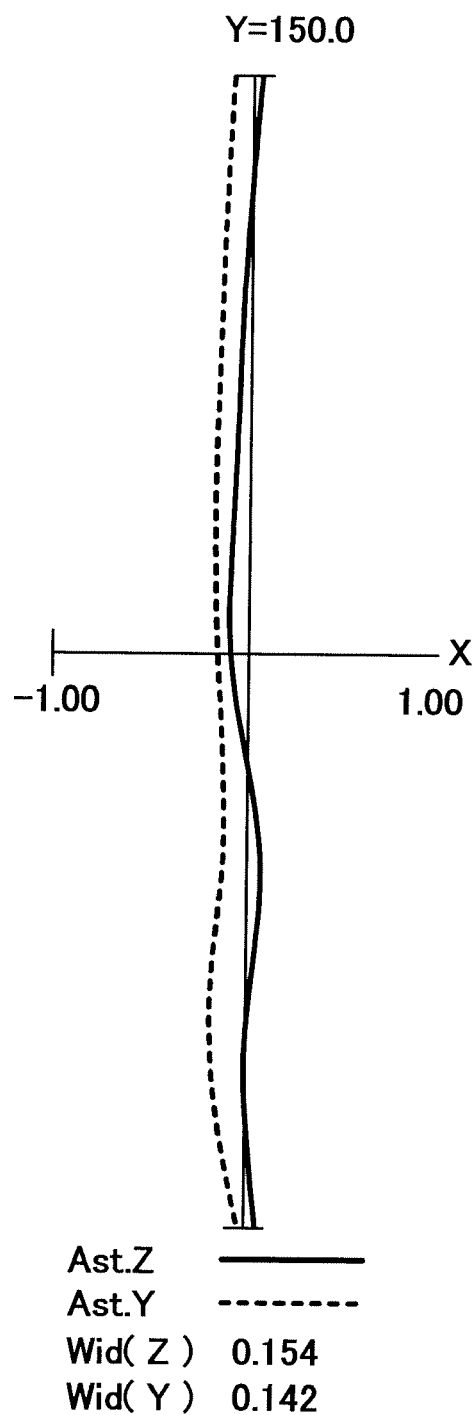
FIG. 7A is an illustration of optical characteristics in an example of the optical scanning unit and is an aberration diagram illustrating an image plane curvature in the main scanning direction and the secondary scanning direction.
Figure 7B:
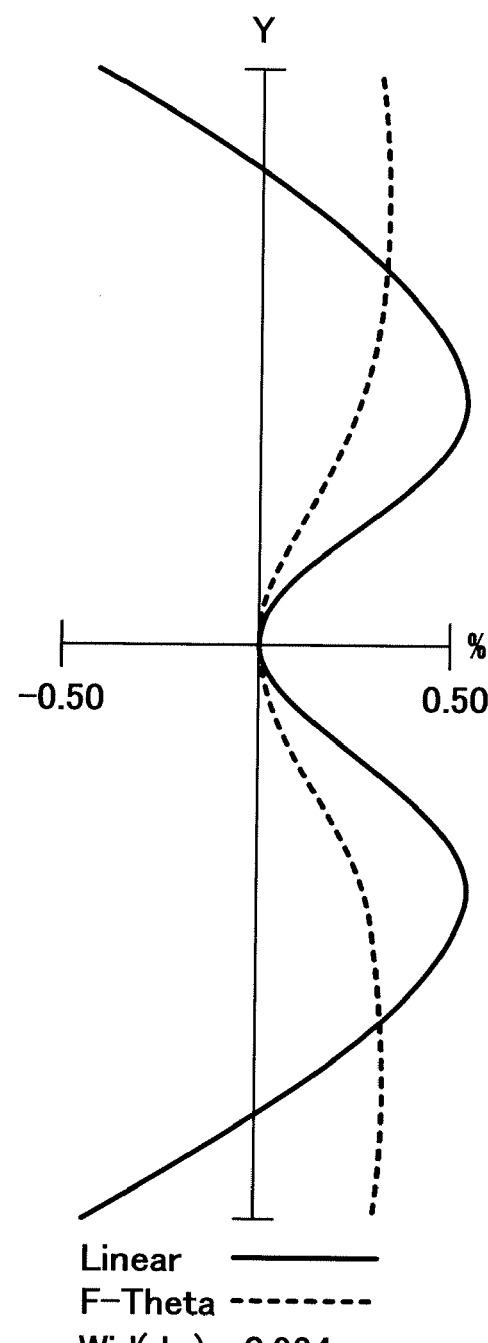
FIG. 7B is an illustration of optical characteristics according an example of the optical scanning unit and is an aberration diagram illustrating fθ characteristics and linearity.

FIGS. 7A and 7B are illustrations of optical characteristics in an example of the optical scanning unit according to the present invention. An image plane curvature in the main scanning direction and in the secondary scanning direction is shown in FIG. 7A. An aberration diagram of linearity and fθ characteristics are shown in FIG. 7B. As can be seen in FIGS. 7A and 7B, the optical performance is corrected satisfactorily.

Table 3 represents data of the scanning-imaging optical system. In table 3, X denotes the distance in the direction of the optical axis (the optical axis of the lens L1) when each surface is projected on to a surface that is perpendicular to the axis of rotation of the polygon mirror. Unlike in the first numerical example, in the second numerical example, the light beam is incident obliquely at an angle of 2.4° with respect to the deflecting and reflecting surface of the polygon mirror. The rest of the data of optical components is same as that in the first numerical example.

TABLE 3

Data of scanning-imaging optical system

| Surface number | RY (mm) | RZ (mm) | X (mm) | N | Note |
|---|---|---|---|---|---|
| Deflecting surface | ∞ | ∞ | 76.63 | — | Deflecting surface |
| 1* | −801.412 | ∞ | 22.99 | 1.5273 | Scanning-imaging lens |
| 2* | −119.317 | ∞ | 146.32 | — | |
| 3* | −1050.624 | ∞ | 3.06 | 1.5273 | Scanning-imaging lens |
| 4** | −2238.605 | −42.465 | 121.64 | — | |
| 5 | — | — | — | — | Scanning surface |

The shape in the main scanning direction of each surface with * mark is non-circular and in the secondary scanning direction is flat. The shape of the surface of the lens is given by Eq. (2). Surfaces 2 and 3 are special tilted and decentered surfaces.

An aspheric coefficient according to the second numerical example is shown in table 4.

TABLE 4

| | First surface | Second surface | Third surface | Fourth surface |
|---|---|---|---|---|
| RY | −801.412 | −119.317 | −1050.624 | −2238.605 |
| K | 1.908E−01 | 4.603E−01 | 4.248E+01 | −1.208E+3 |
| A | −1.466E−07 | −4.650E−08 | 2.166E−08 | 3.078E−09 |
| B | 3.771E−11 | 2.232E−11 | 1.748E−12 | −8.738E−13 |
| C | −4.958E−15 | −3.241E−15 | −1.635E−16 | 1.456E−16 |
| D | −5.051E−19 | 6.931E−20 | 1.343E−21 | −1.442E−20 |
| E | 1.489E−22 | 1.072E−22 | 1.599E−25 | 4.420E−25 |
| F | −1.331E−26 | −2.441E−26 | — | — |
| RZ | ∞ | ∞ | ∞ | −42.467 |
| a | — | — | — | −4.017E−07 |
| b | — | — | — | 2.935E−07 |
| c | — | — | — | 1.390E−13 |
| d | — | — | — | −9.349E−12 |
| e | — | — | — | 2.419E−14 |
| f | — | — | — | 1.564E−16 |
| g | — | — | — | −5.891E−18 |
| h | — | — | — | 6.554E−20 |
| i | — | — | — | 4.871E−22 |
| j | — | — | — | −8.549E−24 |
| k | — | — | — | −1.339E−26 |
| l | — | — | — | 2.838E−28 |
| F0 | — | — | — | — |
| F1 | — | — | 1.688E−06 | — |
| F2 | — | 4.615E−06 | 1.837E−07 | — |
| F3 | — | — | 1.740E−11 | — |
| F4 | — | 2.860E−09 | 4.566E−11 | — |
| F5 | — | — | −7.762E−15 | — |
| F6 | — | −1.042E−12 | −4.834E−15 | — |
| F7 | — | — | 1.321E−19 | — |
| F8 | — | 8.740E−17 | 1.130E−19 | — |

In the optical system according to the second numerical example, a noise proof glass of thickness 1.9 mm (refractive index 1.5143) is inserted. The noise proof glass is disposed in a position inclined at 8° only in the deflecting surface. According to the second numerical example, by using the special tilted and decentered surface, the bending of the scanning lines is corrected from 174 μm to 1 μm.

Figure 11A:
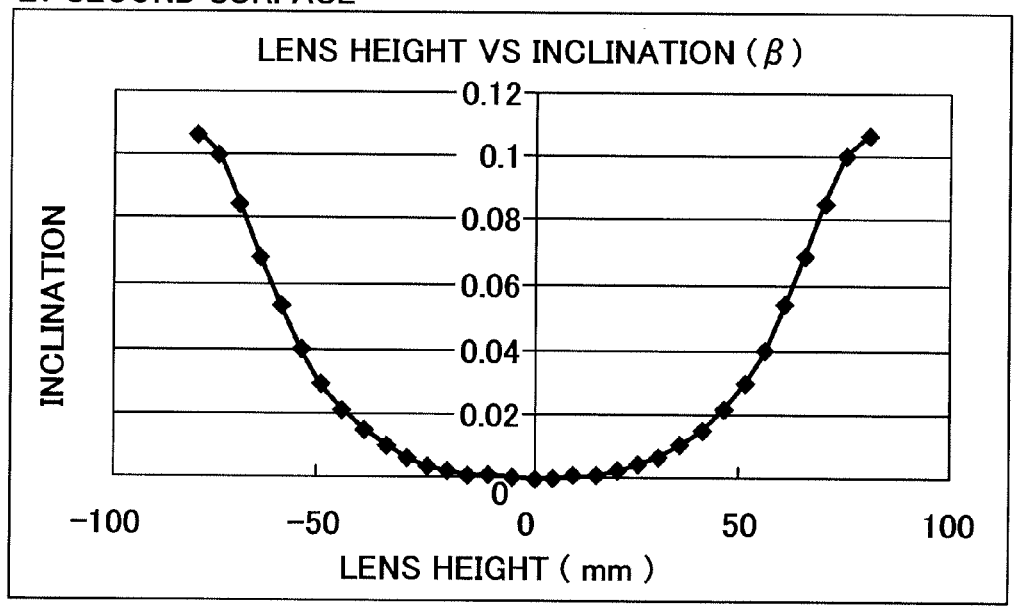
FIG. 11A is a diagram of an example of a change in the amount of tilting in the special tilted and decentered surface between image heights and is a diagram illustrating the inclination of the second surface of the scanning lens that is nearest to the polygon mirror, according to the other embodiment.
Figure 11B:
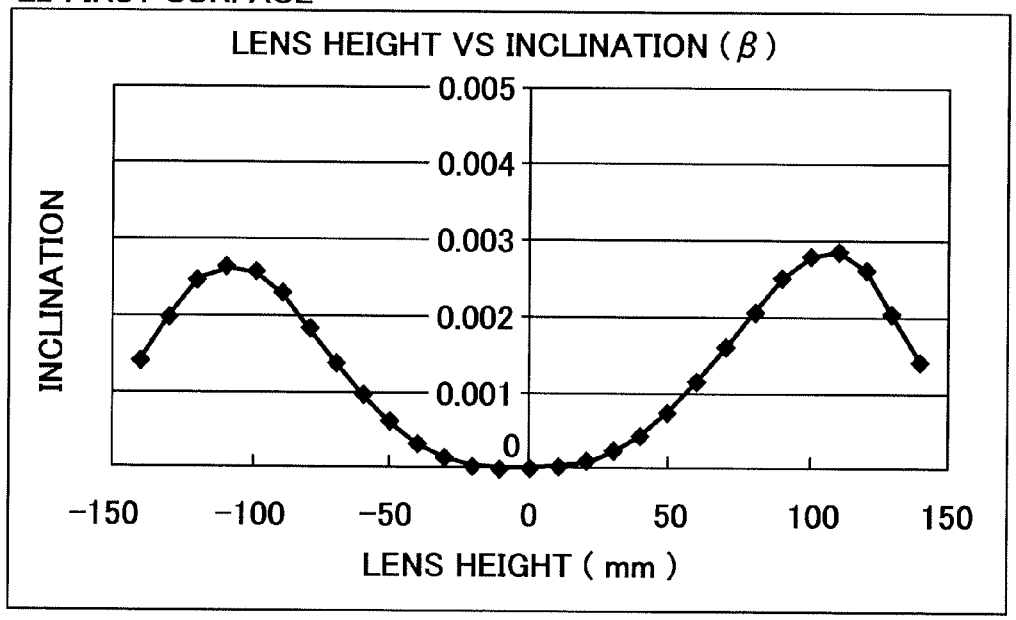
FIG. 11B is a diagram of an example of the change in the amount of tilting in the special tilted and decentered surface between the image heights and is a diagram illustrating the inclination of the first surface of the scanning lens on the side of the surface that is subjected to scanning, according to the other embodiment.
Figure 12A:
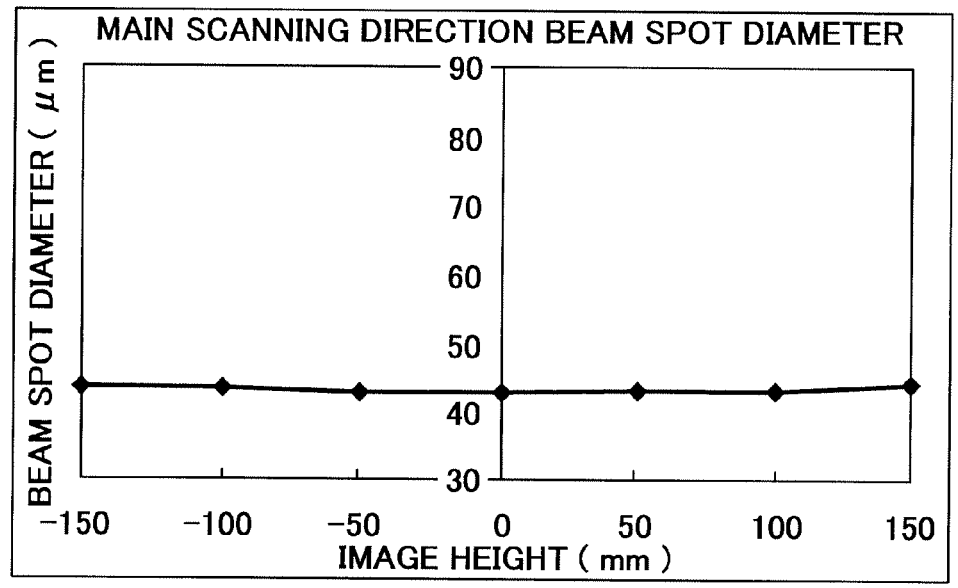
FIG. 12A is a graph illustrating the main scanning direction beam spot diameter on the scanning surface after using the tilted decentered surface and the special tilted and decentered surface on the scanning lens according to the other embodiment.
Figure 12B:
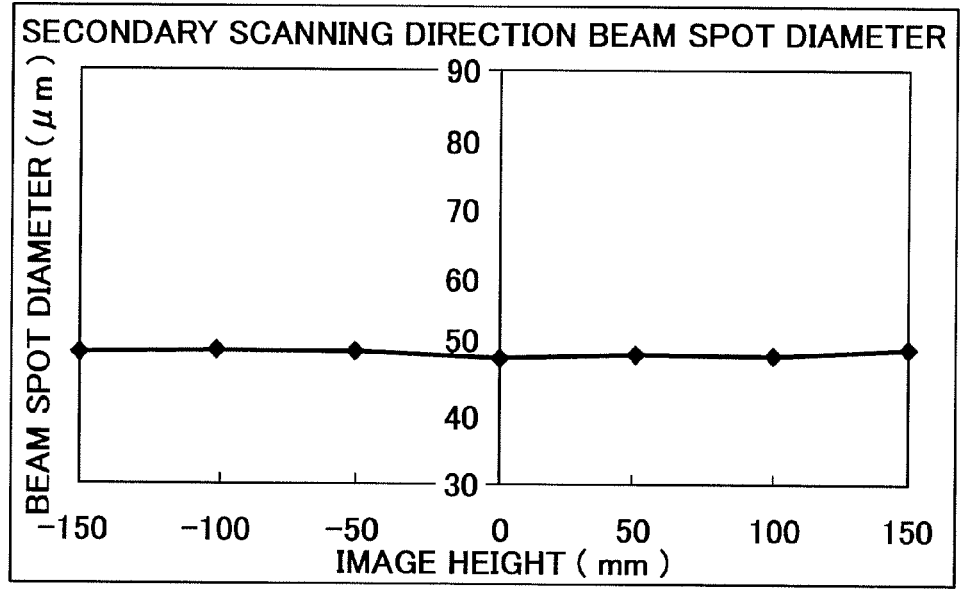
FIG. 12B is a graph illustrating the secondary scanning direction beam spot diameter on the scanning surface after using the tilted decentered surface and the special tilted and decentered surface on the scanning lens according to the other embodiment.
Figure 12C:
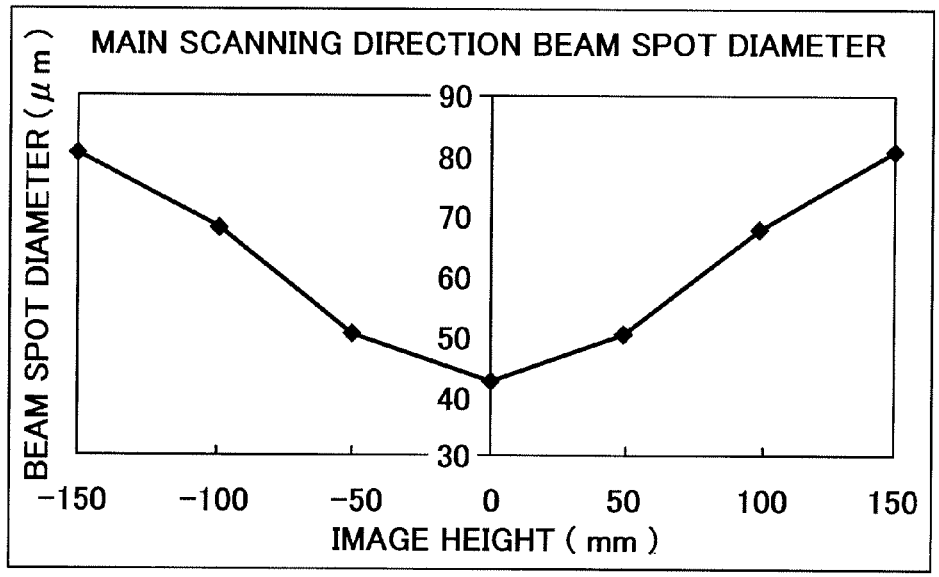
FIG. 12C is a graph illustrating the main scanning direction beam spot diameter on the surface before using the tilted decentered surface and the special tilted and decentered surface on the scanning lens according to the other embodiment.
Figure 12D:
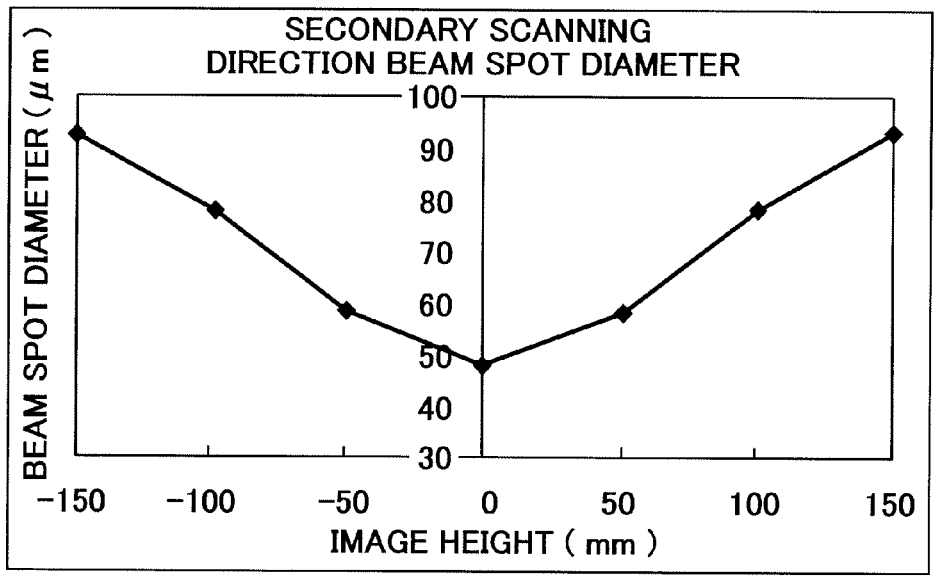
FIG. 12D is a graph illustrating the main scanning direction beam spot diameter on the surface before using the tilted decentered surface and the special tilted and decentered surface on the scanning lens according to the other embodiment.

The change in the amount of tilting between the image heights of the special titled decentered surface according to the second numerical example is shown in FIGS. 11A and 11B. FIG. 11B is a graph of inclination of the second surface of the scanning lens that is nearest to the polygon mirror and FIG. 11B is a graph of inclination of the first surface of the scanning lens on the side of the scanning surface. The sign of slope is reversed according to the direction of the angle of oblique incidence on the deflecting and reflecting surface.

FIGS. 12A, 12B, 12C, and 12D are graphs illustrating beam spot diameter in the scanning surface before and after using the special tilted and decentered surface. From FIGS. 12A, 12B, 12C, and 12D, it can be seen that the wave front aberration is corrected satisfactorily and the beam spot diameter is narrowed effectively.

Figure 13A:
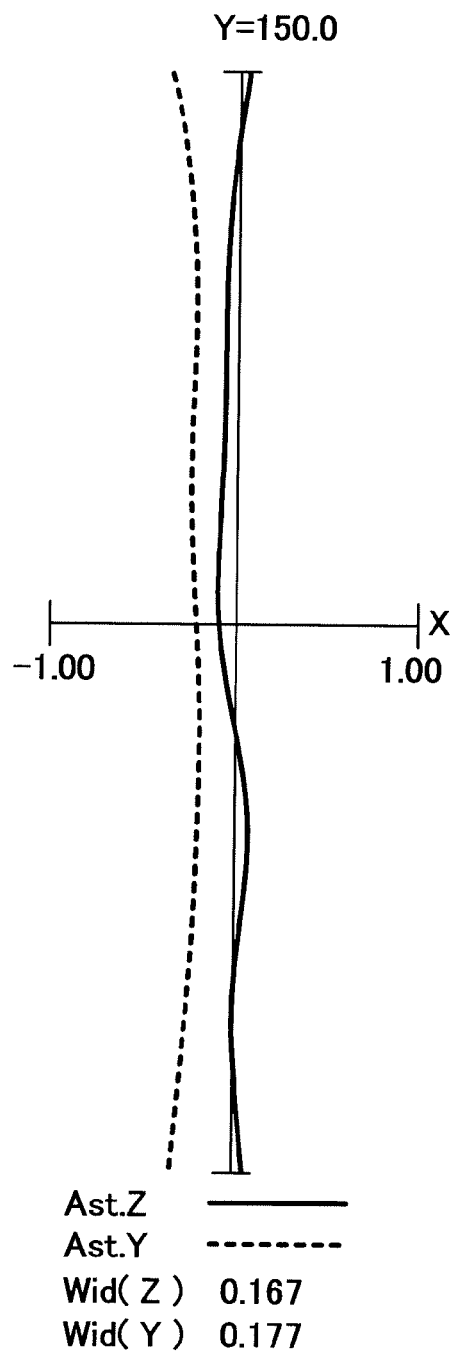
FIG. 13A is an illustration of optical characteristics according to the first embodiment and is an aberration diagram illustrating the image plane curvature in the main scanning direction and the secondary scanning direction.
Figure 13B:
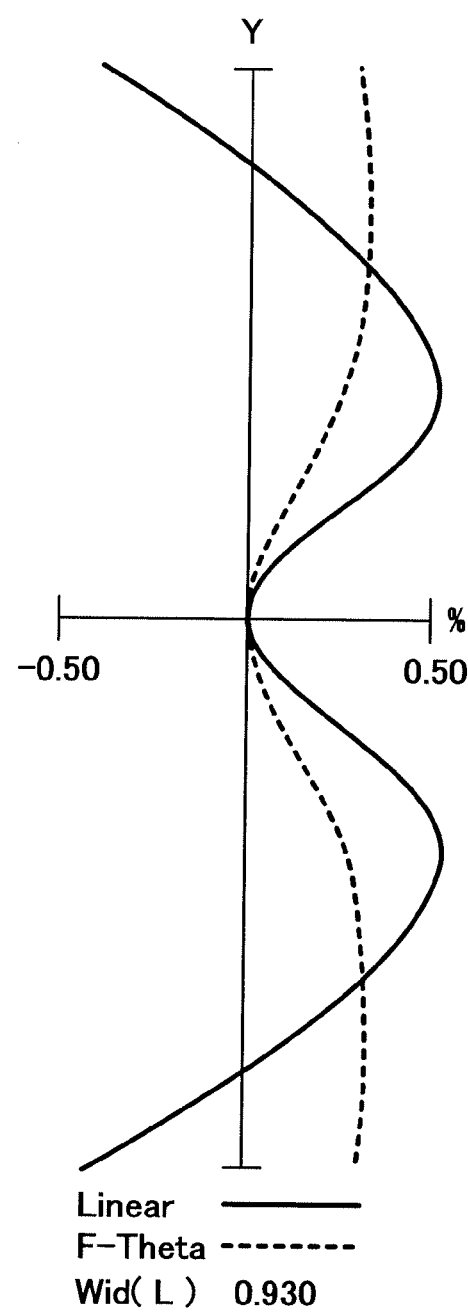
FIG. 13B is an illustration of optical characteristics according to the first embodiment and is an aberration diagram illustrating fθ characteristics and linearity.

FIGS. 13A and 13B are illustrations of optical characteristics in the examples of the optical scanning unit according to the present invention. The image plane curvature in the main scanning direction and in the secondary scanning direction is shown in FIG. 13A. The aberration diagram of linearity and fθ characteristics are shown in FIG. 13B. As can be seen in FIGS. 13A and 13B, the optical performance is corrected satisfactorily.

Table 5 represents data of the scanning-imaging optical system. In table 5, X denotes the distance in the direction of the optical axis (the optical axis of the lens L1) when each surface is projected on to a surface that is perpendicular to the axis of rotation of the polygon mirror.

TABLE 5

| Surface number | RY (mm) | RZ (mm) | X (mm) | N | Note |
|---|---|---|---|---|---|
| Deflecting surface | ∞ | ∞ | 76.63 | — | Deflecting surface |
| 1* | −801.412 | ∞ | 22.99 | 1.5273 | Scanning-imaging lens |
| 2* | −119.317 | ∞ | 146.32 | — | — |
| 3* | −1050.624 | ∞ | 3.06 | 1.5273 | Scanning-imaging lens |
| 4** | −2238.605 | −42.467 | 121.64 | — | — |
| 5 | — | — | — | — | Scanning surface |

The shape in the main scanning direction of each surface with * mark is non-circular and in the secondary scanning direction is flat.

The shape of the surface of the lens is given by Eq. (2). Surfaces 2 and 3 are special tilted and decentered surfaces.

The aspheric coefficient according to the third numerical example is shown in table 6.

TABLE 6

| | First surface | Second surface | Third surface | Fourth surface |
|---|---|---|---|---|
| RY | −801.412 | −119.317 | −1050.624 | −2238.605 |
| K | 1.908E−01 | 4.603E−01 | 4.248E+01 | −1.208E+3 |
| A | −1.466E−07 | −4.650E−08 | 2.166E−08 | 3.078E−09 |
| B | 3.771E−11 | 2.232E−11 | 1.748E−12 | −8.738E−13 |
| C | −4.958E−15 | −3.241E−15 | −1.635E−16 | 1.456E−16 |
| D | −5.051E−19 | 6.931E−20 | 1.343E−21 | −1.442E−20 |
| E | 1.489E−22 | 1.072E−22 | 1.599E−25 | 4.420E−25 |
| F | −1.331E−26 | −2.441E−26 | — | — |
| RZ | ∞ | ∞ | ∞ | −42.467 |
| a | — | — | — | −4.017E−07 |
| b | — | — | — | 2.935E−07 |
| c | — | — | — | 1.390E−13 |
| d | — | — | — | −9.349E−12 |
| e | — | — | — | 2.419E−14 |
| f | — | — | — | 1.564E−16 |
| g | — | — | — | −5.891E−18 |
| h | — | — | — | 6.554E−20 |
| i | — | — | — | 4.871E−22 |
| j | — | — | — | −8.549E−24 |
| k | — | — | — | −1.339E−26 |
| l | — | — | — | 2.838E−28 |
| F0 | — | — | — | — |
| F1 | — | — | 1.771E−06 | — |
| F2 | — | 4.707E−06 | 1.967E−07 | — |
| F3 | — | — | −6.909E−11 | — |
| F4 | — | 2.876E−09 | 4.510E−11 | — |
| F5 | — | — | — | — |
| F6 | — | −1.036E−12 | −4.676E−15 | — |
| F7 | — | — | — | — |
| F8 | — | 9.372E−17 | 1.105E−19 | — |

In the optical system according to the third numerical example, a noise proof glass of thickness 1.9 mm (refractive index 1.5143) is inserted. The noise glass is disposed in a position inclined at 8° only in the deflecting surface. According to the third numerical example, by using the special tilted and decentered surface, the bending of the scanning lines is corrected from 174 μm to 1 μm.

FIGS. 20A, 20B, 20C, and 20D are graphs illustrating beam spot diameter in the scanning surface before and after using the special tilted and decentered surface. From FIGS. 20A, 20B, 20C, and 20D, it can be seen that the wave front aberration is corrected satisfactorily and the beam spot diameter is narrowed effectively.

Figure 21A:
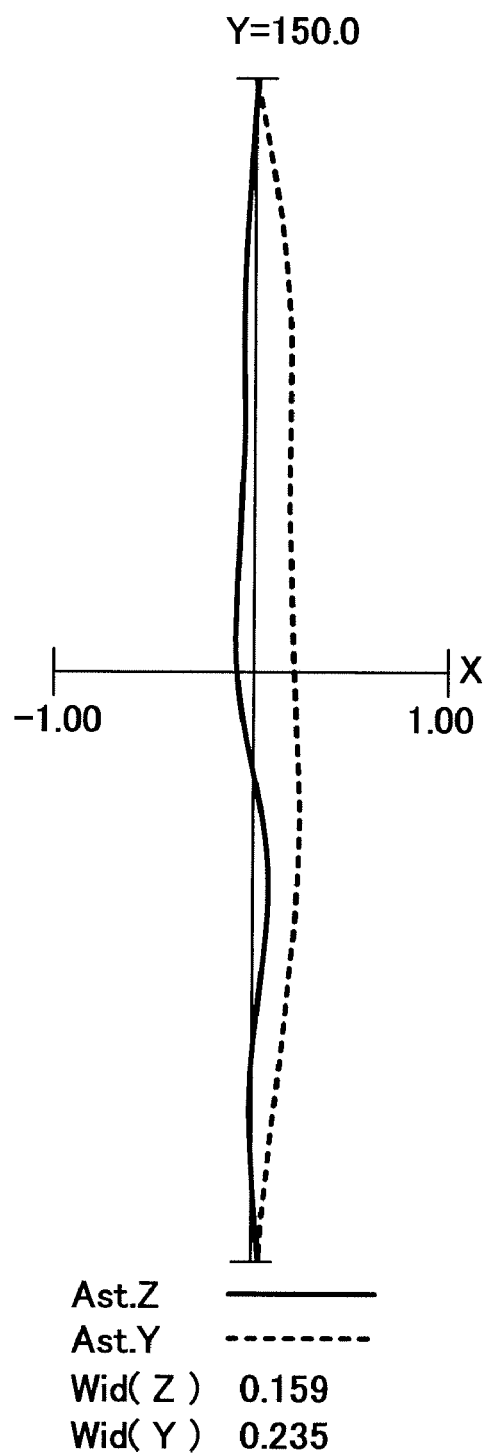
FIG. 21A is an illustration of optical characteristics according to the third numerical example and is a diagram illustrating the image plane curvature in the main scanning direction and the secondary scanning direction.
Figure 21B:
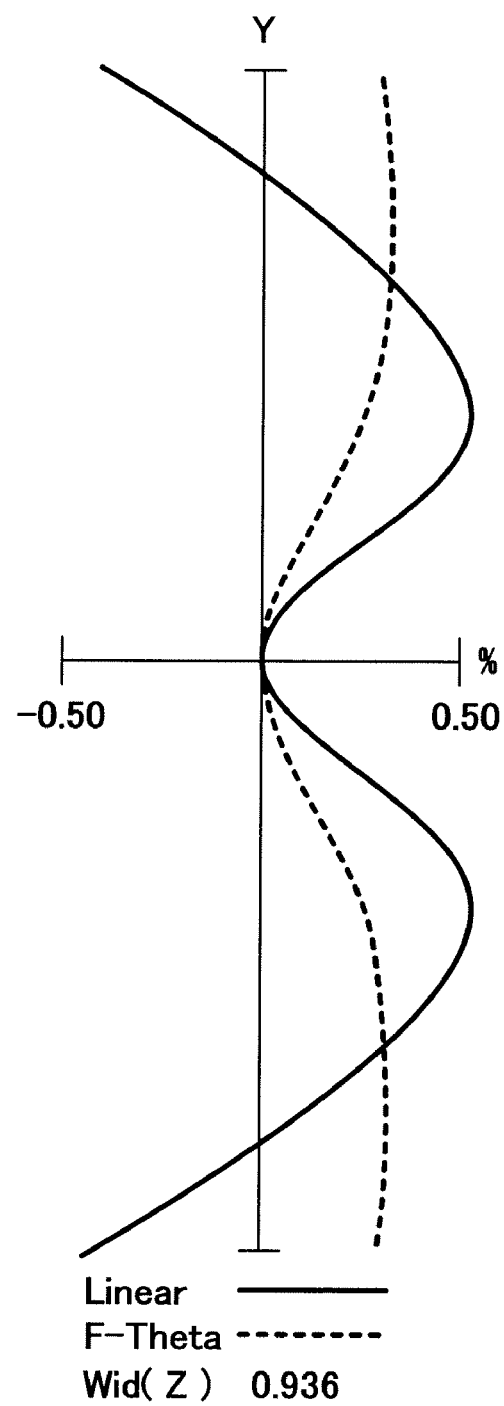
FIG. 21B is an illustration of optical characteristics according to the third numerical example and is an aberration diagram illustrating fθ characteristics and linearity.

FIGS. 21A and 21B are illustrations of optical characteristics in the examples of the optical scanning unit according to the present invention. The image plane curvature in the main scanning direction and in the secondary scanning direction is shown in FIG. 21A. The aberration diagram of linearity and fθ characteristics are shown in FIG. 21B. As can be seen in FIGS. 21A and 21B, the optical performance is corrected satisfactorily.

Thus, according to the first embodiment, the optical scanning unit includes the coupling optical system, the first optical system, the light deflector, and the scanning optical system. The coupling optical system performs coupling of the light beam that is emitted from the light source. The first optical system focuses the light beam from the coupling optical system in a long line form in the main scanning direction. The light deflector performs deflection scanning of the light beam from the first optical system. The scanning optical system focuses the light beam that is deflected at the light deflector, on the scanning surface. The light beam from the scanning optical system is at an angle in the secondary scanning direction with respect to the normal of the deflecting and reflecting surface of the light deflector. At least one surface of the scanning optical system is formed such that it does not have a curvature in the secondary scanning direction and is tilted and decentered in the secondary scanning direction. This enables to realize the optical scanning unit that can correct effectively the deterioration of the wave front aberration and the bending of the scanning lines in the oblique incidence optical system.

With a plurality of light sources, the scanning lens that is nearest to the light deflector in the scanning optical system can be used for the plurality of light beams from the plurality of light sources. By using the scanning lens in such a manner in the color image forming apparatus, it is possible to achieve the optical scanning unit that enables to obtain a high quality color image with a small color shift.

Moreover, the light beams emitted from the plurality of light sources are allowed to be separated by a predetermined distance in the secondary scanning direction. By using the light beam that is horizontal with the normal of the deflecting and reflecting surface of the light deflector and the light beam that is brought closer to this beam on the deflecting and reflecting surface and which makes an angle in the secondary scanning direction with respect to the normal of the deflecting and reflecting surface of the light deflector, the size of the optical scanning unit can be reduced.

By using the multi-beams, the number of rotations of the light deflector can be reduces, thereby reducing the speed and the power consumption of the light deflector. This enables to realize an eco-friendly optical scanning unit and an image forming apparatus.

The following is a description of an optical scanning unit and an image forming apparatus according to a third embodiment of the present invention with reference to FIGS. 22 to 29. To start with, to simplify understanding of the third embodiment, an optical system that is created based on the present invention is used for comparison.

Figure 22A:
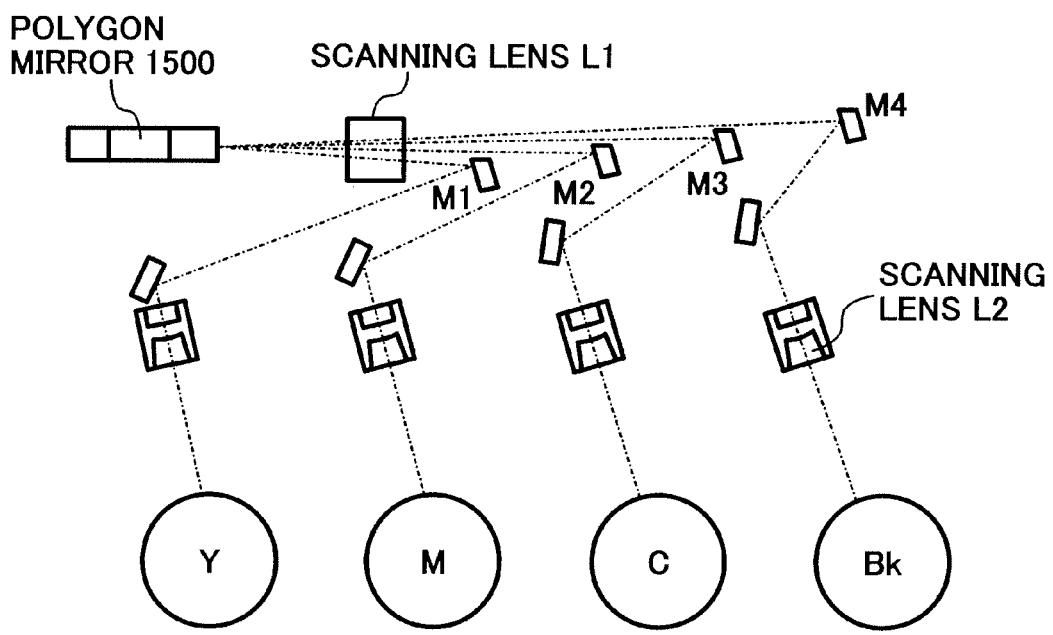
FIG. 22A is a first example for comparison for simplified illustration of the present invention.

According to FIG. 22A, a light beam corresponding to each of the colors Y, M, C, and K is allowed to be incident obliquely on a polygon mirror 1500. This allows a use of the polygon mirror 1500 which is thin, thereby realizing a light deflector that is advantageous from the point of view of windage loss, power consumption, and durability. Each of the light beams is reflected at almost the same location in the direction corresponding to the secondary scanning direction and the thickness of the polygon mirror is 3 mm. Further, the light beam corresponding to each of the Y, M, C, and K colors is allowed to be incident on the polygon mirror 1500 with a big angle of oblique incidence to separate the light beams at separating mirrors M1 to M4 that are included in a long mirror. In a first example for comparison, the light rays of Y and K colors are incident at an angle of 10°. Since, it is necessary to have a big angle of incidence on the polygon mirror 1500, there is a substantial bending of the scanning lines. The bending of the scanning lines can be improved to some extent by ways such as shifting the scanning lens L2 in the secondary scanning direction. However, it is difficult to improve the thickening of the beam spot caused by the deterioration of the wave front aberration, and unevenness in density and deterioration of gradation become problematic.

Figure 22B:
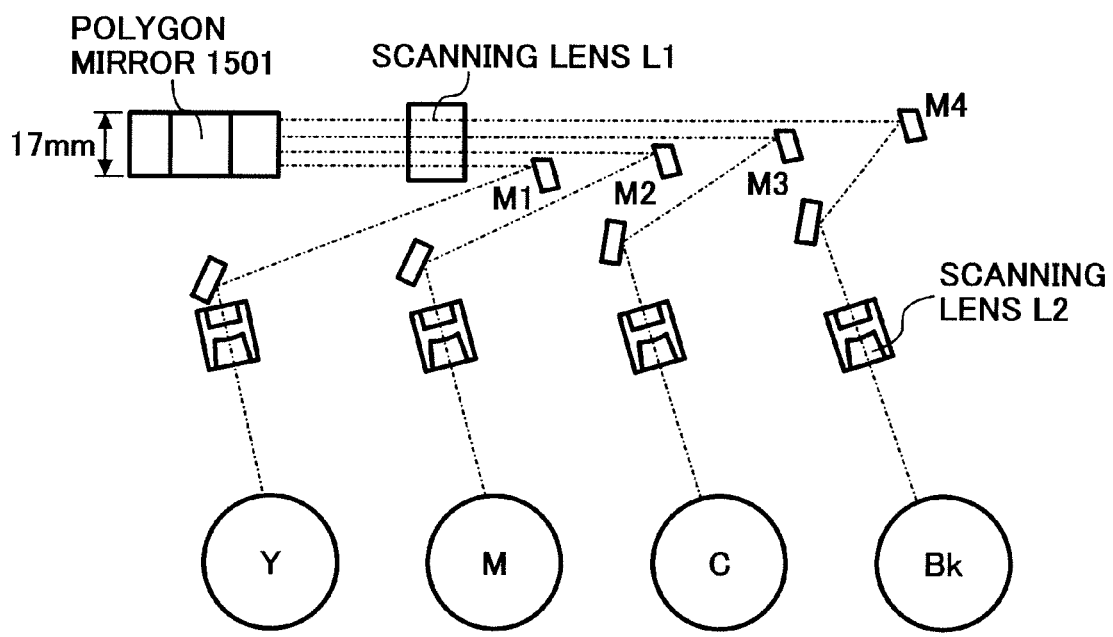
FIG. 22B is a second example for comparison for simplified illustration of the present invention.

According to FIG. 22B, an arrangement is such that the light beams corresponding to the Y, M, C, K colors are incident on the surface of the deflecting mirror such that they are parallel to each other. Each light beam is at a distance of 5 mm from the other light beam and the thickness of the polygon mirror is 17 mm. The light beams corresponding to Y, M, C, and K colors are passed jointly through the scanning lens L1 and are roughly parallel to each other while passing through the scanning lens L1. The distance between the light beams is 5 mm and the height of the scanning lens L1 is 20 mm. With such an arrangement, each light beam is separated by the separating mirrors M1 to M4 included in the long mirror.

According to the second example for comparison, since a polygon mirror 1501 is thick, the deflector becomes big resulting in an increase in the size of the apparatus. This results in the noise caused by windage loss, increase in the power consumption, and deterioration of the durability. Moreover, due to an increase in the height of the scanning lens L1, it becomes difficult to compensate the difference in the figure tolerance and to reduce the beam spot diameter. Due to the thickening, it becomes difficult to reduce the cost raised caused by an increased time of formation.

Figure 23A:
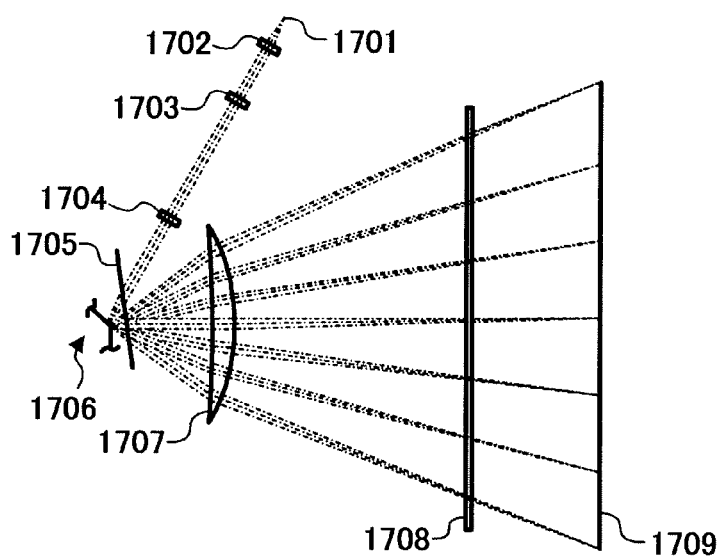
FIG. 23A is a diagram of a layout of the example for comparison and the optical system according to the present invention.
Figure 23B:
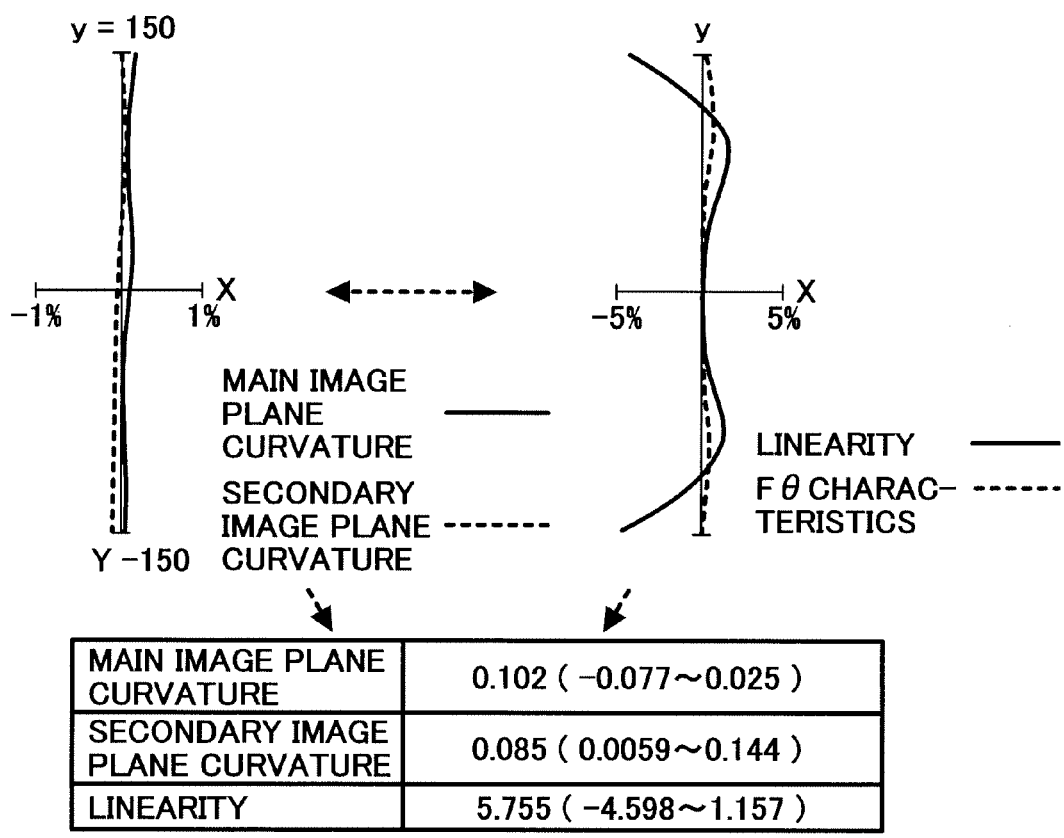
FIG. 23B is a diagram illustrating geometric aberration of the example for comparison.

A geometric optical performance and a layout of this optical system are shown in FIGS. 23A and 23B. FIG. 23A is a diagram of an optical path. The optical system includes a light source (semiconductor laser array) 1701, a coupling lens 1702, an aperture 1703, a cylindrical lens 1704, a cover lens 1705, a light deflector 1706, a scanning lens 1707 (L1), a scanning lens 1708 (L2), and a scanning surface 1709.

FIG. 23B is a diagram of geometric aberration. A continuous line in a graph on a left side illustrates an image plane curvature in the main scanning direction and a dashed line illustrates an image plane curvature in the secondary scanning direction. A continuous line in a graph on a right side illustrates linearity and a dashed line illustrates Fθ characteristics. Y axis of the graph is an image height.

In the geometric optical performance, the linearity, which is approximately 5.7%, is slightly on a higher side. When the scanning optical system is assembled, based on data of linearity (or position shift of beam spot in the main scanning direction) that is measured, a position of an image clock is shifted to correct the linearity. Thus, the correction is applied electrically by shifting the position of the image clock (see Japanese Patent Application Laid-open Publication No. 2002-36625).

Concrete numerical examples related to the optical scanning unit according to the present invention are given below. A layout of the optical system is as shown in FIG. 23A. Data of an optical system before the light deflector is as shown in table 7. RY is a radius of curvature in the main scanning direction, RZ is a radius of curvature in the secondary scanning direction (center of lens), N is a refractive index at a wavelength used (655 nm), and X is a distance in a direction of an optical axis (direction of an optical axis of the lens L1) when each surface is projected on to a surface that is perpendicular to an axis of rotation of the polygon mirror. Surface number 4 is a paraxial aspheric surface. Although the numerical value is not shown, the wave front aberration of a light beam emerged from the coupling lens is corrected satisfactorily. A light deflector has a dimension 18 mm and is a hexahedral polygon mirror.

TABLE 7

| Surface number | RY (mm) | RZ (mm) | X (mm) | N | Note |
|---|---|---|---|---|---|
| Light source | — | — | −3.944 | — | Semiconductor laser array |
| 1 | ∞ | ∞ | 0.3 | 1.51 | Cover glass |
| 2 | ∞ | ∞ | 20.0 | — | — |
| 3 | | | 4.5 | 1.6935 | Coupling lens |
| 4* | −18.486 | −18.486 | 15.0 | — | — |
| 5 | ∞ | ∞ | 100 | — | Opening width (main 5.6 × secondary 0.64) |
| 6 | ∞ | 48.0 | 3.0 | 1.5168 | Cylindrical lens |
| 7 | ∞ | ∞ | 93.57 | — | — |
| 8 | — | — | — | — | Deflecting surface |

Data of an optical system after the light deflector is shown in Table 8. In this case, β denotes a secondary scanning magnification between the light deflector and the scanning surface and is 0.38. A shape in the main scanning direction of each of the surfaces surface number 1 and surface number 2 is non-circular and in the secondary scanning direction is flat. The shape of the surface of the lens is given by the following Eq. (4).

$$X(Y, Z) = \frac{Cm \cdot Y^2}{1 + \sqrt{1 - (1+K) \cdot (Y \cdot Cm)^2}} + A_4 \cdot Y^4 + A_6 \cdot Y^6 + A_8 \cdot Y^8 + \quad (4)$$

-continued $$A_{10} \cdot Y^{10} + A_{12} \cdot Y^{12} + A_{14} \cdot Y^{14} + \frac{Cs(Y) \cdot Z^2}{1 + \sqrt{1 - (Cs(Y) \cdot Z)^2}}$$

where, Cm=1/RY and $Cs(Y)=1/RZ+B1\cdot Y+B2\cdot Y2+B3\cdot Y3+B4\cdot Y4+B5\cdot Y5+\ldots$

TABLE 8

| Surface number | RY (mm) | RZ (mm) | X (mm) | N | Note |
|---|---|---|---|---|---|
| Deflecting surface | ∞ | ∞ | 77.93 | — | Deflecting surface |
| 1* | −696.8 | ∞ | 17.07 | 1.5305 | Scanning lens L1 |
| 2* | −118.882 | ∞ | 171.5 | — | |
| 3** | 2709.20 | −27.296 | 3.5 | 1.5305 | Scanning lens L2 |
| 4** | 2167.36 | −16.495 | 100.0 | — | |
| 5 | — | — | — | — | Scanning surface |

An aspheric coefficient according to this example is as shown in table 9 below. In the present optical system, a noise proof glass of thickness 1.9 mm (refractive index 1.51) is inserted. The noise proof glass is disposed at a position inclined 8° only, in the deflecting surface.

TABLE 9

| | First surface | Second surface | Third surface | Fourth surface |
|---|---|---|---|---|
| $R_Y$ | −696.8 | −118.88 | 2709.2 | 2167.4 |
| K | 1.1764E+02 | 2.1136E+00 | −5.5639E+23 | −9.6122E+02 |
| $A_4$ | −1.2398E−07 | 5.7148E−08 | −5.1510E−09 | −1.7564E−09 |
| $A_6$ | 3.7031E−11 | 2.8529E−11 | 3.1396E−13 | −4.5995E−13 |
| $A_8$ | 3.5715E−15 | 6.6969E−15 | 1.0070E−17 | 8.4327E−19 |
| $A_{10}$ | 2.7486E−19 | 1.2031E−18 | 2.0204E−22 | 5.3773E−22 |
| $A_{12}$ | −1.4610E−23 | 1.8696E−22 | 6.9833E−27 | 2.3714E−26 |
| $A_{14}$ | −2.5118E−26 | −8.2308E−28 | — | |
| $R_Z$ | ∞ | ∞ | −27.495 | −16.495 |
| $B_1$ | — | — | — | −3.5150E−08 |
| $B_2$ | — | — | 5.2106E−06 | 5.0773E−06 |
| $B_3$ | — | — | — | −5.6045E−11 |
| $B_4$ | — | — | −1.7519E−10 | −1.8382E−10 |
| $B_5$ | — | — | — | 6.6114E−15 |
| $B_6$ | — | — | −4.8585E−15 | −1.3155E−15 |
| $B_7$ | — | — | — | −7.9660E−19 |
| $B_8$ | — | — | 3.2796E−19 | 1.3928E−19 |
| $B_9$ | — | — | — | 6.5799E−23 |
| $B_{10}$ | — | — | 2.2796E−23 | 1.6289E−23 |
| $B_{11}$ | — | — | — | −2.0341E−27 |
| $B_{12}$ | — | — | −4.2670E−28 | 1.0237E−28 |

Figure 24:
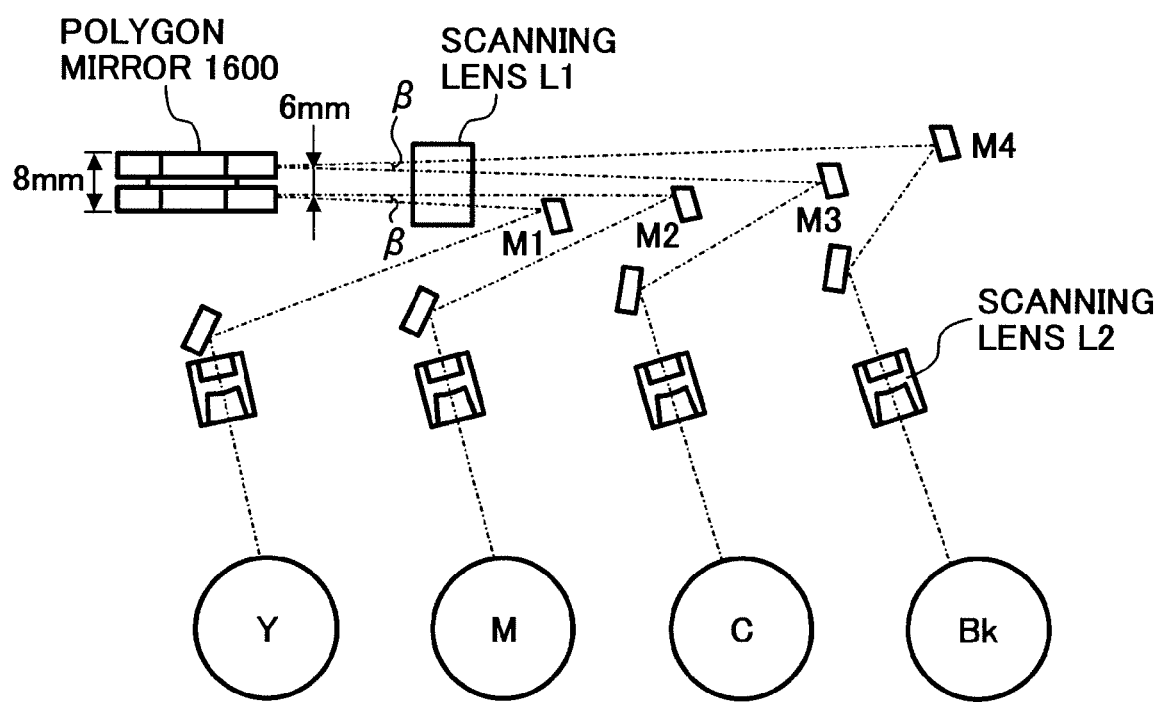
FIG. 24 is a diagram illustrating an optical scanning unit according to a second embodiment of the present invention.

A first example of the third embodiment is shown in FIG. 24. In this case, an optical scanning unit includes a scanning optical element that performs deflection scanning of a plurality of light beams by one light deflector and forms images on a plurality of image carriers. The light deflector includes a polygon mirror 1600 that is divided into two stages and on a same mirror surface of each stage, light beams that are guided by at least 2 image carriers are incident at angles in a direction corresponding to the secondary scanning direction. The polygon mirror 1600 that is divided into two stages, which is used in this case is hexahedral and has a radius of the inscribed circle 18 mm. Distance between centers of the mirrors is 6 mm and mirror thickness of each stage is 2 mm with a total thickness of 8 mm. The mirrors are separated from each other with a 4 mm gap and are cylindrical in shape with a radius 10 mm.

The following are advantages of using the polygon mirror 1600 with such arrangement. As compared to the first example for comparison, even if the angle of incidence in the secondary scanning direction is made smaller, an optical path separation being easy (in this example, light beams of colors Y and M, and C and k makes an angle of 2°), the thickening of the beam spot due to the deterioration of the wave front aberration can be suppressed. As compared to the second example for comparison, since the polygon mirror can be made thinner and a portion that is not used for unnecessary deflection is provided with the gap, the windage loss during the rotation of the polygon mirror can be reduced and a central position of the scanner as a whole can be set to be low. This enables to realize a structure that is favorable for reduction of the noise and power consumption, and improvement in durability.

A second example is characterized by a fact that angle β in a direction corresponding to the secondary scanning direction made by light beams that are guided to at least two image carriers, with the same mirror surfaces fulfils the following conditional equation.

$1° < β < 4°$

In this case, if the angle β becomes greater than an upper limit of 4°, the thickening of the beam spot diameter due to the deterioration of the wave front aberration cannot be ignored and leads to the unevenness in density and deterioration of gradation. Moreover, if the angle β becomes smaller than a lower limit of 1°, the optical path separation becomes difficult and due to a change in a direction of emission of LD with elapsing of time, the light beam tends to be rejected at the separating mirror. Due to this, hue tends to change due to a difference in an amount of light of Y, M, C, and K colors. Therefore, by setting the angle β in this range enables to achieve a good color image.

According to a third example, at least one light beam from among the light beams guided to the image carriers is incident roughly in parallel on a surface that is perpendicular to an axis of rotation of the polygon mirror. It is desirable that the light beam is inclined at an angle ±0.5° with respect to the surface that is perpendicular to the axis of rotation of the polygon mirror. In FIG. 24, light beams guided to colors M and C, are set to be roughly parallel to the surface that is perpendicular to the axis of rotation of the polygon mirror 1600. With such an arrangement, since angle β made by the beams for the colors Y and M, and C and K can be set to be the smallest, the deterioration of the beam spot diameter can be suppressed. Moreover, since the thickness of the polygon mirror can also be set to be thin, the windage loss and noise can be reduced and the durability can be improved.

According to a fourth example, in the scanning optical element, at least one surface has a decentered surface that is tilted in the direction corresponding to the secondary scanning direction. In this case, an example in which a decentered surface is used as the lens L1 is mentioned. Except for a shape of an emerging surface of the scanning lens L1, data is exactly the same. The emerging surface of the lens L1 (second surface) includes a four stage decentered surface and has a shape that is obtained by adding a tilted component Xt expressed by the following equation to the abovementioned data. The second surface (the surface on an emerging side) of the scanning lens is Xt(Y, Z)=(F0+F1·Y+F2·Y2+F3·Y3+F4·Y4+F5·Y5+F6·Y6+ . . . )Z. A coefficient is given by table 10. According to the fourth example, a value βh/β0 at a maximum image height of a difference of magnification with the center height is 0.99.

TABLE 10

| Coefficient | For cyan | For magenta | For yellow | For black |
|---|---|---|---|---|
| $F_0$ | −5.00E−2 | −2.50E−02 | 2.50E−02 | 5.00E−02 |
| $F_1$ | — | — | — | — |
| $F_2$ | 4.26E−28 | 2.15E−28 | −2.15E−28 | −4.26E−28 |
| $F_3$ | — | — | — | — |

In this case, Xt denotes a shape according to the tilted component, in terms of depth. Y denotes the main scanning and Z denotes secondary scanning coordinates.

By setting coefficients of tilting F1, F2, F3, . . . voluntarily, an angle of tilting can be changed according to the image height. The following are the merits of using a decentered surface with such an arrangement.

Only setting the decentered surface results in a large amount of bending of the scanning lines (approximately from 0.2 mm to 0.5 mm) on the photosensitive drum (image carrier). This bending of the scanning lines can be corrected to some extent by a Z shift (shift in the secondary scanning direction) or a β tilting (tilting in the secondary scanning direction) of the secondary scanning lens that has power mainly in the secondary scanning direction. However, the bending of the scanning lines cannot be corrected perfectly to zero and a color shift in the secondary scanning direction that cannot be ignored is resulted between the colors Y, M, C, and K.

Further, due to the β tilting (tilting in the secondary scanning direction and the Z shift (shift in the secondary scanning direction) the wave front aberration tend to be deteriorated easily and it becomes difficult to obtain a beam spot of a small diameter.

In view of this problem, according to the present invention, the bending of scanning lines is eliminated perfectly to zero theoretically. This enables to suppress the occurrence of the bending of the scanning lines and the color shift in the secondary scanning direction does not occur so easily. Besides, the deterioration of the wave front aberration being extremely small, it is possible to realize a beam spot of a small diameter not greater than 50 μm.

Figure 25A:
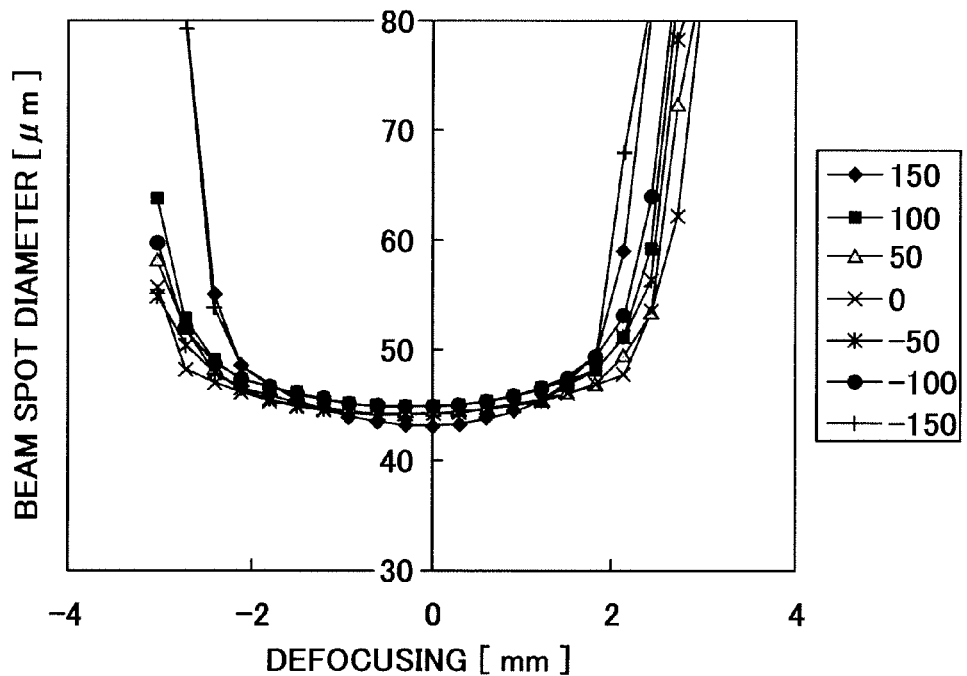
FIG. 25A is a graph illustrating a relationship between the main scanning beam spot diameter and defocusing.
Figure 25B:
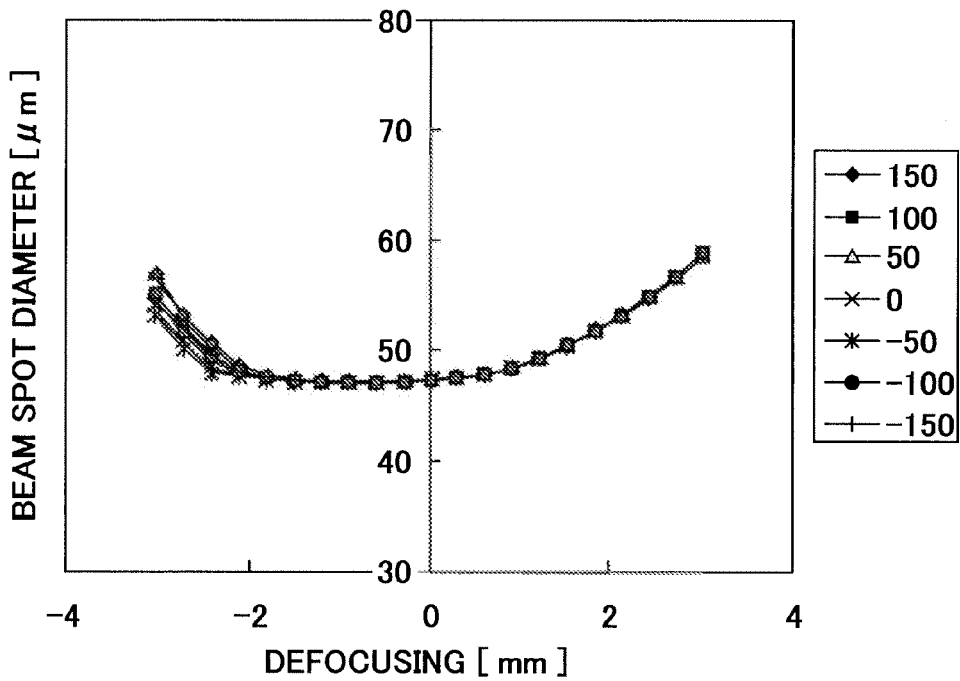
FIG. 25B is a graph illustrating a relationship between a secondary scanning direction beam spot diameter and defocusing.

The beam spot diameter according to the fourth example is shown in FIGS. 25A and 25B. Thus, the small beam spot diameter is realized. Numerical values in a block on left side indicate image heights.

Figure 26:
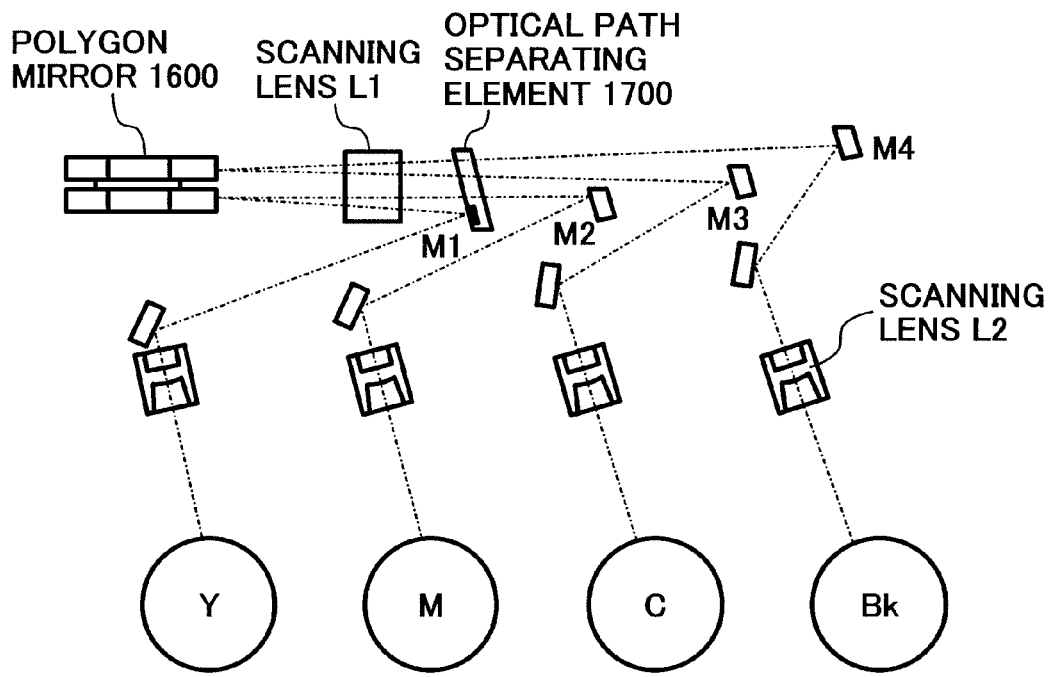
FIG. 26 is a diagram illustrating another example of the optical scanning unit according to the second embodiment of the present invention.
Figure 27:
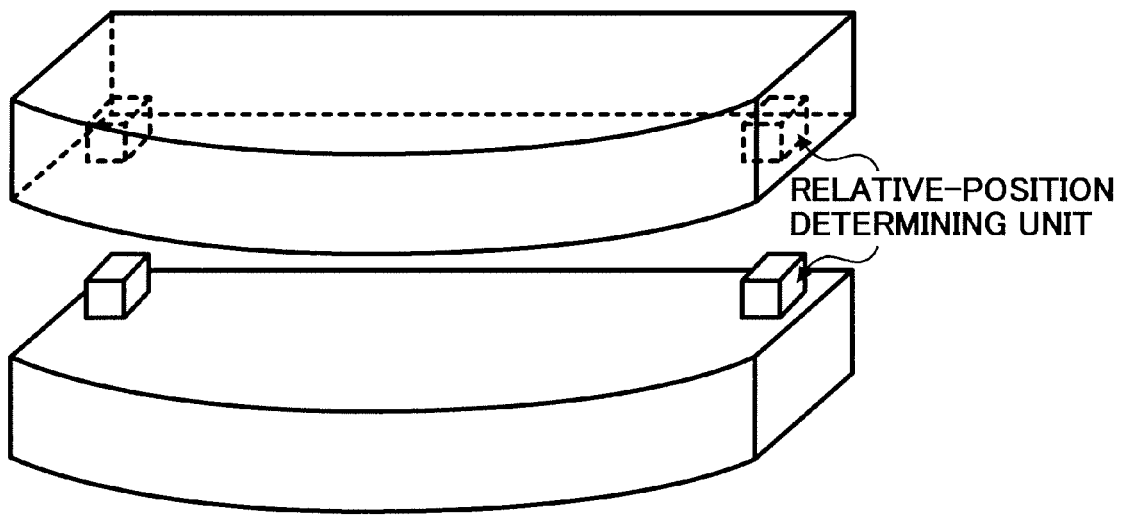
FIG. 27 is an illustration of a structure of the scanning lens according to FIG. 26.

A fifth example is shown in FIG. 26. According to the fifth example, by using an optical-path separating element 1700 (beam separating unit) that includes a transparent portion and a reflecting portion, an optical path of at least one light beam from among the light beams are guided to the image carriers is separated at the reflecting section. The light beams corresponding to the colors Y, M, C, and K are transmitted jointly through the scanning lens L1 and the height of the scanning lens L1 is 10 mm. On a side of a surface of emergence of the scanning lens L1, an angle of tilting of each decentered surface is set (four stages) according to each of the light beams corresponding to the colors Y, M, C, and K. The light beams refracted according to the angle of tilting are guided to the separating mirrors M1 to M4, thereby enabling to separate the light beams.

By separating the light beams in such a manner, the polygon mirror 1500 can be made thin. Therefore, the windage loss during the rotation of the polygon mirror can be reduced and the central position of the scanner as a whole can be set to be low. This enables to realize a structure that is favorable for reduction of the noise and power consumption, and improvement in durability. Besides, the height of the scanning lens can be reduced, thereby enabling to shorten the time for image formation and to reduce the cost. Moreover, an outbreak of sink marks can be suppressed thereby enabling to achieve a highly accurate shape of the surface.

In this case, the height of the scanning lens L1 is 10 mm. However, by superimposing or sticking the scanning lenses of height 5 mm in two stages, the cost can be reduced further and the profile regularity can be improved (see FIG. 27).

According to a sixth example, in the scanning optical elements used in the first to fifth examples, all the light beams that are guided to the image carriers are incident jointly on a scanning optical element that is disposed at a position nearest to the deflecting and reflecting surface. According to the present invention, it is a one side scanning in which the light beams are incident from one side of the light deflector and the deflection scanning is performed in one direction.

Since the light beams corresponding to the colors Y, M, C, and K are transmitted through a scanning lens (first lens) used jointly, that has power mainly in the main scanning direction, the difference in the shape of the optical elements is less. Besides, due to almost the same temperature and humidity environment, the relative change in the beam spot position (i.e. color shift) in the main scanning direction of the colors cannot occur so easily.

As a seventh example, a case in which the numerical values of the optical system after the light deflector are changed and the decentered surface is used for the scanning lenses L1 and L2 is described. The semiconductor laser that emits light of wavelength 655 nm is used as a light source. The divergent light beam that is emitted is converted to a substantially parallel light beam by the coupling lens (focal length: 15 mm). The substantially parallel light beam is formed as a long line-image in the main scanning direction at a position of the deflecting and reflecting surface of the polygon mirror 1600 due to the effect of the cylindrical lens (focal length 96 mm). The polygon mirror 1600 has six deflecting and reflecting surfaces and an inscribed circle of the polygon mirror 1600 has a radius of 18 mm. A light beam is incident obliquely on the polygon mirror 1600 at an angle of 2° in the secondary scanning direction and is incident at an angle of approximately 60° in the main scanning direction with respect to the light beam that is heading for the image height 0. An aperture that regulates the light beam emerged from the coupling lens is a rectangular aperture of 6.4 mm in the main scanning direction and 0.9 mm in the secondary scanning direction. The scanning lens L1 (surface numbers 1 and 2) is disposed in parallel with the deflecting and reflecting surface (light beam is incident obliquely at an angle of 2°) and the scanning lens L2 (surface numbers 3 and 4) is disposed such that the optical axis of the lens and the light beam incident coincide (disposed with inclination of 2° so that the light beam is not incident obliquely on the lens).

Table 11 represents the data of the optical system after the light deflector. The table 11 is to be read similarly as table 8. The shape in the main scanning direction of surfaces indicated by surface numbers 1, 2, and 3 is non-circular and in the secondary scanning direction is flat. Surfaces 2 and 3 are special tilted and decentered surfaces.

TABLE 11

| Surface number | RY (mm) | RZ (mm) | X (mm) | N | Note |
|---|---|---|---|---|---|
| Deflecting surface | ∞ | ∞ | 76.63 | — | Deflecting surface |
| 1* | −801.412 | ∞ | 22.99 | 1.524 | Scanning-imaging lens |
| 2* | −119.317 | ∞ | 146.32 | — | — |
| 3* | −1050.624 | −158.498 | 3.06 | 1.524 | Scanning-imaging lens |
| 4** | −2238.605 | −33.653 | 121.64 | — | — |
| 5 | — | — | — | — | Scanning surface |

The shape of the surface of the lens is given by Eq. (5).

$$X(Y, Z) = \frac{Y^2 \cdot Cm}{1 + \sqrt{1 - (1 + K) \cdot (Y \cdot Cm)^2}} + A \cdot Y^4 + B \cdot Y^6 + C \cdot Y^8 + D \cdot Y^{10} + E \cdot Y^{12} + F \cdot Y^{14} + \frac{Cs(Y) \cdot Z^2}{1 + \sqrt{1 - (Cs(Y) \cdot Z)^2}} + (F0 + F1 \cdot Y + F2 \cdot Y^2 + F3 \cdot Y^3 + F4 \cdot Y^4 + \ldots)Z \quad (5)$$

where, $Cm = 1/RY$ and $CS(Y) = 1/RZ$.

A shape of a surface with surface number 4 in the main scanning direction is non-circular and the radius of curvature in the secondary scanning direction changes continuously according to the height of the lens. The shape of each surface is given by Eq. (5), where CS(Y) is given by Eq. (6).

$$C_s(Y) = \frac{1}{RZ} + aY + bY^2 + cY^3 + dY^4 + eY^5 + fY^6 + gY^7 + hY^8 + iY^9 + jY^{10} + kY^{11} + lY^{12} + \quad (6)$$

An aspheric coefficient according to this example is expressed by table 12 below. In the present optical system, a noise proof glass of thickness 1.9 mm (refractive index 1.511) is inserted. The noise proof glass is disposed at a position inclined at 8° in the deflecting surface.

TABLE 12

| | First surface | Second surface | Third surface | Fourth surface |
|---|---|---|---|---|
| RY | −801.412 | −119.317 | −1050.624 | −2238.605 |
| K | 1.908E−01 | 4.603E−01 | 4.248E+01 | −1.208E+3 |
| A | −1.466E−07 | −4.650E−08 | 2.166E−08 | 3.078E−09 |
| B | 3.771E−11 | 2.232E−11 | 1.748E−12 | −8.738E−13 |
| C | −4.958E−15 | −3.241E−15 | −1.635E−16 | 1.456E−16 |
| D | −5.051E−19 | 6.931E−20 | 1.343E−21 | −1.442E−20 |
| E | 1.489E−22 | 1.072E−22 | 1.599E−25 | 4.420E−25 |
| F | −1.331E−26 | −2.441E−26 | — | — |
| RZ | ∞ | ∞ | −158.498 | −33.654 |
| a | — | — | — | −2.134E−07 |
| b | — | — | −3.034E−07 | 9.356E−09 |
| c | — | — | — | 9.197E−12 |
| d | — | — | 7.026E−12 | 5.661E−13 |
| e | — | — | — | −3.977E−15 |
| f | — | — | −2.422E−16 | −1.531E−16 |
| g | — | — | — | 1.747E−19 |
| h | — | — | 2.753E−20 | 2.129E−20 |
| i | — | — | — | −5.227E−25 |
| j | — | — | 3.126E−24 | 2.969E−25 |
| k | — | — | — | 2.027E−28 |
| l | — | — | 5.594E−30 | 1.426E−28 |
| F0 | — | — | — | — |
| F1 | — | −3.666E−06 | 5.820E−07 | — |
| F2 | — | 3.862E−06 | 1.248E−07 | — |
| F3 | — | — | — | — |
| F4 | — | 2.425E−10 | 2.373E−12 | — |
| F5 | — | — | — | — |
| F6 | — | 1.342E−14 | −6.062E−17 | — |

Figure 28A:
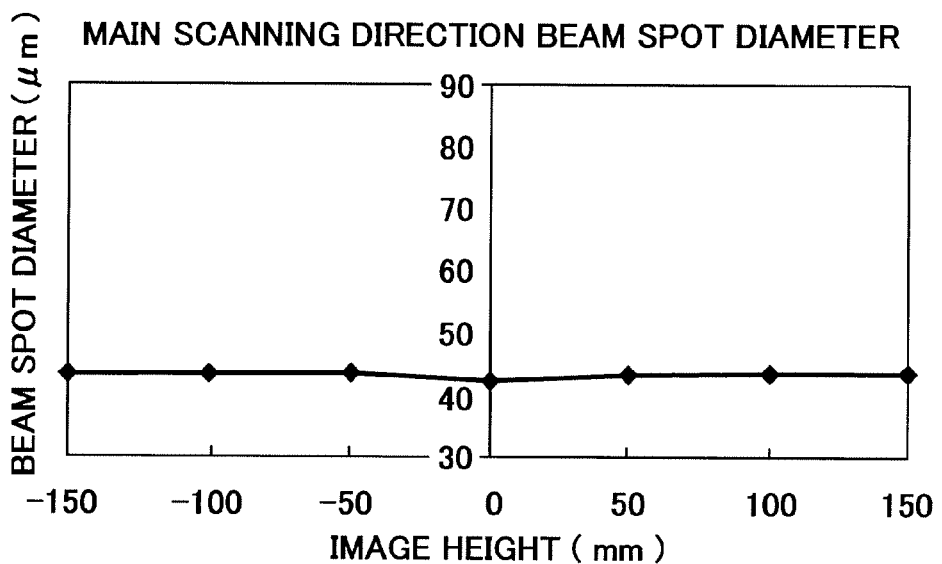
FIG. 28A is a graph illustrating a relationship between an image height and the main scanning direction beam spot diameter.
Figure 28B:
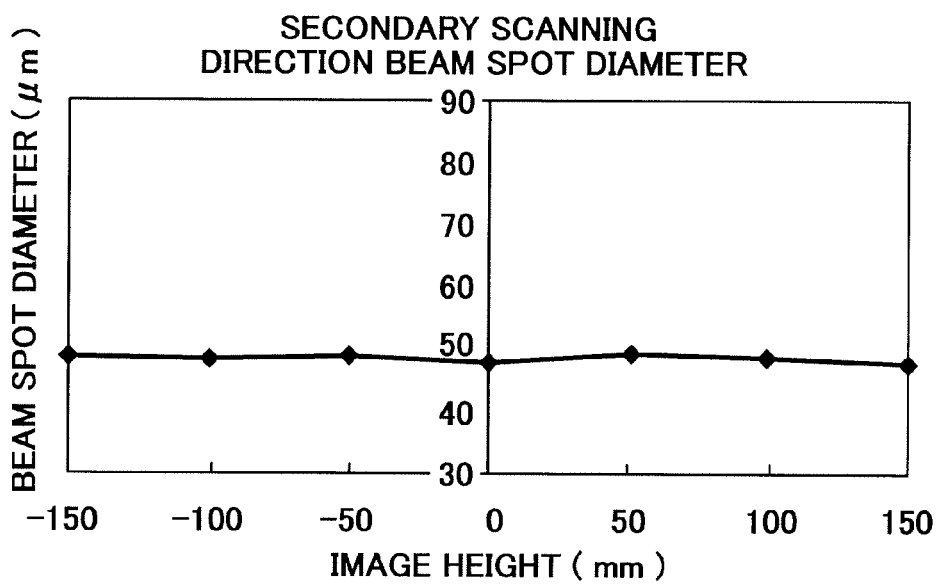
FIG. 28B is a graph illustrating a relationship between the image height and the secondary scanning direction beam spot diameter.

The beam spot diameter according to the seventh example is shown in FIGS. 28A and 28B. FIG. 28A is a diagram of the beam spot diameter in the main scanning direction and FIG. 28B is a diagram of the beam spot diameter in the secondary scanning direction. It can be observed that the beam spot diameter does not become wide with the change in the image height.

According to the examples first to seventh, as the thickness of the polygon mirror increases, there is an increase in noise due to the windage loss, an increase in the power consumption, deterioration of the durability, and separating of the light beams. Therefore, with the arrangement for allowing each light beam to be incident obliquely on the surface of the deflecting mirror, decrease in the beam spot diameter due to the deterioration of the wave front aberration can be improved.

Figure 29:
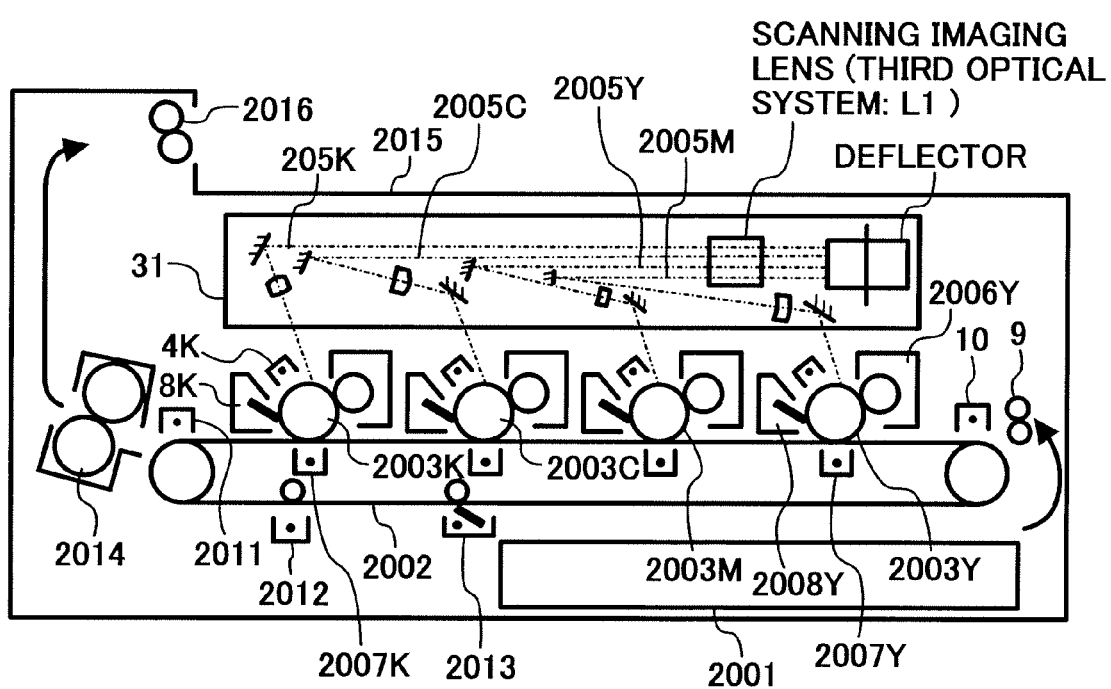
FIG. 29 is a schematic front view of an embodiment of an image forming apparatus in which the optical scanning unit according to the present invention is used.

An eighth example shown in FIG. 29 is of a tandem color image forming apparatus in which the optical scanning unit according to the third embodiment is used. The tandem color image forming apparatus includes a paper feeding cassette 2001. A carrier belt 2002 that carries a transfer paper (not shown in the diagram), which is fed by the paper feeding cassette 2001 is disposed in a direction horizontal with a bottom side of the tandem color image forming apparatus. Photosensitive drums 2003Y, 2003M, 2003C, and 2003K for the colors Y, M, C, and K are disposed one after another from an upstream side at same intervals from each other above the carrier belt 2002. Alphabets Y, M, C, and K after the reference numeral are used suitably to distinguish components used respective colors. All the photosensitive drums 2003Y, 2003, M, 2003C, and 2003K have the same diameter and various processing that perform various processes in the electrophotography are disposed around the photosensitive drums 2003Y, 2003M, 2003C, and 2003K. For example, processing units such as a charger 2004Y, a scanning optical system 2005Y, a developing unit 2006Y, a transfer charger 2007Y, and a cleaning unit 2008Y are disposed around the photosensitive drum 2003Y. Similarly, various processing units are disposed around the photosensitive drums 2003M, 2003C, and 2003K. According to the third embodiment, each of the photosensitive drums 2003Y, 2003M, 2003C, and 2003K is let to be a surface subjected to irradiation for each color. Scanning optical systems 2005Y, 2005M, 2005C, and 2005K are provided for the photosensitive drums 2003Y, 2003M, 2003C, and 2003K respectively, one for each photosensitive drum.

Around the carrier belt 22, a registering roller 2009 and a belt charger 2010 are provided at positions on an upstream side farther than the photosensitive drum 2003Y. Units such as a belt separation charger 2011, a decharger 2012, and a cleaning unit 2013 are disposed at a downstream side farther than the photosensitive drum 2003K. A fixing unit 2014 is disposed at a downstream side in a direction of transporting farther than the belt separation charger 2011. The fixing unit 2014 is connected by discharge rollers 2016 towards a paper discharging tray 2015.

With such a schematic structure, when in a full-color mode (plurality of color mode), based on an image signal for each of Y, M, C, and K colors, an electrostatic latent image corresponding to a signal of each color is formed by optical scanning by light beams from the scanning image-forming optical systems 2005Y, 2005M, 2005C, and 2005K on the photosensitive drums 2005Y, 2005M, 2005C, and 2005K. The electrostatic latent images are developed by the corresponding developing units with colored toners and become toner images. The toner images are absorbed electrostatically on the carrier belt 2002 and are transferred to a transfer paper one by one, to be superimposed on one another. Thus, a full-color image is formed on the transfer paper. The full-color image on the paper upon fixing by the fixing unit is discharged. When in a black-color mode (single-color mode), the photosensitive drums 2003Y, 2003M, and 2003C as well as the respective processing units are caused to be inoperative and based on the image signal for black color, an electrostatic latent image is formed by optical scanning by light beam from the scanning image-forming optical system 2005K only on the photosensitive drum 2003K. The electrostatic latent image is developed by black-colored toner and becomes a toner image. The toner image is absorbed electrostatically on the carrier belt 2002 and is transferred to a transfer paper. The monochrome image of black color upon fixing is discharged.

2031M and 2032M are two fθ lenses. Each fθ lens is fixed to an optical housing and is mounted on a plate 2033M. The plate 2033M is fully or partly in contact with a side of a surface in contact of the fθ lenses 2031M and 2032M. The fθ lenses 2031M and 2032M are made of plastic which is a low cost material and easy to form a shape of an aspheric surface. Particularly, a synthetic resin that has low water absorbency, high transparency, and good moldability is suitable for the fθ lenses 2032M and 2032M.

When a multiple number of color images are printed continuously, there is a sudden change in temperature due to heat generated particularly in the fixing unit and a polygon motor in the scanner. Therefore, there is a change in a hue in the first print of the color image and a print after a few prints. The present invention enables to correct satisfactorily such a change in the hue.

Thus, according to the third embodiment, in the scanning optical system, the plurality of light beams is subjected to deflection scanning by one light deflector and the image is formed on the plurality of image carriers. The light deflector includes the polygon mirror that is divided into two stages. The light beams guided to at least two image carriers are caused to be incident on the same mirror surface of the two stages at an angle in the direction corresponding to the secondary scanning direction. Due to such an arrangement, even when there is an external influence such as the shift in the shape of the optical element, the change in the temperature during continuous printing, and the temperature distribution, the relative color shift between the colors can be corrected effectively, thereby enabling to output a color image with less color shift.

Moreover, according to the present invention, the light beam making an angle in the secondary scanning direction with the normal of the deflecting and reflecting surface of the rotating polygon mirror is allowed to be incident obliquely. In the diagram of the example, a case where the deflecting and reflecting surface and the axis of rotation of the polygon mirror are parallel to each other has been described. Even when the deflecting and reflecting surface of the rotating polygon mirror is inclined with respect to the plane that is at right angles to the axis of rotation, the light beam after being deflected makes an angle in the secondary scanning direction in the similar manner. Therefore, since the effects similar to that of the present invention can be achieved for the light beam that is at an angle with respect to the normal of the deflecting and reflecting surface, it is in the category of the present invention.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanning unit comprising:
   a plurality of light sources that emits a plurality of light beams;
   a light deflector that is common to the light beams, and deflects each of the light beams from the light sources; and
   a scanning optical system that focuses each of the light beams deflected by the light deflector on a corresponding scanning surface, wherein
   the light beams from the light sources include a light beam that makes an angle in a secondary scanning direction with respect to a normal to a reflecting surface of the light deflector and a light beam that is horizontal in the secondary scanning direction with respect to the normal to the reflecting surface of the light deflector,
   wherein a scanning lens or a part of a scanning lens corresponding to the light beam that makes an angle with respect to the normal to the reflecting surface of the light deflector includes a surface that does not have a curvature in the secondary scanning direction and that is tilted and decentered in the secondary scanning direction.

2. The optical scanning unit according to claim 1, wherein a scanning lens that is nearest to the light deflector is shared by the light beams from the light sources.

3. The optical scanning unit according to claim 2, wherein the scanning lens is a single-piece lens.

4. The optical scanning unit according to claim 1, wherein a pair of the first light beam and the second light beam from the light sources come close to each other in the secondary scanning direction on the reflecting surface of the light deflector.

5. The optical scanning unit according to claim 1, wherein a refractive power of a scanning lens that is nearest to the light deflector in the secondary scanning direction is substantially zero.

6. The optical scanning unit according to claim 1,
   wherein a scanning lens or a part of a scanning lens corresponding to the light beam that makes an angle with respect to the normal to the reflecting surface of the light deflector includes a surface that does not have a curvature in the secondary scanning direction and at least one decentered-surface with a tilt of which an angle of tilting and decentering in the secondary scanning direction differs according to an image height on the surface.

7. The optical scanning unit according to claim 6, wherein an amount of decentering on an optical axis of the decentered-surface with a tilt is zero.

8. The optical scanning unit according to claim 6, wherein the decentered-surface with a tilt includes at least one surface of which an amount of decentering increases with being far away from the optical axis in a main scanning direction.

9. The optical scanning unit according to claim 8, wherein the decentered-surface with a tilt is disposed on a scanning lens towards a side of the light deflector from a lens that has a strong refractive power in the secondary scanning direction.

10. The optical scanning unit according to claim 8, wherein the amount of decentering of the decentered-surface with a tilt increases in a direction in which an angle of the light beam deflected by the light deflector in the secondary scanning direction increases.

11. The optical scanning unit according to claim 6, wherein the decentered-surface with a tilt is a surface on an output side of a lens that is nearest to the light deflector, through which the light beam that makes an angle with respect to the normal to the reflecting surface of the deflector passes.

12. The optical scanning unit according to claim 6, wherein the decentered-surface with a tilt includes at least one surface of which an amount of decentering changes asymmetrically in a main scanning direction with a center on an optical axis.

13. The optical scanning unit according to claim 12, wherein the decentered-surface with a tilt is a scanning lens that is nearest to the scanning surface.

14. The optical scanning unit according to claim 1, wherein the scanning optical system includes at least one surface of which a curvature in the secondary scanning direction changes according to an image height.

15. The optical scanning unit according to claim 1, wherein
a polyhedron that forms the reflecting surface of the light deflector is two staged in the secondary scanning direction, and
light beams guided to at least two scanning surfaces are incident at an angle β, respectively, in the secondary scanning direction on a same reflecting surface of each stage.

16. The optical scanning unit according to claim 15, wherein the angle β is larger than 1 degree and smaller than 4 degrees.

17. The optical scanning unit according to claim 15, wherein at least one light beam from among the light beams that are guided to an image carrier makes an angle in the secondary scanning direction within 0.5 degree with respect to the normal to the reflecting surface of the light deflector.

18. The optical scanning unit according to claim 1, further comprising a beam splitter that includes a transparent portion and a reflecting portion,
wherein
the beam splitter splits an optical path of at least one light beam from among light beams that are guided to the scanning surfaces.

19. The optical scanning unit according to claim 1, wherein the light beam that is incident on the light deflector makes an angle with respect to an optical axis of a scanning lens in a main scanning direction.

20. An image forming apparatus comprising an optical scanning unit that performs an optical writing on an image carrier to form a latent image on the image carrier, wherein
the optical scanning unit includes
a plurality of light sources that emits a plurality of light beams;
a light deflector that is common to the light beams, and deflects each of the light beams from the light sources; and
a scanning optical system that focuses each of the light beams deflected by the light deflector on a corresponding scanning surface, and
the light beams from the light sources include a light beam that makes an angle in a secondary scanning direction with respect to a normal to a reflecting surface of the light deflector and a light beam that is horizontal in the secondary scanning direction with respect to the normal to the reflecting surface of the light deflector,
wherein a scanning lens or a part of a scanning lens corresponding to the light beam that makes an angle with respect to the normal to the reflecting surface of the light deflector includes a surface that does not have a curvature in the secondary scanning direction and that is tilted and decentered in the secondary scanning direction.

21. An image forming apparatus comprising an optical scanning unit that performs an optical writing on an image carrier to form a latent image on the image carrier, wherein
the optical scanning unit includes
a multibeam light source that emits a plurality of light beams;
a light deflector that is common to the light beams, and deflects each of the light beams from the multibeam light source; and
a scanning optical system that focuses each of the light beams deflected by the light deflector on a corresponding scanning surface, and
the light beams from the light sources include a light beam that makes an angle in a secondary scanning direction with respect to a normal to a reflecting surface of the light deflector and a light beam that is horizontal in the secondary scanning direction with respect to the normal to the reflecting surface of the light deflector,
wherein a scanning lens or a part of a scanning lens corresponding to the light beam that makes an angle with respect to the normal to the reflecting surface of the light deflector includes a surface that does not have a curvature in the secondary scanning direction and that is tilted and decentered in the secondary scanning direction.

* * * * *